US010681405B2

(12) United States Patent
Hardin

(10) Patent No.: US 10,681,405 B2
(45) Date of Patent: Jun. 9, 2020

(54) DIGITAL DOMAIN CONTENT PROCESSING AND DISTRIBUTION APPARATUS AND METHODS

(71) Applicant: Time Warner Cable Enterprises LLC, St. Louis, MO (US)

(72) Inventor: Glen Hardin, Charlotte, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 16/267,103

(22) Filed: Feb. 4, 2019

(65) Prior Publication Data

US 2019/0238917 A1 Aug. 1, 2019

Related U.S. Application Data

(62) Division of application No. 15/898,504, filed on Feb. 17, 2018, now Pat. No. 10,200,731, which is a
(Continued)

(51) Int. Cl.
*H04N 21/262* (2011.01)
*H04H 20/77* (2008.01)
(Continued)

(52) U.S. Cl.
CPC ...... *H04N 21/26283* (2013.01); *H04H 20/77* (2013.01); *H04N 7/10* (2013.01);
(Continued)

(58) Field of Classification Search
None
See application file for complete search history.

(56) References Cited

U.S. PATENT DOCUMENTS

| 4,750,213 A | 6/1988 | Novak |
| 4,760,442 A | 7/1988 | O'Connell et al. |
(Continued)

FOREIGN PATENT DOCUMENTS

| EP | 0531046 A2 | 3/1993 |
| EP | 0903941 A1 | 3/1999 |
(Continued)

OTHER PUBLICATIONS

Aggrawal et al., "The Effectiveness of Intelligent Scheduling for Multicast Video-on-Demand", ACM, 2009.
(Continued)

*Primary Examiner* — James R Marandi
(74) *Attorney, Agent, or Firm* — Gazdzinski & Associates, PC

(57) ABSTRACT

Methods and apparatus for distributing content using a spectrum generation device. In one embodiment, digital content is received via a time-multiplexed network transport (such as Gigabit Ethernet), and converted to frequency channels suitable for transmission over a content distribution (e.g., Hybrid Fiber Coaxial (HFC)) network. In one variant, the conversion is performed using digital domain processing performed by a full spectrum generation device. Additionally, methods and apparatus for selectively adding, removing, and/or changing digital content from the full spectrum device are also disclosed. Various aspects of the present invention enable physical (infrastructure) consolidation, and software-implemented remote management of content distribution.

20 Claims, 25 Drawing Sheets

Related U.S. Application Data division of application No. 14/936,414, filed on Nov. 9, 2015, now Pat. No. 9,900,642, which is a division of application No. 12/875,974, filed on Sep. 3, 2010, now Pat. No. 9,185,341.

(51) Int. Cl.

| | | |
|---|---|---|
| *H04N 7/10* | (2006.01) | |
| *H04N 21/2389* | (2011.01) | |
| *H04N 21/472* | (2011.01) | |
| *H04N 21/2343* | (2011.01) | |
| *H04N 21/2385* | (2011.01) | |
| *H04N 21/239* | (2011.01) | |
| *H04N 21/254* | (2011.01) | |
| *H04N 21/6405* | (2011.01) | |
| *H04N 21/6408* | (2011.01) | |
| *H04H 20/18* | (2008.01) | |
| *H04L 27/00* | (2006.01) | |
| *H04N 21/242* | (2011.01) | |
| *H04H 20/69* | (2008.01) | |

(52) U.S. Cl.
CPC ..... *H04N 21/2385* (2013.01); *H04N 21/2393* (2013.01); *H04N 21/23895* (2013.01); *H04N 21/234309* (2013.01); *H04N 21/254* (2013.01); *H04N 21/47202* (2013.01); *H04N 21/6405* (2013.01); *H04N 21/6408* (2013.01); *H04H 20/18* (2013.01); *H04H 20/69* (2013.01); *H04L 27/00* (2013.01); *H04N 21/23439* (2013.01); *H04N 21/242* (2013.01)

(56) References Cited

U.S. PATENT DOCUMENTS

| | | |
|---|---|---|
| 5,528,284 A | 6/1996 | Iwami et al. |
| 5,594,491 A | 1/1997 | Hodge et al. |
| 5,606,359 A | 2/1997 | Youden et al. |
| 5,642,151 A | 6/1997 | Nusbickel et al. |
| 5,708,664 A | 1/1998 | Budge et al. |
| 5,708,961 A | 1/1998 | Hylton et al. |
| 5,745,837 A | 4/1998 | Fuhrmann |
| 5,818,438 A | 10/1998 | Howe et al. |
| 5,822,530 A | 10/1998 | Brown |
| 5,826,166 A | 10/1998 | Brooks et al. |
| 5,838,921 A | 11/1998 | Speeter |
| 5,872,588 A | 2/1999 | Aras et al. |
| 5,897,635 A | 4/1999 | Torres et al. |
| 5,940,738 A | 8/1999 | Rao |
| 5,983,318 A | 11/1999 | Willson et al. |
| 6,072,982 A | 6/2000 | Haddad |
| 6,118,976 A | 9/2000 | Arias et al. |
| 6,125,397 A | 9/2000 | Yoshimura et al. |
| 6,163,530 A | 12/2000 | Kim |
| 6,167,432 A | 12/2000 | Jiang |
| 6,181,697 B1 | 1/2001 | Nurenberg et al. |
| 6,198,478 B1 | 3/2001 | Ota et al. |
| 6,219,358 B1 | 4/2001 | Pinder et al. |
| 6,219,710 B1 | 4/2001 | Gray et al. |
| 6,259,701 B1 | 7/2001 | Shur et al. |
| 6,345,038 B1 | 2/2002 | Selinger |
| 6,389,538 B1 | 5/2002 | Gruse et al. |
| 6,473,793 B1 | 10/2002 | Dillon et al. |
| 6,501,810 B1 | 12/2002 | Karim et al. |
| 6,510,556 B1 | 1/2003 | Kusaba et al. |
| 6,519,062 B1 | 2/2003 | Yoo |
| 6,523,696 B1 | 2/2003 | Saito et al. |
| 6,543,053 B1 | 4/2003 | Li et al. |
| 6,564,381 B1 | 5/2003 | Hodge et al. |
| 6,583,825 B1 | 6/2003 | Yuen et al. |
| 6,591,422 B1 | 7/2003 | Cesar et al. |
| 6,640,145 B2 | 10/2003 | Hoffberg et al. |
| 6,643,262 B1 | 11/2003 | Larsson et al. |
| 6,651,141 B2 | 11/2003 | Adrangi |
| 6,675,388 B1 | 1/2004 | Beckmann et al. |
| 6,694,145 B2 | 2/2004 | Riikonen et al. |
| 6,718,552 B1 | 4/2004 | Goode |
| 6,754,271 B1 | 6/2004 | Gordon et al. |
| 6,788,676 B2 | 9/2004 | Partanen et al. |
| 6,886,029 B1 | 4/2005 | Pecus et al. |
| 6,889,382 B1 | 5/2005 | Anderson |
| 6,909,726 B1 | 6/2005 | Sheeran |
| 6,910,078 B1 | 6/2005 | Raman et al. |
| 6,925,257 B2 | 8/2005 | Yoo |
| 6,944,150 B1 | 9/2005 | McConnell et al. |
| 6,993,353 B2 | 1/2006 | Desai et al. |
| 7,003,790 B1 | 2/2006 | Inoue et al. |
| 7,006,881 B1 | 2/2006 | Hoffberg et al. |
| 7,009,972 B2 | 3/2006 | Maher et al. |
| 7,020,893 B2 | 3/2006 | Connelly |
| 7,027,460 B2 | 4/2006 | Iyer et al. |
| 7,039,048 B1 | 5/2006 | Monta et al. |
| 7,054,902 B2 | 5/2006 | Toporek et al. |
| 7,068,639 B1 | 6/2006 | Varma et al. |
| 7,069,577 B2 | 6/2006 | Geile et al. |
| 7,099,308 B2 | 8/2006 | Merrill et al. |
| 7,106,382 B2 | 9/2006 | Shiotsu |
| 7,149,772 B1 | 12/2006 | Kalavade |
| 7,174,126 B2 | 2/2007 | McElhatten et al. |
| 7,174,127 B2 | 2/2007 | Otten et al. |
| 7,174,384 B2 | 2/2007 | Cheung et al. |
| 7,174,385 B2 | 2/2007 | Li |
| 7,207,055 B2 | 4/2007 | Hendricks et al. |
| 7,209,458 B2 | 4/2007 | Ahvonen et al. |
| 7,213,036 B2 | 5/2007 | Apparao et al. |
| 7,228,154 B2 | 6/2007 | Champion et al. |
| 7,228,555 B2 | 6/2007 | Schlack |
| 7,242,960 B2 | 7/2007 | Van Rooyen et al. |
| 7,254,608 B2 | 8/2007 | Yeager et al. |
| 7,266,133 B2 | 9/2007 | Wu et al. |
| 7,272,227 B1 | 9/2007 | Beran |
| 7,325,073 B2 | 1/2008 | Shao et al. |
| 7,330,483 B1 | 2/2008 | Peters, Jr. et al. |
| 7,336,787 B2 | 2/2008 | Unger et al. |
| 7,359,375 B2 | 4/2008 | Lipsanen et al. |
| 7,363,643 B2 | 4/2008 | Drake et al. |
| 7,373,650 B1 | 5/2008 | Rodriguez et al. |
| 7,376,386 B2 | 5/2008 | Phillips et al. |
| 7,383,564 B2 | 6/2008 | White et al. |
| 7,389,523 B2 | 6/2008 | Kikinis |
| 7,457,520 B2 | 11/2008 | Rosetti et al. |
| 7,486,869 B2 | 2/2009 | Alexander et al. |
| 7,499,462 B2 | 3/2009 | MacMullan et al. |
| 7,567,983 B2 | 7/2009 | Pickelsimer et al. |
| 7,592,912 B2 | 9/2009 | Hasek et al. |
| 7,602,820 B2 | 10/2009 | Helms et al. |
| 7,609,637 B2 | 10/2009 | Doshi et al. |
| 7,690,020 B2 | 3/2010 | Lebar |
| 7,693,171 B2 | 4/2010 | Gould |
| 7,721,314 B2 | 5/2010 | Sincaglia et al. |
| 7,742,074 B2 | 6/2010 | Minatogawa |
| 7,770,200 B2 | 8/2010 | Brooks et al. |
| 7,809,942 B2 | 10/2010 | Baran et al. |
| 7,827,227 B2 | 11/2010 | Iijima et al. |
| 7,889,765 B2 | 2/2011 | Brooks et al. |
| 7,900,052 B2 | 3/2011 | Jonas et al. |
| 7,916,755 B2 | 3/2011 | Hasek et al. |
| 7,930,716 B2 | 4/2011 | Liga et al. |
| 7,936,775 B2 | 5/2011 | Iwamura |
| 7,954,131 B2 | 5/2011 | Cholas et al. |
| 7,971,222 B2 | 6/2011 | Ellis |
| 7,983,272 B2 | 7/2011 | Carlson et al. |
| 8,045,628 B2 | 10/2011 | Lahtonen et al. |
| 8,281,352 B2 | 10/2012 | Brooks et al. |
| 8,341,242 B2 | 12/2012 | Dillon et al. |
| 8,516,529 B2 | 8/2013 | Lajoie et al. |
| 9,215,423 B2 | 12/2015 | Kimble et al. |
| 9,300,445 B2 | 3/2016 | Hardin |
| 9,906,838 B2 | 2/2018 | Cronk et al. |
| 2001/0004768 A1 | 6/2001 | Hodge et al. |
| 2001/0013097 A1 | 8/2001 | Ito et al. |
| 2001/0050945 A1 | 12/2001 | Lindsey |

(56) References Cited

U.S. PATENT DOCUMENTS

| | | |
|---|---|---|
| 2001/0055305 A1 | 12/2001 | Oz et al. |
| 2001/0055336 A1 | 12/2001 | Krause et al. |
| 2002/0002708 A1 | 1/2002 | Arye |
| 2002/0024943 A1 | 2/2002 | Karaul et al. |
| 2002/0027883 A1 | 3/2002 | Belaiche |
| 2002/0032754 A1 | 3/2002 | Logston et al. |
| 2002/0037727 A1 | 3/2002 | McKenna et al. |
| 2002/0056098 A1 | 5/2002 | White |
| 2002/0056119 A1 | 5/2002 | Moynihan |
| 2002/0056125 A1 | 5/2002 | Hodge et al. |
| 2002/0059218 A1 | 5/2002 | August et al. |
| 2002/0059619 A1 | 5/2002 | Lebar |
| 2002/0059626 A1 | 5/2002 | Lemmons |
| 2002/0059638 A1 | 5/2002 | Oz et al. |
| 2002/0066033 A1 | 5/2002 | Dobbins et al. |
| 2002/0069420 A1 | 6/2002 | Russell et al. |
| 2002/0085584 A1 | 7/2002 | Itawaki et al. |
| 2002/0087967 A1 | 7/2002 | Conkwright et al. |
| 2002/0087995 A1 | 7/2002 | Pedlow et al. |
| 2002/0092026 A1 | 7/2002 | Janniello et al. |
| 2002/0129374 A1 | 9/2002 | Freeman et al. |
| 2002/0133618 A1 | 9/2002 | Desai et al. |
| 2002/0138831 A1 | 9/2002 | Wachtfogel et al. |
| 2002/0146023 A1 | 10/2002 | Myers |
| 2002/0147771 A1 | 10/2002 | Traversat et al. |
| 2002/0152299 A1 | 10/2002 | Traversat et al. |
| 2002/0166121 A1 | 11/2002 | Rovira |
| 2002/0188744 A1 | 12/2002 | Mani |
| 2002/0188869 A1 | 12/2002 | Patrick |
| 2002/0194372 A1 | 12/2002 | Elmaliach et al. |
| 2003/0002577 A1 | 1/2003 | Pinder |
| 2003/0028889 A1 | 2/2003 | McCoskey et al. |
| 2003/0037331 A1 | 2/2003 | Lee |
| 2003/0056217 A1 | 3/2003 | Brooks |
| 2003/0083054 A1 | 5/2003 | Francesca et al. |
| 2003/0097476 A1 | 5/2003 | Saxena et al. |
| 2003/0112372 A1 | 6/2003 | Weaver et al. |
| 2003/0115267 A1 | 6/2003 | Hinton et al. |
| 2003/0121047 A1 | 6/2003 | Watson et al. |
| 2003/0156218 A1 | 8/2003 | Laksono |
| 2003/0163817 A1 | 8/2003 | Han |
| 2003/0165241 A1 | 9/2003 | Fransdonk |
| 2003/0166401 A1 | 9/2003 | Combes et al. |
| 2003/0208612 A1 | 11/2003 | Harris et al. |
| 2003/0208767 A1 | 11/2003 | Williamson et al. |
| 2003/0217137 A1 | 11/2003 | Roese et al. |
| 2003/0217362 A1 | 11/2003 | Summers et al. |
| 2003/0217365 A1 | 11/2003 | Caputo |
| 2003/0220072 A1 | 11/2003 | Coffin, III |
| 2004/0015551 A1 | 1/2004 | Thornton |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0060074 A1 | 3/2004 | Basawapatna et al. |
| 2004/0068751 A1 | 4/2004 | Basawapatna et al. |
| 2004/0090283 A1 | 5/2004 | Naito |
| 2004/0090996 A1 | 5/2004 | Wu et al. |
| 2004/0123324 A1 | 6/2004 | Sazzad et al. |
| 2004/0133923 A1 | 7/2004 | Watson et al. |
| 2004/0137918 A1 | 7/2004 | Varonen et al. |
| 2004/0163129 A1 | 8/2004 | Chapman et al. |
| 2004/0181800 A1 | 9/2004 | Rakib et al. |
| 2004/0228269 A1 | 11/2004 | Balakrishnan et al. |
| 2004/0230994 A1 | 11/2004 | Urdang et al. |
| 2004/0250273 A1 | 12/2004 | Swix et al. |
| 2005/0021539 A1 | 1/2005 | Short et al. |
| 2005/0025039 A1 | 2/2005 | Hwang et al. |
| 2005/0034171 A1 | 2/2005 | Benya |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0071882 A1 | 3/2005 | Rodriguez et al. |
| 2005/0086334 A1 | 4/2005 | Aaltonen et al. |
| 2005/0086683 A1 | 4/2005 | Meyerson |
| 2005/0105528 A1 | 5/2005 | Kobayashi |
| 2005/0108763 A1 | 5/2005 | Baran et al. |
| 2005/0114900 A1 | 5/2005 | Ladd et al. |
| 2005/0114903 A1 | 5/2005 | Ahmed et al. |
| 2005/0177855 A1 | 8/2005 | Maynard et al. |
| 2005/0188415 A1 | 8/2005 | Riley |
| 2005/0190794 A1 | 9/2005 | Krause et al. |
| 2005/0195910 A1 | 9/2005 | Kim et al. |
| 2005/0198686 A1 | 9/2005 | Krause et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0047957 A1 | 3/2006 | Helms et al. |
| 2006/0085727 A1 | 4/2006 | Azenkot et al. |
| 2006/0093067 A1 | 5/2006 | Jalali et al. |
| 2006/0095940 A1 | 5/2006 | Yearwood |
| 2006/0127039 A1 | 6/2006 | Van Stam |
| 2006/0130099 A1 | 6/2006 | Rooyen |
| 2006/0130101 A1 | 6/2006 | Wessel Van Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149850 A1 | 7/2006 | Bowman |
| 2006/0150216 A1 | 7/2006 | Herz et al. |
| 2006/0159093 A1 | 7/2006 | Joo et al. |
| 2006/0161635 A1 | 7/2006 | Lamkin et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0209890 A1 | 9/2006 | MacMullan et al. |
| 2006/0218604 A1 | 9/2006 | Riedl et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022444 A1 | 1/2007 | Santhoff |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0083902 A1 | 4/2007 | Urdang et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0180230 A1 | 8/2007 | Cortez |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0250880 A1 | 10/2007 | Hainline |
| 2007/0261116 A1 | 11/2007 | Prafullchandra et al. |
| 2007/0276926 A1 | 11/2007 | LaJoie et al. |
| 2007/0294717 A1 | 12/2007 | Hill et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0133551 A1 | 6/2008 | Wensley et al. |
| 2008/0137541 A1 | 6/2008 | Agarwal et al. |
| 2008/0155059 A1 | 6/2008 | Hardin et al. |
| 2008/0162353 A1 | 7/2008 | Tom et al. |
| 2008/0192820 A1 | 8/2008 | Brooks et al. |
| 2008/0216115 A1 | 9/2008 | Kikinis |
| 2008/0222684 A1 | 9/2008 | Mukraj et al. |
| 2008/0235746 A1 | 9/2008 | Peters et al. |
| 2008/0273591 A1 | 11/2008 | Brooks et al. |
| 2008/0282299 A1 | 11/2008 | Koat et al. |
| 2009/0031384 A1 | 1/2009 | Brooks et al. |
| 2009/0083813 A1 | 3/2009 | Dolce et al. |
| 2009/0098861 A1 | 4/2009 | Kalliola et al. |
| 2009/0100459 A1 | 4/2009 | Riedl et al. |
| 2009/0103651 A1 | 4/2009 | Lahtonen et al. |
| 2009/0116374 A1 | 5/2009 | Henriksson et al. |
| 2009/0133079 A1 | 5/2009 | Li et al. |
| 2009/0141696 A1 | 6/2009 | Chou et al. |
| 2009/0150917 A1 | 6/2009 | Huffman et al. |

(56) References Cited

U.S. PATENT DOCUMENTS

| | | |
|---|---|---|
| 2009/0163218 A1 | 6/2009 | Liu et al. |
| 2009/0172776 A1 | 7/2009 | Makagon et al. |
| 2009/0185576 A1 | 7/2009 | Kisel et al. |
| 2009/0187934 A1 | 7/2009 | Norman |
| 2009/0190677 A1 | 7/2009 | Jokela et al. |
| 2009/0193485 A1 | 7/2009 | Rieger et al. |
| 2009/0201917 A1 | 8/2009 | Maes et al. |
| 2009/0210912 A1 | 8/2009 | Cholas et al. |
| 2009/0217326 A1 | 8/2009 | Hasek |
| 2009/0225760 A1 | 9/2009 | Foti |
| 2009/0245090 A1 | 10/2009 | Budianu et al. |
| 2009/0282241 A1 | 11/2009 | Prafullchandra et al. |
| 2009/0282741 A1 | 11/2009 | Kim |
| 2009/0293101 A1 | 11/2009 | Carter et al. |
| 2010/0023977 A1 | 1/2010 | Peterfreund |
| 2010/0027560 A1 | 2/2010 | Yang et al. |
| 2010/0030578 A1 | 2/2010 | Siddique et al. |
| 2010/0034219 A1 | 2/2010 | Stadelmeier et al. |
| 2010/0042478 A1 | 2/2010 | Reisman |
| 2010/0083329 A1 | 4/2010 | Joyce et al. |
| 2010/0106846 A1 | 4/2010 | Noldus et al. |
| 2010/0115091 A1 | 5/2010 | Park et al. |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0158086 A1 | 6/2010 | Kim et al. |
| 2010/0169977 A1 | 7/2010 | Dasher et al. |
| 2010/0287609 A1 | 11/2010 | Gonzalez et al. |
| 2010/0313225 A1 | 12/2010 | Cholas et al. |
| 2011/0010733 A1 | 1/2011 | Godas |
| 2011/0044328 A1 | 2/2011 | Van Berkel |
| 2011/0051845 A1 | 3/2011 | Schmidl et al. |
| 2011/0071841 A1 | 3/2011 | Fomenko et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0138434 A1 | 6/2011 | Ulm |
| 2011/0213688 A1 | 9/2011 | Santos et al. |
| 2011/0219229 A1 | 9/2011 | Cholas et al. |
| 2011/0292785 A1 | 12/2011 | Hardin |
| 2012/0008786 A1 | 1/2012 | Cronk et al. |
| 2012/0011567 A1 | 1/2012 | Cronk et al. |
| 2013/0097647 A1 | 4/2013 | Brooks et al. |
| 2013/0295978 A1 | 11/2013 | Ruohonen et al. |

FOREIGN PATENT DOCUMENTS

| | | |
|---|---|---|
| EP | 1030305 A2 | 8/2000 |
| EP | 1030305 A3 | 9/2002 |
| EP | 0903941 B1 | 3/2004 |
| JP | H06326986 A | 11/1994 |
| JP | H09205407 A | 8/1997 |
| JP | H1041915 A | 2/1998 |
| JP | H10507889 A | 7/1998 |
| JP | H10336608 A | 12/1998 |
| JP | H11220712 A | 8/1999 |
| JP | 2002320213 A | 10/2002 |
| JP | 2003502958 A | 1/2003 |
| JP | 2005519365 A | 6/2005 |
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| JP | 5608136 B2 | 10/2014 |
| WO | WO-9809438 A1 | 3/1998 |
| WO | WO-9929108 A1 | 6/1999 |
| WO | WO-0110125 A1 | 2/2001 |
| WO | WO-2004047444 A1 | 6/2004 |
| WO | WO-2004070582 A2 | 8/2004 |
| WO | WO-2005015422 A1 | 2/2005 |
| WO | WO-2012021245 A1 | 2/2012 |

OTHER PUBLICATIONS

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

Siohan et al., "Analysis and Design of OFDM/OQAM Systems Based on Filterbank Theory", IEEE Transactions on Signal Processing, May 2002.

Sorrento Networks, "Solution Architectures for Cable Video-on-Demand", 2002.

UTF-32, IBM, retrieved from http://publib.boulder.ibm.com/infocenter/iseries/v5r3/index.jsp?topic=%2Fnls%2Frbagsutf32.htm on Aug. 28, 2013.

DIGITAL DOMAIN CONTENT PROCESSING AND DISTRIBUTION APPARATUS AND METHODS

PRIORITY AND RELATED APPLICATIONS

This application is a divisional of and claims priority to co-owned and co-pending U.S. patent application Ser. No. 15/898,504 of the same title filed Feb. 17, 2018, and issuing as U.S. Pat. No. 10,200,731 on Feb. 5, 2019, which is a divisional of and claims priority to co-owned U.S. patent application Ser. No. 14/936,414 of the same title filed Nov. 9, 2015, and issued as U.S. Pat. No. 9,900,642 on Feb. 20, 2018, which is a divisional of and claims priority to co-owned U.S. patent application Ser. No. 12/875,974 of the same title filed Sep. 3, 2010, and issued as U.S. Pat. No. 9,185,341 on Nov. 10, 2015, each incorporated herein by reference in their entirety. In addition, this application is related to commonly owned U.S. patent application Ser. No. 12/789,322 filed May 27, 2010, entitled "DIGITAL DOMAIN CONTENT PROCESSING AND DISTRIBUTION APPARATUS AND METHODS", and issued as U.S. Pat. No. 9,300,445 on Mar. 29, 2016, application Ser. No. 15/083,116 filed Mar. 28, 2016 of the same title and issued as U.S. Pat. No. 9,942,077 on Apr. 10, 2018, and co-pending application Ser. No. 15/948,943 filed Apr. 9, 2018 of the same title, each incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of optimizing the operation of a content delivery network. More particularly, the present invention is in one exemplary aspect related to apparatus and methods for providing adaptive network routing.

2. Description of Related Technology

Recent advances in digital information processing and technology have made a whole range of services and functions available for delivery to consumers at various types of devices for reasonable prices and/or subscription fees. These services and functions include digital content or programming (movies, advertisements, etc.), digital video-on-demand (VOD), personal video recorder (PVR) and networked PVR (nPVR), Internet Protocol television (IPTV), digital media playback and recording, as well high speed Internet access (including so-called "Internet TV", where television programming is delivered over the Internet without QoS) and IP-based telephony (e.g., VoIP).

Currently, many of these services are provided to the user via a wide variety of different equipment environments and delivery paradigms (including, inter alia, cable or satellite modems via QAMs, Hybrid Fiber-copper (HFCu) distribution via indigenous POST/PSTN wiring in a premises, Wi-Fi™ or WiMAX hubs, Ethernet hubs, gateways, switches, and routers), to a plurality of user equipment types. For example, content may be delivered to users at set-top boxes, personal (desktop) computers, laptop computers, other mini-computers (such as so-called "netbooks", mini-notebook computers), 3G or 4G smartphones, and/or other devices.

Traditional cable network delivery services are optimized for broadcasting a limited number of services to a much larger audience of consumers. Cable networks compete with other systems, such as satellite broadcast and HFCu service. Within cable networks, so-called "narrowcast" content is provided for a relatively small number of targeted consumers. In a broad sense, narrowcast content is content (or its associated bandwidth) that is more narrowly distributed to a subset of the subscriber pool serviced by a given network. Examples of narrowcast content include VOD, "startover" functionality, DOCSIS, and switched digital video delivery. Narrowcast applications (such as advertising, data, premium content, etc.) generally have greater value for the consumer, and are a source of significant revenue for network providers. Additionally, narrowcast applications have traditionally been one key differentiation between cable network providers and their competitors (e.g., satellite service).

However, while narrowcast content has significant business value, the technical realization of narrowcast content insertion (including so-called "targeted" content, such as targeted advertising or promotions) greatly complicates cable network topologies and operation.

Originally, cable networks were carefully planned around relatively static parameters; for example, analog delivery of channels operated using fixed frequencies and time slots. As cable networks have transitioned to digital content and narrowcast services (such as Switched Digital Video (SDV) and Video-On-Demand (VOD)), additional infrastructure has been added to support splicing, mixing, etc. within the existing analog delivery framework. Current cable networks are often a less-than-coherent mix of somewhat haphazardly organized equipment. Worse still, a growing maze of wiring and cabling connects clusters of specialized hardware which further exacerbates network management challenges. Typical cable network infrastructure is often both hard to maintain and modify, and increasingly difficult to upgrade. As narrowcast services continue to diversify and drive increasing portions of business revenue, the demands on network infrastructure may rapidly exceed sustainable limits.

FIG. 1 illustrates one such prior art content delivery network configuration. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity.

FIG. 1a illustrates one typical prior art headend architecture. The headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as a Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end. Each local service node 182 provides appropriate content to a "service group" of CPEs 106.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream.

FIG. 1c illustrates an exemplary prior art "switched" network architecture (e.g., "switched digital video"). Switching architectures allow improved efficiency of bandwidth use for ordinary digital broadcast programs. Ideally, the subscriber is unaware of any difference between programs delivered using a switched network and ordinary streaming broadcast delivery. FIG. 1c shows the implementation details of one exemplary implementation of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub.

In addition to "broadcast" content (e.g., video programming), the systems of FIGS. 1a and 1c also deliver Internet data services using the Internet protocol (IP).

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets received from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming (e.g., DOCSIS QAMs). The CPE 106 are each configured to monitor the particular assigned RF channel (such as via a port or socket ID/address, or other such mechanism) for IP packets intended for the sub scriber premises/address that they serve.

Currently, typical "digital" cable networks such as those described with respect to FIGS. 1-1c above employ video signals in the TDM (Time Division Multiplexing) domain that are transformed to FDM (Frequency Division Multiplexing) domain for delivery within the HFC plant. However, this approach is implemented in a largely discrete fashion; the fundamental technologies perform single channel conversion or block up-conversion of multiple adjacent channels in varying blocks of channels (e.g., 2, 4, 8, 16, or 32). The most advanced technologies employed to date perform comb-channel insertion, wherein single channels or blocks of channels are inserted anywhere within the RF spectrum. This insertion or signal combining is effectively performed in an analog "wired" domain, which unfortunately does not lend itself to ready reconfiguration without physical rewiring.

For example, in terms of hardware, a typical prior art cable network hubsite (see FIG. 1c) has significant requirements in terms of space, power, and cooling due to the many components needed to (i) effect the aforementioned signal combining/insertion functions; and (ii) distribute the combined signal to individual service groups and subscribers. A typical prior art hubsite rack has 42 Rack Units (RU), and consumes roughly 1 Amp of electrical current per RU (2 Amps if there is redundancy). A hubsite supporting 80 service groups may consume 20 full racks to generate the necessary spectrums. Moreover, there typically are literally thousands of wires, specifically coaxial cables, within a typical hubsite. Such complexities are also prone to equipment failure (more components and cables generally equates to a higher chance of failure), and service wiring mistakes.

Hybrid Fiber Copper (HFCu) systems such as the U-verse® service offered by AT&T suffer many similar disabilities, largely due to the fact that the indigenous transport for much of the provided service (i.e., copper wiring within a user's premises and beyond, that was originally installed for providing POTS or PSTN telephony service only) is not optimized for narrowcast content delivery.

Another issue with extant content delivery systems relates to so-called "service velocity"; defined as the rate with which new services can be employed or adopted within a cable or other network. Simply stated, the more difficult such implementation is (due to e.g., having to rewire or reconfigure portions of a network), the lower the velocity. Service velocity is an essential differentiating factor in terms of the subscriber; as time goes on, subscribers want more and better services faster, especially those that are individualized to their particular needs or situation. Hence, such subscriber-specific service velocity must be considered in solutions going forward, and extant delivery systems such as HFC cable topologies cannot be considered optimized for this factor. Currently, to implement new services, changes to the network topology and significant amounts of labor (e.g., "truck rolls") are required, due largely to a lack of remote reconfiguration capability, and what amounts to a largely "circuit switched" topology.

Similarly, to establish or discontinue services for new or existing subscribers, being so labor-intensive, results in MSOs being reluctant to make these changes without a significant opportunity for economic recovery (e.g., a commitment from the subscriber for a sufficiently long period of time, or a higher rate). Stated differently, if the existing delivery network could be reconfigured with little or no labor, then the threshold for establishing/terminating service to a given subscriber could feasibly be lowered (practically corresponding to lower service costs, and/or shorter service commitments), which would ostensibly entice more subscribers to sign up for service, since the cost (risk)-benefit equation tilts further in their favor. This would allow network operators such as MSOs to more effectively leverage some of their salient advantages or attributes; i.e., customer service, individualization of service, reliability, etc.; as more people try the MSO's service (due to reduced entry threshold), the more people will conceivably be convinced to continue service with the MSO, thereby increasing the MSO's subscriber base. Conversely, as the subscriber's service cost and length of commitment increase, they will be less likely to sign up or stay with the MSO.

Moreover, current content distribution network infrastructures are poorly suited for prototyping new technologies. Current prototyping is expensive for the network (e.g., significant labor and capital outlays which may or may not be profitable), and can disrupt consumer services (e.g., as equipment is wired, "juggled"). Faster prototyping capabilities will benefit both network operators and users/consumers.

Accordingly, there is a salient need for improved apparatus and methods for efficiently distributing content (including the aforementioned narrowcast services) within a digital network. Such improved apparatus and services should simplify infrastructures for existing digital services, and support other requisite services such as analog, while also flexibly accommodating future changes to content delivery mechanisms and services. Rapid and remote reconfigurability would also be a highly desirable feature, thereby obviating much labor associated with rewiring of traditional networks to add new services.

SUMMARY OF THE INVENTION

The present invention satisfies the foregoing needs by providing, inter alia, improved apparatus and methods for optimizing the operation of a content delivery network by providing adaptive network routing.

In a first aspect of the invention, a network architecture for distributing content from a plurality of content sources to a plurality of users is disclosed. In one embodiment, the architecture comprises: spectrum generation apparatus configured to transform signals from a first domain to a second domain; first apparatus for distributing content signals from one or more of the sources to the spectrum generation apparatus; and second apparatus for distributing the transformed content signals to one or more network service groups.

In one variant, the spectrum generation apparatus comprises: a network interface adapted to receive digital content from a plurality of content sources, via the first apparatus; a downstream interface in communication with the plurality of users via the second apparatus; and programmable apparatus configured to transform digital content received from the network interface from the frequency domain to the time domain. The second apparatus comprises QAM modulated channels.

In another variant, the programmable apparatus configured to transform the digital content received from the network interface comprises an inverse Fast Fourier Transform (IFFT) apparatus.

In yet another variant, the first apparatus comprises a gigabit Ethernet network, and the second apparatus comprises a substantially circuit switched frequency distribution network.

In still another variant, the spectrum generation apparatus outputs the transformed content signals in an optical domain; and the network architecture further comprises an optical-to-radio frequency (RF) coupler adapted to convert the optical domain output of the spectrum generation apparatus to an RF domain.

Alternatively, the spectrum generation apparatus outputs the transformed content signals in a radio frequency (RF) domain; and the network architecture further comprises an RF combiner adapted to combine the RF domain output of the spectrum generation apparatus with that of other spectrum generation apparatus in the same network architecture.

In a second aspect of the invention, a method of providing on-demand content to a user of a content distribution network is disclosed. In one embodiment, the method comprises: receiving a request from a user for a digital content element; accessing the digital content element at an on-demand server; transmitting the accessed digital content element as part of a single program transport stream (SPTS) to a transformation device; transforming, at the transformation device, the received digital content element to one or more time domain signals using digital domain processing; and transmitting the transformed signals to the user over one or more radio frequency carriers.

In one variant, the digital content element carried in the SPTS is unencrypted, and the method further comprises encrypting the digital content element before the act of transforming is performed.

In another variant, the method further comprises converting the transformed digital content element to the analog domain before the transmitting to the user.

In yet another variant, transmitting the digital content element as part of the SPTS comprises transmitting over a high-capacity packetized backbone to the transformation device, the transformation device being disposed at a hub site of the network.

In a third aspect of the invention, a method of providing a plurality of content elements to a plurality of users of a content distribution network is disclosed. In one embodiment, the method comprises: accessing at least one of a plurality of digital content sources in communication with the network; transmitting the accessed digital content elements as part of a multi-program transport stream (MPTS) to a transformation device; transforming, at the transformation device, the received digital content elements to one or more time domain signals using digital domain processing; and transmitting the transformed signals to the users over one or more radio frequency carriers.

In one variant, the transformation device comprises a demultiplexer function configured to demultiplex the MPTS to recover individual program streams associated with the digital content elements.

In another variant, the one or more frequency carriers comprise QAM-modulated channels each having a frequency bandwidth of approximately 6 MHz.

In another variant, the digital domain processing comprises an inverse Fast Fourier Transform (IFFT).

In yet another variant, the plurality of users are associated with a common service group within the network.

In a further variant, the transformation device is substantially remotely reprogrammable, and the method further comprises dynamically changing an allocation of the transformed digital content elements to the one or more frequency carriers remotely.

In still another variant, the transformation device is substantially remotely reprogrammable, and the method further comprises dynamically changing an allocation of the transformed digital content elements to the one or more frequency carriers remotely.

In another variant, the method further comprises dynamically inserting secondary content elements into the digital content elements before the transformation.

In a fourth aspect of the invention, a method of providing a plurality of heterogeneous types of content products to various ones of a plurality of users of a content distribution network is disclosed. In one embodiment, the method comprises: receiving the heterogeneous types of content from one or more content sources; allocating the different types of content to frequency resources; performing digital domain processing on the content to effect the allocating; and transmitting the converted content to the plurality of users over the allocated frequency resources. The transmitting of the converted content comprises transmitting without forming a multi-program transport stream.

In a fifth aspect of the invention, a content distribution network is disclosed. In one embodiment, the network has a substantially flat topology and comprises: spectrum generation apparatus disposed substantially at an edge of the network and configured to perform digital domain processing of content to transform the content from a multiplexed frequency domain input to a time domain output; first apparatus for distributing the content from one or more sources to the spectrum generation apparatus; and second apparatus for distributing the transformed content to one or more network service groups. The transformed content is delivered to the one or more service groups without having to be multiplexed into a transport stream.

In another embodiment, the network comprises: spectrum generation apparatus disposed substantially at an edge of the network and configured to perform digital domain processing of content to transform the content from a frequency domain input to a time domain output; first apparatus for distributing the content from one or more sources to the spectrum generation apparatus; and second apparatus for distributing the transformed content a plurality of hierarchical service groups that are virtually created in a time division multiplexed domain, and subscribed to by the spectrum generation apparatus. The spectrum generation apparatus further is configured to perform combining of a plurality of signals in the digital domain without the need for RF combining and insertion using physical conduction media.

In a sixth aspect of the invention, methods of doing business utilizing the previously referenced network and architecture are disclosed.

In an seventh aspect of the invention, methods of providing high service velocity utilizing previously referenced network and architecture are disclosed.

In an eighth aspect of the invention, a network distribution architecture utilizing multiple ones of the spectrum generation device is disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
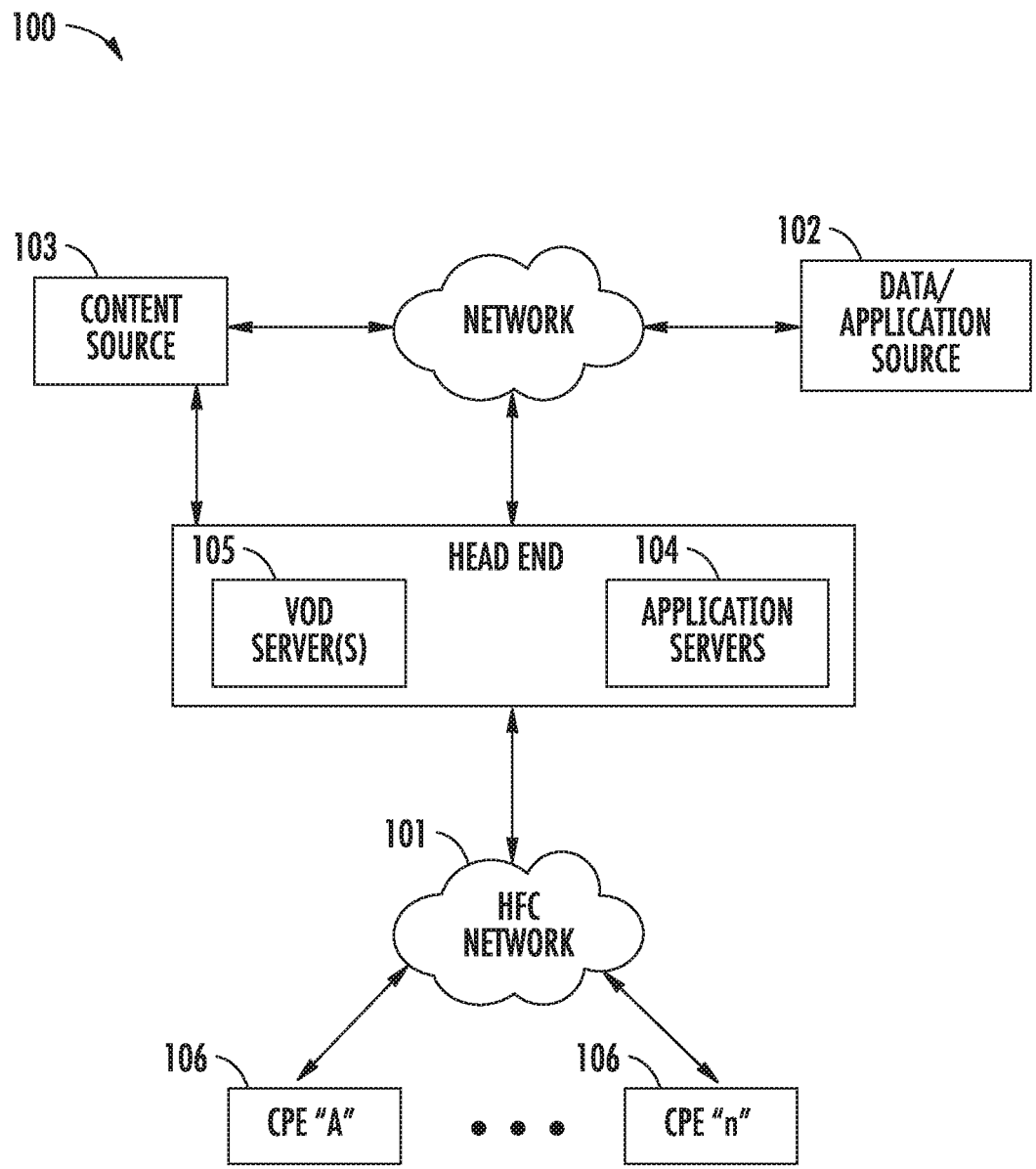
FIG. 1 is a functional block diagram illustrating an exemplary prior art HFC cable network configuration.
Figure 1A:
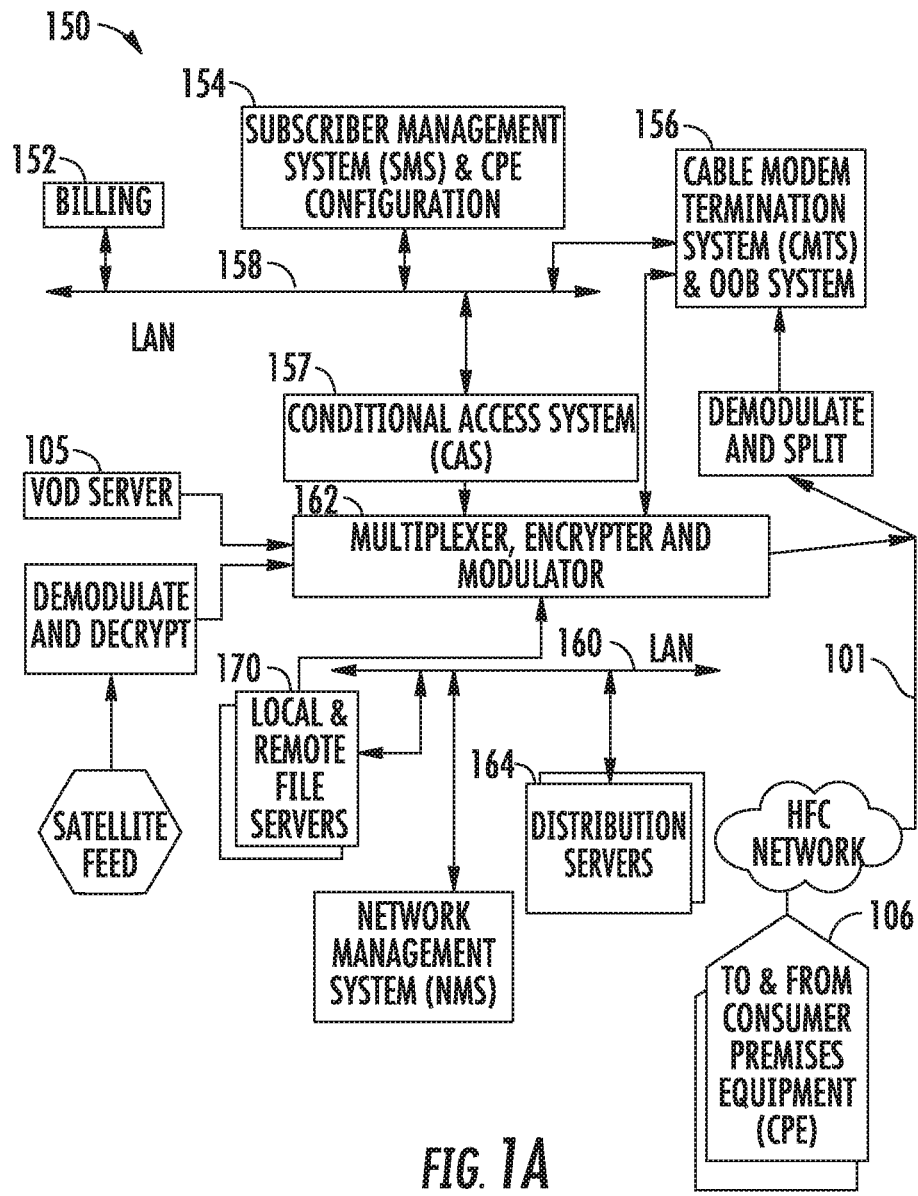
FIG. 1a is a functional block diagram illustrating one exemplary prior art HFC cable network headend configuration.
Figure 1B:
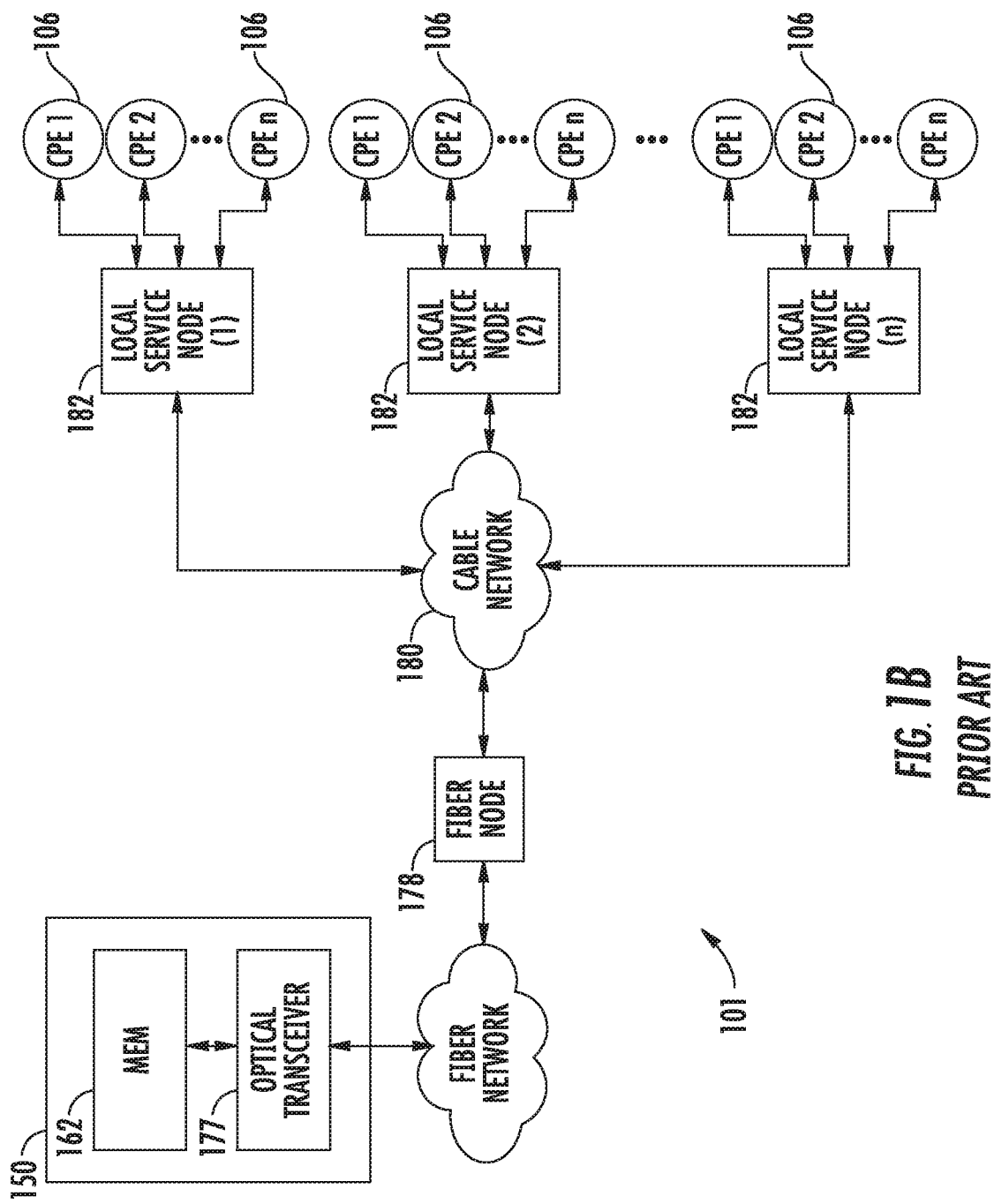
FIG. 1b is a functional block diagram illustrating one exemplary prior art local service node configuration.
Figure 1C:
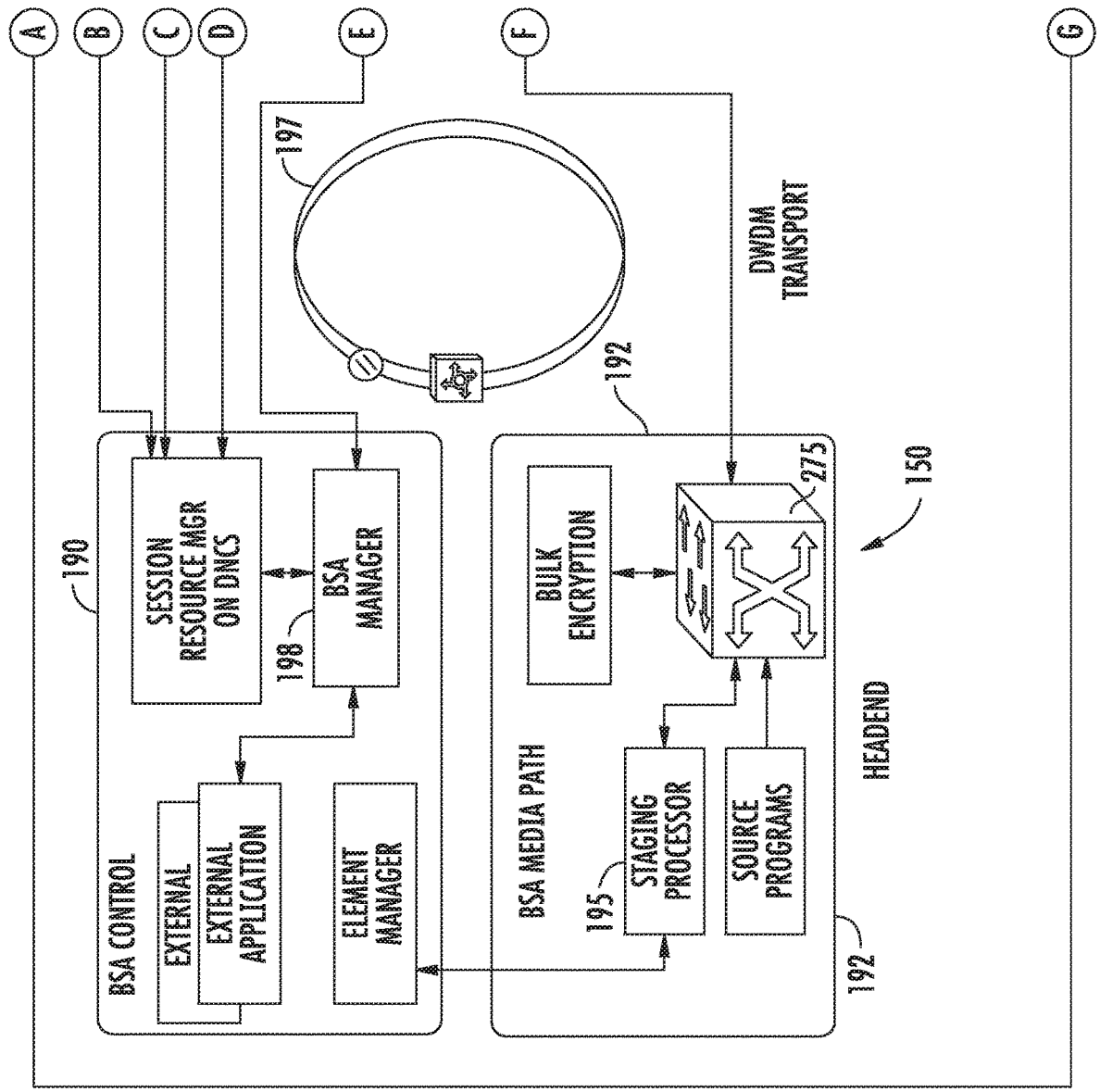
FIG. 1c is a functional block diagram illustrating one exemplary prior art broadcast switched architecture (BSA) network.
Figure 1C:
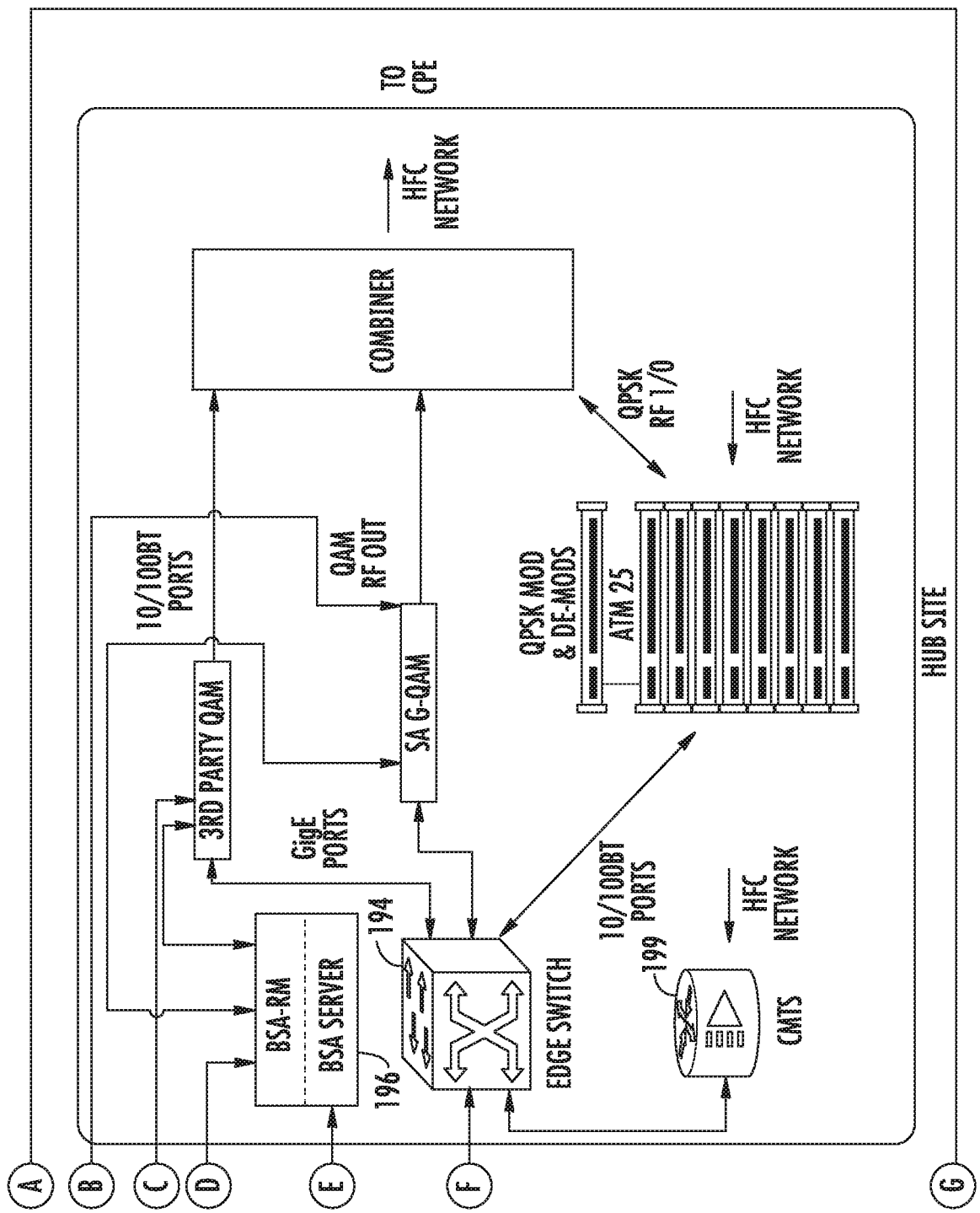

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Customer Premises Equipment (CPE)" refer to any type of electronic equipment located within a customer's or user's premises and connected to a network, including devices having access to digital television content via a satellite, cable, or terrestrial network. The term "customer premises equipment" (CPE) includes such electronic equipment such as (and without limitation) set-top boxes (e.g., DSTBs), televisions, cable modems (CMs), embedded multimedia terminal adapters (eMTAs), whether stand-alone or integrated with other devices, Digital Video Recorders (DVR), gateway storage devices (e.g., Furnace), and ITV Personal Computers.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multiple systems operator) that distributes programming to MSO clientele using client devices. Such programming may include literally any information source/receiver including, inter alfa, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, HFCu, or other terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, wireless networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (802.15), or IrDA families.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alfa, methods and apparatus for distributing content from a plurality of content sources, via a spectrum generation device to a plurality of subscribers. In one exemplary embodiment, the methods and apparatus of the present invention provide a technique for receiving digital content via a time-multiplexed network (such as Gigabit Ethernet), and converting the digital content to QAMs suitable for transmission over e.g., a Hybrid Fiber Coaxial (HFC) network. As described in greater detail herein, the conversion is performed by a substantially unified full spectrum generation device. Various aspects of the present invention advantageously enable physical consolidation and software management of content distribution.

In one aspect of the invention, the full spectrum generation device can replace a wide array of existing cable or terrestrial network infrastructure elements. Traditional equipment for splicing, mixing, etc. signals within the analog domain can be replaced by the full spectrum device, which executes the foregoing functions within the digital domain. Digital signal processing is much more power efficient, compact, and easy to manage (and remotely control) than its analog counterparts.

Additionally, digital signal processing enables higher quality reproduction of the content for the subscriber audience. Noise is introduced during analog signal processing stages; thus, performing signal processing within the digital domain maintains higher levels of fidelity over analog equivalents. By generating the entire spectrum directly from the digital content; the original content is maximally preserved, since there are no intermediate "analog" operations (e.g., combining, mixing, splicing, A/D or D/A conversion, etc.).

In one exemplary embodiment, a programmable full spectrum device converts digital content from a time-multiplexed network to a frequency-multiplexed network. The full spectrum generation device comprises a time-multiplexed network interface, a frequency-multiplexed downlink interface, and a programmable device (e.g., substrate) adapted to convert content from the frequency domain to the time domain. Additionally, as described in greater detail herein, various optional embodiments may include additional processors or logic to facilitate configuration of the programmable device by, inter alia, external or remote network entities.

In the exemplary embodiment, digital content is transformed between the domains (e.g., frequency to time) using an Inverse Fast Fourier Transform (IFFT). This transformation is provided by a substantially unified digital-domain processing edge device that generates the entire required spectrum (e.g., 54 MHz-1 GHz), and outputs RF or direct laser signals for delivery to subscribers. In one implementation, a single RF device per service group provides all services including analog, digital broadcast, VOD, switched digital content delivery, high-speed data, etc.). The RF devices (for each service group) are configured to support VOD and switched digital protocols, and share bandwidth across the different services. External "bulk encryptors" are utilized for broadcast, common-tier and session-based encryption.

The foregoing exemplary embodiment does not eliminate extant hierarchical service groups; rather, these groups are "virtualized" in the TDM domain, and subscribed to by the aforementioned unified edge device that performs the signal transformation to the FDM domain. The signal "combining" historically performed in the FDM domain is in one embodiment accomplished by the use of advanced Digital Signal Processing (DSP), Field Programmable Gate Array (FPGA), and Digital-to-Analog Converter (DAC) technologies (instead of RF combining/insertion with physical wires as previously described).

The use of the aforementioned unified edge device therefore advantageously: (i) resolves hubsite environmental constraints of space, power and cooling; (ii) simplifies and reduces narrowcast complexity; (ii) substantially obviates re-wiring for narrowcast services; (iii) provides a redundancy and resiliency for services; and (iv) provides a highly reconfigurable dynamic platform to support accelerated new service implementation or modification (higher service velocity).

Additionally, various interoperability aspects of the present invention support co-existence with legacy network infrastructures. Business models incorporating various aspects of the present invention are also described.

DETAILED DESCRIPTION OF EXEMPLARY EMBODIMENTS

Exemplary embodiments of the apparatus and methods of the present invention are now described in detail. While these exemplary embodiments are described for operation within hybrid fiber coax (HFC) cable or HFCu terrestrial networks, the general principles and advantages of the invention may be extended to other types of networks and architectures, whether broadband, narrowband, wired or wireless, terrestrial or space-based, or otherwise, the following therefore being merely exemplary in nature.

It is further noted that while described primarily in the context of a cable delivery system, the present invention is applicable to literally any network topology or paradigm. Furthermore, while example frequency bandwidths and timing schedules are described throughout, the invention is in no way limited to the specified frequencies, timing, etc. Such physical aspects of data transmission are subject to applicable standards, and may change in future incarnations, yet in no way are essential to practicing the invention.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

Moreover, while the exemplary full spectrum device is also herein referred to as an "edge" device, it is appreciated that the device is not limited to network edge applications. For instance, in one implementation, multiple full spectrum devices are placed at nodes upstream from the hubsites, so that their outputs can be routed to one or more downstream hubs simultaneously. Alternatively, smaller full spectrum generation devices can be implemented downstream, closer to (or within) the consumer premises. For example, spectrum generation at the consumer premises could support, inter alia, advanced network infrastructure (e.g., Ethernet over fiber, etc.) for legacy devices; the spectrum device generates legacy spectrum formats for legacy CPEs.

Other features and advantages of the present invention will immediately be recognized by persons of ordinary skill in the art with reference to the attached drawings and detailed description of exemplary embodiments as given below.

Design Features

As previously stated, prior art cable networks rely on a plethora of analog stages for single channel conversion, block up-conversion, comb channel insertion, etc. to insert narrowcast services piecemeal into the existing cable spectrum. In contrast, one exemplary implementation of the present invention converts Time Division Multiplexing (TDM) data streams from multiple source devices to Frequency Division Multiplexing (FDM) data streams consumed at multiple sink devices (e.g., CPEs). The unified edge device receives a number of input data streams via e.g., a Gig-E (Gigabit Ethernet) backbone, and transmits the entire cable spectrum (e.g., 54 MHz-1 GHz). The cable spectrum may be provided in RF, or direct laser output (for optical coupling). A single edge device can generate the entire frequency spectrum for supporting multiple subscriber "narrowcast" services e.g., Digitized Analog, Digital, Video-On-Demand (VOD), Switched Digital Video (SDV), High Speed Data (HSD), etc. The desired services (for the group of subscribers) are received at the edge device, converted to the frequency domain, and combined to form the entire spectrum transmitted to the served subscribers. Different modulation types (e.g., QAM, QPSK, etc.) are supported for the different services as needed.

Physical Consolidation

As will be readily appreciated the exemplary edge device substantially reduces (or eliminates) combining, cascading, splitting, mixing, etc. of the type performed under prior art implementations. Hardware for cascading, combining, filtering, etc. can consume tremendous amounts of RF energy, as well as space, electrical power, and other resources. Elimination of these intermediate stages greatly improves power consumption, while also reducing the physical/hardware "footprint" needed to provide equivalent service. Also, consolidation of spectrum generation within a single entity greatly reduces the wiring or cabling necessary. Less wiring corresponds to further reductions in power consumption, and minimizes human error (e.g., mis-wiring, faulty wiring, etc.). Power considerations directly impact space, cooling requirements and other physical restrictions. For example, one exemplary embodiment of the edge device described herein consumes on the order of 0.5 (point five) Amps, and occupies roughly one-half of a hubsite server Rack Unit (RU). Hence, very significant space and power savings are realized as compared to the prior art previously discussed herein (i.e., up to 2 (two) Amps and 20 (twenty) full racks).

Moreover, fewer components and cables generally translate to less opportunity for component failure, and hence enhanced reliability.

Furthermore, the reduction of intermediate stages greatly improves signal quality. The spectrum generated by the edge device has significantly higher fidelity than equivalent prior art structures. Prior art solutions for removing or adding narrowcast content required multiple intermediate stages for removing existing QAMs, adding new QAMs, etc.; each intermediate stage cumulatively adds additional noise. In contrast, the edge device described herein generates the entire spectrum directly from the digital content; the signal integrity is completely preserved, since there are no intermediate "analog" operations (e.g., combining, mixing, splicing, etc.).

Software-Based Support

In addition to the various physical advantages of edge device augmented networks, in one embodiment of the present invention, each edge device comprises a reconfigurable fabric for software programmable operation. Such reconfigurable fabric may be implemented for example using one or more Field Programmable Gate Arrays (FPGAs) or other Programmable Logic Devices (PLDs), or Reconfigurable Compute Fabrics (RCFs). Other variations may be virtualized within a multitude of dedicated processors, such as DSPs (Digital Signal Processors) or processor cores, Fast DACs (Digital to Analog Converters etc.

Consider traditional network "edges"; modifications to hub sites might range from changing service offerings to subscribers, to feature upgrades. In either case, technicians must be deployed physically to the hub site or other location to rewire the affected rack units. Further, in some cases, new hardware and software must be installed. Unfortunately, manual configuration is a time consuming, expensive and error prone process.

The edge device software configurability of the edge device of the invention has very significant implications for network maintenance and upkeep costs. Perhaps most notably, the edge device can be reconfigured entirely in software. For example, changing a standard definition (SD) channel to a high definition (HD) channel could be performed with a firmware update. Similarly, adding a new content source (e.g., VOD, SDV, etc.) might entail changing or adding an entry for the content source's network address.

In addition to being virtually instant and resistant to human error, reconfiguration can advantageously be performed remotely. Streamlined updating may be performed for the entire cable network, from any authorized network terminal (e.g., one disposed at the headend). Network management provides other flexible upgrade possibilities not previously possible; for example, one edge device could incorporate content from multiple devices maintained in remote facilities, where the content is specified entirely by network address. Such networked content may be leveraged to flexibly support unexpected "overflow" conditions, various demographics or geographics, or even trial installations.

Additionally, in certain embodiments, reconfiguration can be made entirely automated. Unlike manual procedures which require human upkeep and execution, automated reconfiguration may be useful to respond to certain "trigger" conditions, or efficiently shift resource allocations to satisfy real-time subscriber preferences. For example, unexpected peaks of demand for content can trigger automatic reconfiguration of resource allocations or service groups, without requiring technician intervention. This approach also helps provide enhanced network robustness to varying and unpredictable operating conditions, in that the network is dynamically adaptive and substantially "self healing".

Edge Device-Based Network Architectures

The edge device augmented network can receive a number of input data streams via e.g., a Gig-E (Gigabit Ethernet) backbone from multiple content sources within a content delivery network, and generate the entire frequency spectrum for a population of CPE. The exemplary edge device network is thus substantially "flattened" in comparison to typical hierarchical networks which use multiple stages of analog components to insert, mix, or remove channels in the analog domain. As previously described, since the entire spectrum is generated directly from the digital content, the introduction of noise from analog elements is reduced and/or nullified. The inventive network is truly "all digital" in terms of content processing.

Figure 2A:
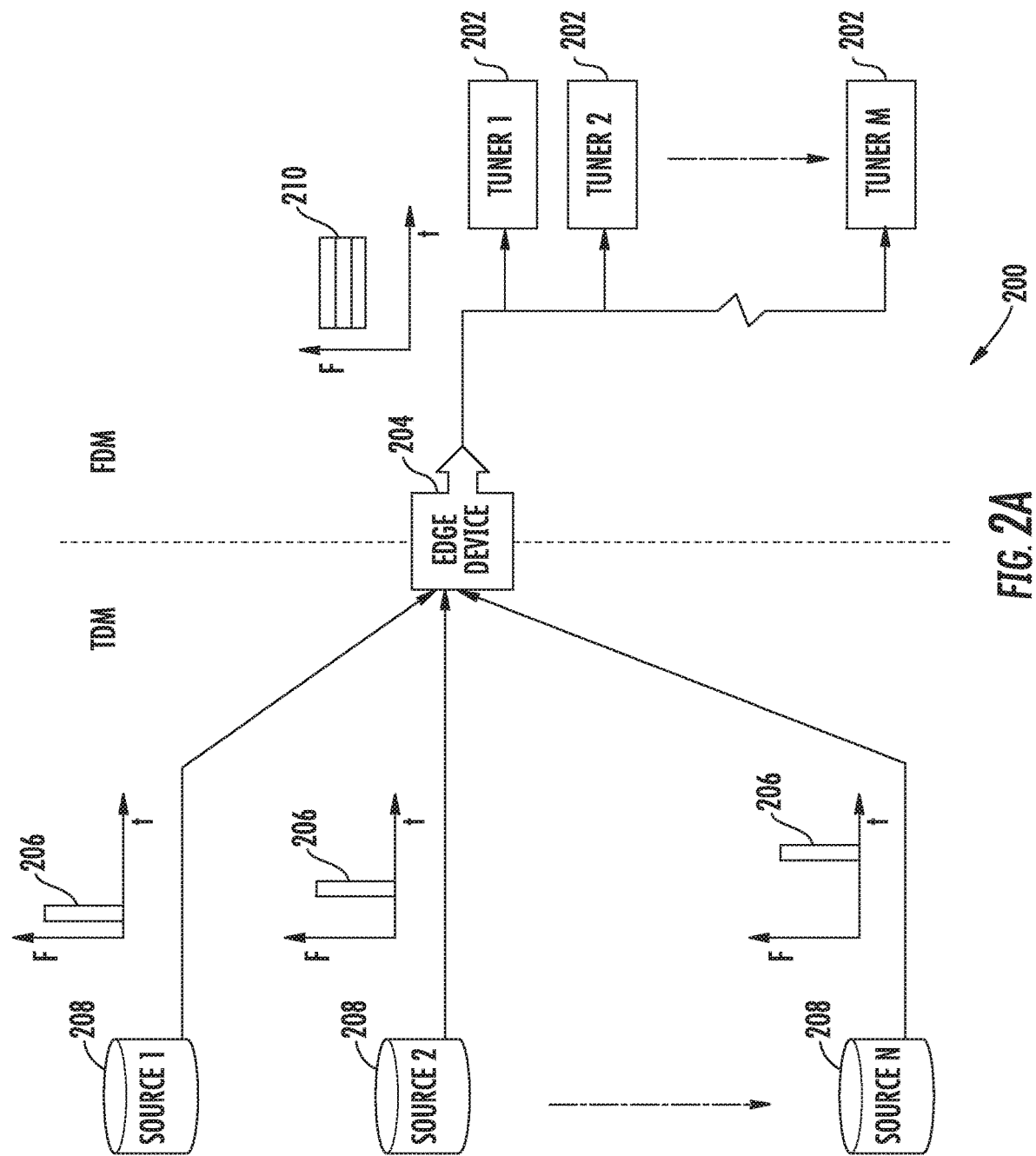
FIG. 2a is a graphical representation of the various domains within an exemplary network employing the edge device of the present invention.

FIG. 2a illustrates an exemplary content processing and distribution scheme 200 for one exemplary service group comprising a number of CPE in accordance with the present invention. As shown in FIG. 2a, a full spectrum edge device 204 receives time-multiplexed content 206 from a number of content sources 208, and generates the comprehensive spectrum 210 for a plurality of tuners 202 served by the service group. While the following discussions are described within a TDM-to-FDM based system, the multiplexing method is a design selection for one exemplary network implementation, and is not a required to practice the present invention. For example, in alternate embodiments, the full spectrum edge device may receive FDM streams and produce TDM outputs. Similarly, the full spectrum edge device may receive FDM streams and regenerate new FDM streams, or juggle scheduling for a number of TDM inputs to TDM outputs.

Moreover, it is appreciated that other multiplexing schemes may be used given the contents of the present disclosure. For example, current cable networks incorporate fiber optic cabling which use coarse wave division multiplexing (CWDM) schemes. CWDM is one variant of a family of wave-division multiplexing (WDM) technologies which multiplexes multiple signals using different wavelengths of light for each signal. Other WDM technologies include dense wave division multiplexing (DWDM), Ultra DWDM, etc. Thus, certain fiber optic embodiments of the present invention are adapted to convert multiple TDM streams to CWDM streams for transmission over fiber optic cabling.

Figure 2B:
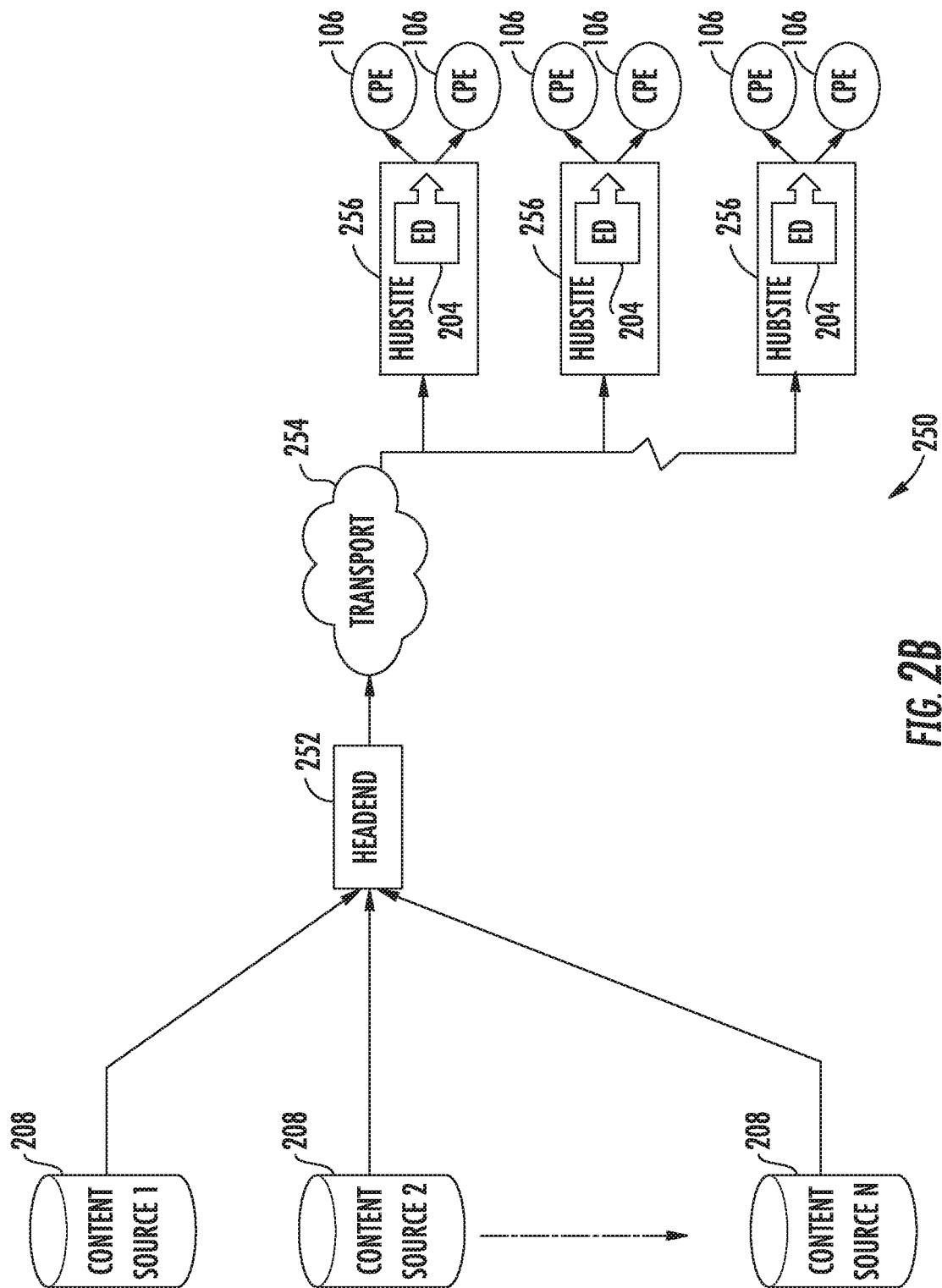
FIG. 2b is a functional block diagram illustrating a first network architecture useful with the edge device of the present invention, wherein the edge devices are disposed at one or more hubsites.

FIG. 2b illustrates one exemplary embodiment of a "flattened" network architecture employing the edge device 204. As shown, the network architecture 250 is generally comprised of a headend 252, a content transport portion 254, a plurality of hubsites or other distribution nodes 256, and a plurality of served CPE 106. In various implementations, the transport portion may comprise any number of different components and transport modalities. For instance, in one embodiment, the transport 254 comprises a Gigabit Ethernet (Gig-E) backbone of the types well known in the networking arts.

The Gig-E backbone is already resident in many extant cable and other network architectures, and hence can be used for packet-switched delivery of content to the various hubsites. For instance, the Gig-E backbone can carry one or more multiplexed content streams (somewhat akin to an MPTS, yet over the Gig-E packet switched domain and without an underlying MPEG container). These common streams can be broadcast (e.g., to all hubsites), or multicast (i.e., only to specific hubsites), or even unicast to one destination as desired, and accordingly may be heterogeneous or homogenous in terms of content carried.

In another embodiment, the transport portion may comprise one or more optical networks (e.g., CWDM, DWDM, Ultra DWDM, etc.) and other portions of the extant cable plant to distribute the multiplexed stream(s) to the various hubsites.

In yet another embodiment, a circuit-switched network could be used to carry the content to the various hubsites; e.g., Asynchronous Transfer Mode (ATM). As is well known, ATM employs 53-byte packets for payload delivery, yet carries these packets via logical pathways and circuits called VPIs and VCIs respectively.

As a further alternative, a wireless transport might be used; e.g., WiMAX (IEEE Std. 802.16) or millimeter wave system, or even satellite.

Disposed at each hubsite 256 are one or more full spectrum edge devices 204 of the type previously described. These devices: (i) demultiplex the time-multiplexed content streams delivered over the transport 254 into individual program streams; (ii) assign or allocate each of the program streams to a frequency resource (note that multiple program streams may be 25 assigned to the same resource if desired), and (iii) perform conversion of the streams to the time domain using e.g., an IFFT operation or other domain transformation. The edge device is configured with sufficient processing power (described below) to generate all portions of the requisite frequency spectrum simultaneously, in one variant using a plurality of parallel IFFT "engines" which can perform the requisite IFFT calculations at high speed to support the 30 domain transformation of large amounts of data (approximately 6.2 Gbps; i.e., 160 channels multiplied by 38.8 Mbps per channel) of streamed content.

CPE 106 (e.g., digital STBs, etc.) equipped with an RF tuner can tune to the appropriate portion of the generated spectrum to receive and demodulate the program stream of interest, akin to a normal STB arrangement. For example, current cable networks dedicate an additional channel for carrying system information (e.g., current programming information, etc.). Exemplary embodiments provide a dedicated QPSK (Quadrature Phase Shift Keying) modulated channel; this control channel provides system data via well known protocols e.g., ALOHA access protocols (e.g., pure ALOHA, slotted ALOHA, etc.), and DAVIC (Digital Audio Video Council) protocols, although it will be appreciated that other approaches may be used consistent with the invention.

In some embodiments, the full spectrum edge device 204 aligns itself with received system information. For example, the full spectrum device may receive current programming information from a higher network entity. After programming its internal channel interfaces, the full spectrum edge device provides the resultant spectrum, and the accompanying control channels to the service group, consistent with the received system information.

In alternate embodiments, the full spectrum edge device 204 generates the control channel internally, based on its internal operations. For example, the full spectrum device may dynamically assign program streams to various frequency resources. Thereafter, the full spectrum edge device also generates the programming information, such that its serviced CPEs can track current programming, transparent to the customer. In one such example, the full spectrum edge device can flexibly assign content to any number of channels; the CPE is notified (via control channel) of current programming. When the customer selects content of interest, the CPE references its internal record (which matches content to channels), and accesses the proper channel.

Figure 2C:
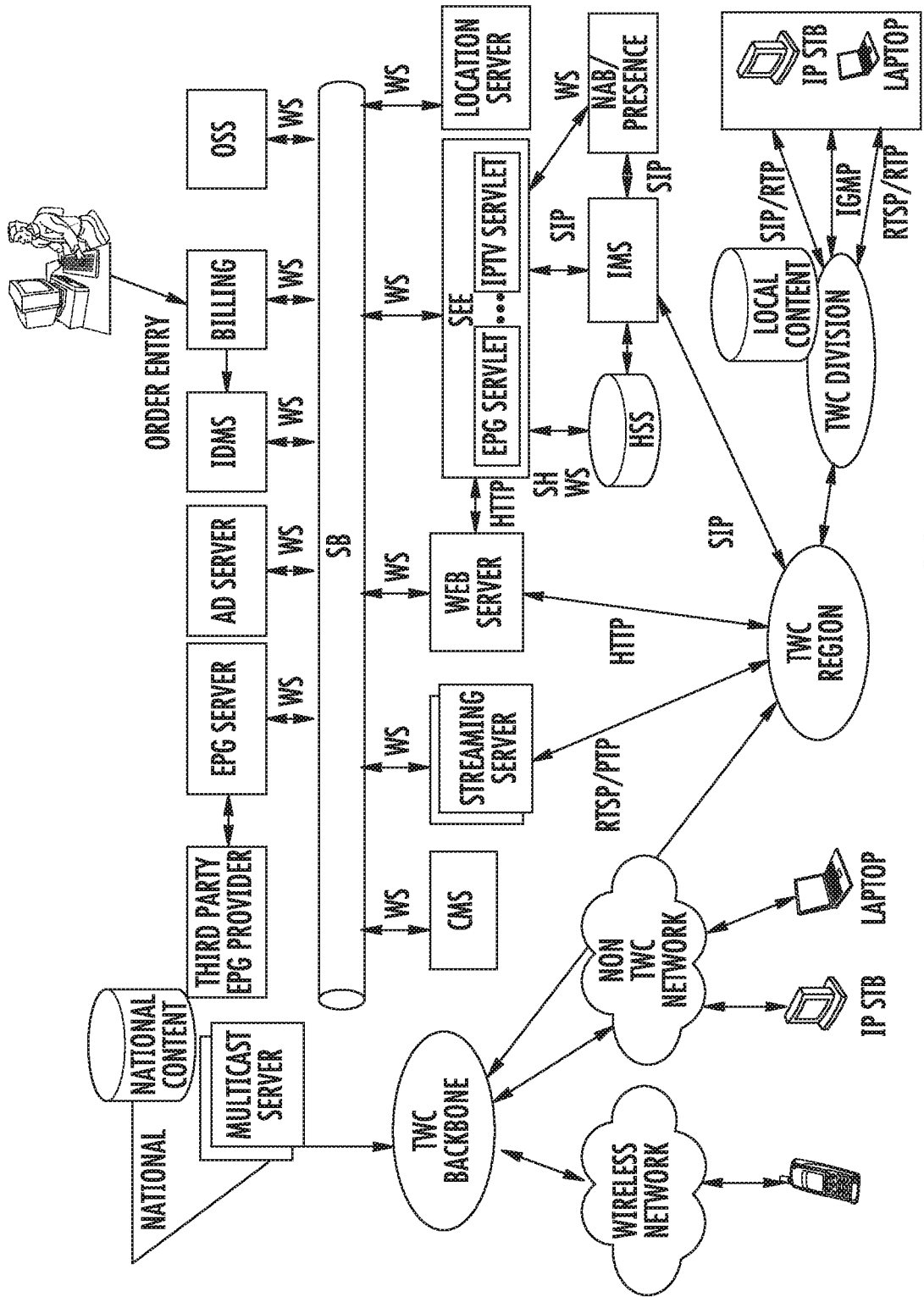
FIG. 2c is a functional block diagram illustrating another exemplary network configuration useful with the edge device of the present invention, this configuration being substantially optimized for packetized (e.g., IP-encapsulated) content distribution and delivery.

While the foregoing network architectures described herein can (and in fact do) carry packetized content (e.g., IP over MPEG for high-speed data or Internet TV, MPEG2 packet content over QAM for MPTS, etc.), they are often not optimized for such delivery (i.e., an all-IP model). Hence, in accordance with another embodiment of the present invention, a "packet optimized" delivery network is used for carriage of the packet content (e.g., IPTV content). FIG. 2c illustrates one exemplary implementation of such a network, in the context of a 3GPP IMS (IP Multimedia Subsystem) network with common control plane and service delivery platform (SDP), as described in U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK, incorporated herein by reference in its entirety. This architecture makes pervasive use of IP-protocol content of all types (i.e., high speed data, IPTV content, etc.), with IP being the common network protocol so as to permit various types of functions including converged services and platforms, mobility, high service velocity, etc.

In the case of the edge device of the present invention, the multiplexed content stream received at each hub site may be encapsulated within an IP "wrapper" (as well as its native lower layer protocol; e.g., Gig-E), akin to IP-packetized content being carried over an Ethernet LAN, Wi-Fi bearer, etc. In some embodiments of the present invention, the multiplexed content stream is transmitted by the edge device "as is"; i.e., the encapsulated content is transmitted in encapsulated form to the subscriber CPE, service group, etc. In alternate embodiments, the multiplexed content is extracted and transmitted. In some variants, the extracted content may be re-encapsulated with a new IP wrapper, or otherwise re-coded for transmission.

One exemplary delivery paradigm using the network of FIG. 2c comprises delivering MPEG-based video content, with the video transported to user PCs (or IP-based DSTBs) over the allocated portion(s) of the frequency spectrum comprising MPEG (or other video codec such as H.264/AVC) over IP over a container (e.g., MPEG). That is, the higher layer MPEG-2, H.264 or other encoded content is encapsulated using an IP protocol, which then utilizes an MPEG packetization of the type well known in the art for delivery over the RF channels.

Those of ordinary skill in the related arts will readily appreciate the benefits of the present invention and the potential future innovations in content distribution networks enabled therefrom. For example, in the aforementioned all IP network, consider a hubsite that supports DOCSIS 3.0 for a prototype consumer audience (e.g., twenty (20) service groups). As deployment matures over time, the number of service groups will increase in size and shrink in number of consumer's serviced, conceivably until each CPE has a personal service group (several hundred). Using prior art rollout methods, each new service group requires rewiring, restacking, etc. In contrast to prior art solutions, one embodiment of the present invention can be dynamically and remotely reprogrammed to adjust its operation according to this model.

Figure 2D:
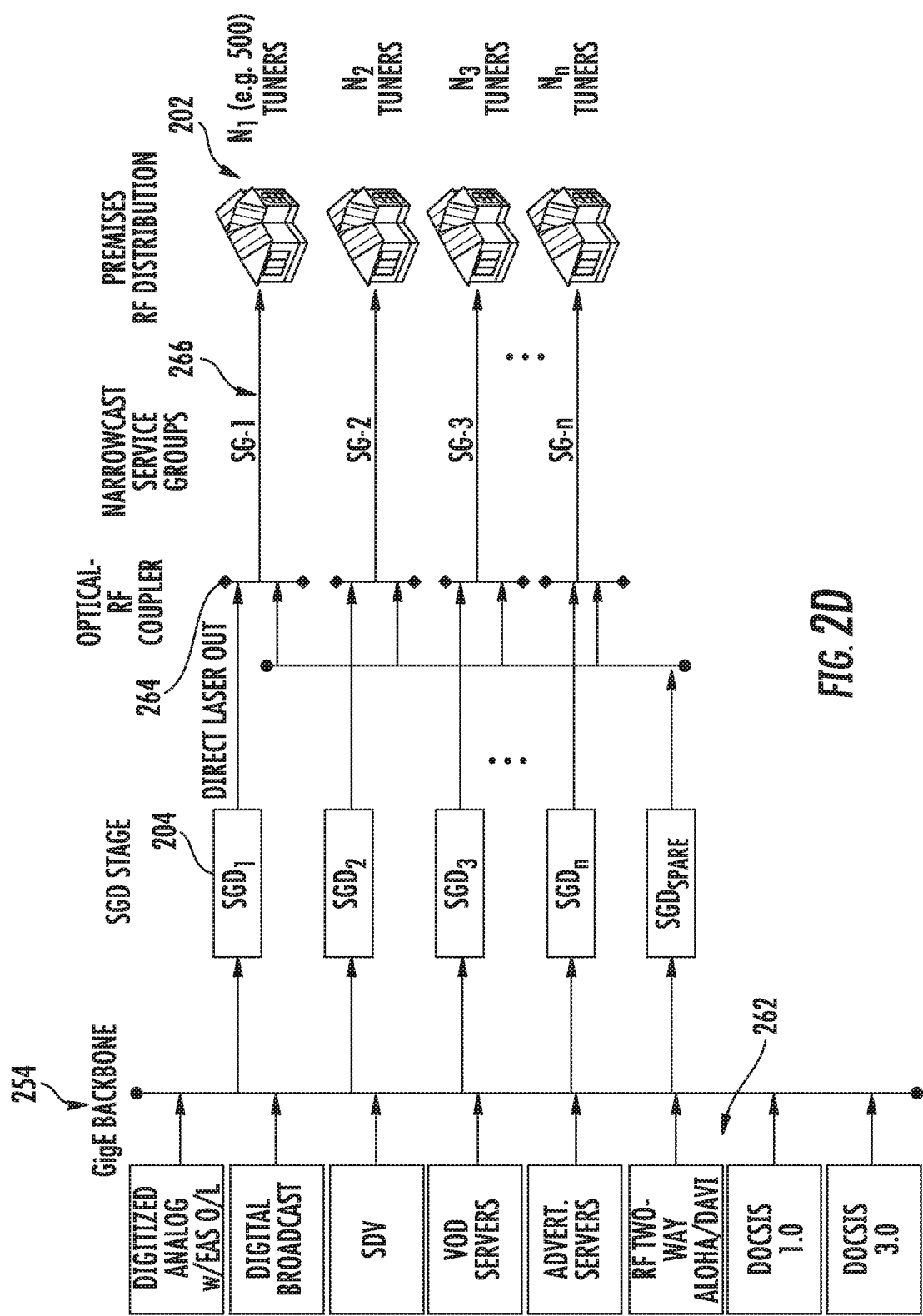
FIG. 2d is a functional block diagram illustrating another embodiment of a network architecture according to the present invention.

FIG. 2d illustrates a first embodiment of a high-level network architecture according to the invention. As shown, a plurality of content signal sources 262 feed a transport network (e.g., GigE) 254, which supplies input to the SGD stage having a plurality of SGDs 204. The embodiment of FIG. 2d notably utilizes a direct laser (optical domain) output from the SGD 204 into the downstream network and narrowcast service groups 266. A 1-to-1 laser-to-node ratio is utilized in this embodiment, although other ratios (e.g. 1-to-N) may be utilized consistent with the invention. The SGD outputs modulated digitized analog, as well as digital broadcast, SDV, VOD, RF two-way, and DOCSIS 1.0 and 3.0 signals in the optical domain. These optical domain signals are then converted to the RF domain via one or more optical-RF couplers 264 of the type well known in the networking arts. Delivery to the tuners 202 of the premises is then effected via normal RF transport (e.g., indigenous cable plant infrastructure). Alternatively, delivery to the premises may utilize FTTx (e.g., FTTH, FTTC or the like) optical fiber delivery.

Figure 2E:
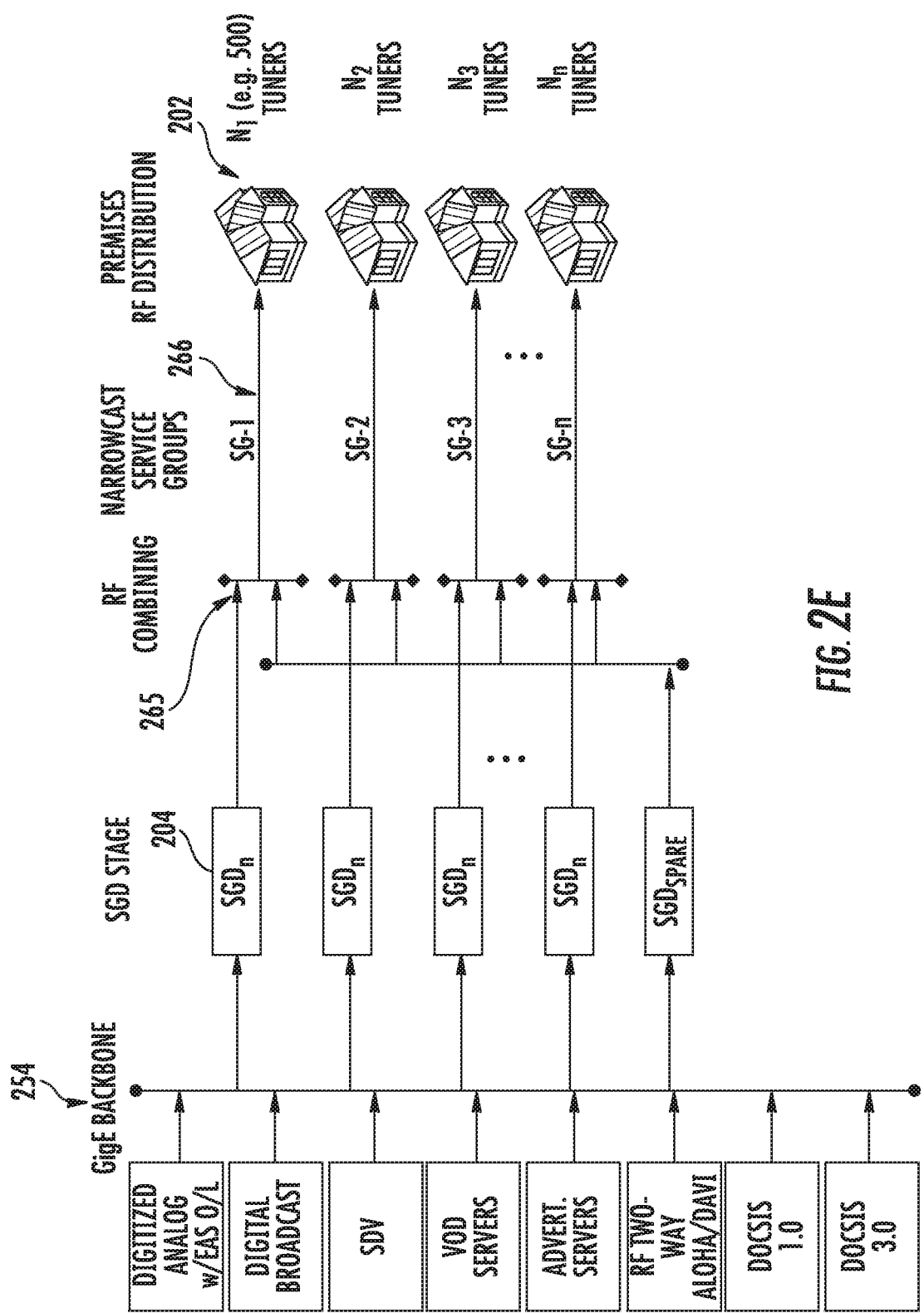
FIG. 2e is a functional block diagram illustrating yet another embodiment of a network architecture according to the present invention.

In contrast, the architecture of FIG. 2e utilizes an RF domain output from the SGDs 204 to one or more RF combiners 265, and then to the respective service groups 266.

Figure 2F:
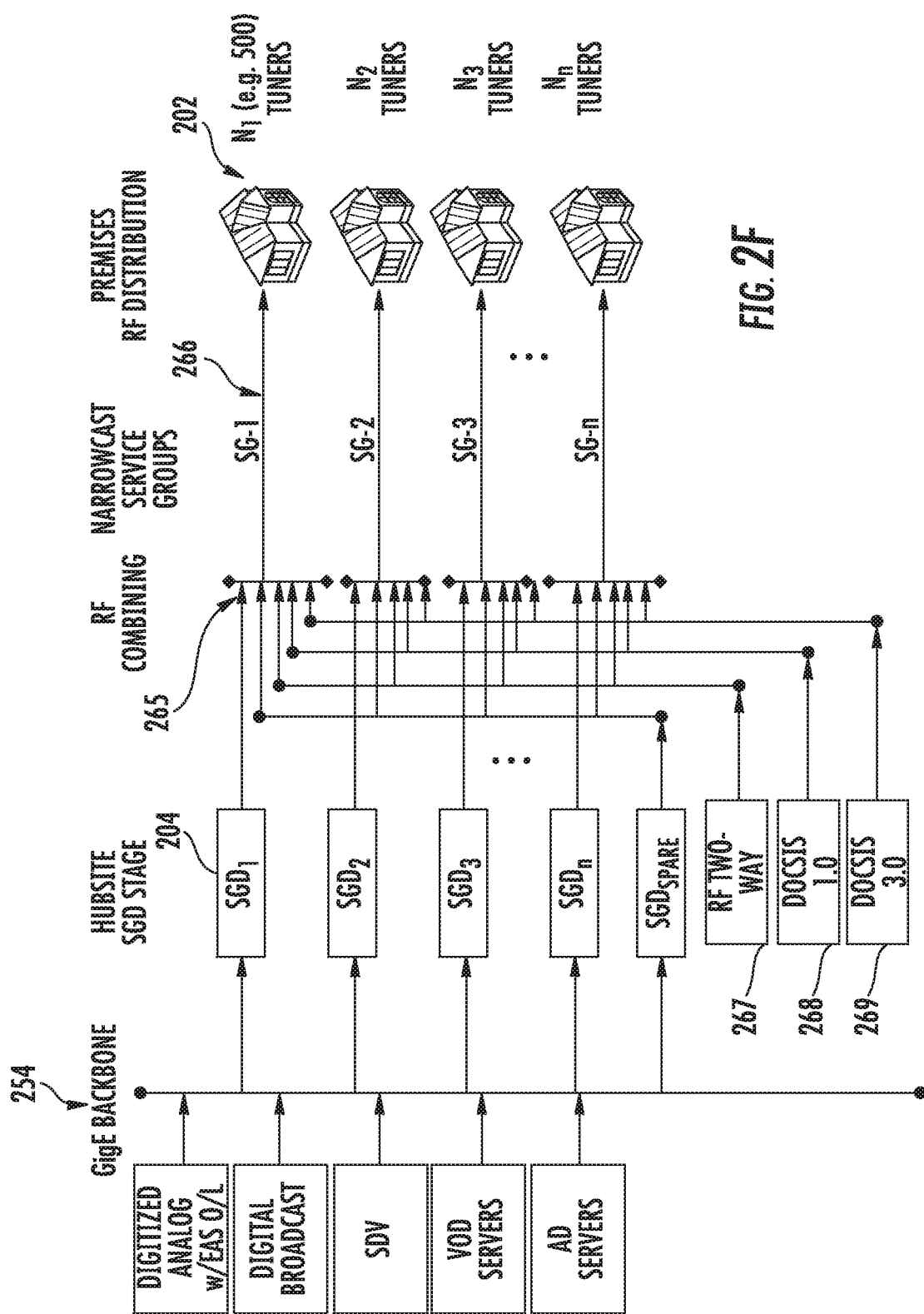
FIG. 2f is a functional block diagram illustrating yet a further embodiment of a network architecture according to the present invention.

In the embodiment of FIG. 2f, an RF output from the SGDs 204 is utilized (and one or more RF combiners 265, as in the embodiment of FIG. 2e); however, the two-way RF communications 267 and DOCSIS functionality 268, 269 are removed from the SGD 204, and provided via separate functionality (e.g., through existing CMTS).

FIGS. 2g-2j illustrate various content and signal flows within the generalized architectures of FIGS. 2d-2f. The various components of the illustrated architecture include: (i) one or more receivers 274 which provide satellite acquisition; (ii) one or more encoders 275 that convert analog signals to digital; (iii) one or more dampers 276 which convert digital variable bitrate (VBR) signals to constant bitrate (CBR) or "clamped" signals; (iv) one or more MPEG overlay entities 277, which provide bulk graphics and video overlay of MPEG (e.g., EAS); (v) one or more VOD servers 105 which provide CBR MPEG streaming engines for Movies On Demand (MOD) or On Demand (OD) content; (vi) one or more DPI servers 272 which provide CBR MPEG streaming engines for advertisement and other secondary content insertion; (viii) one or more splicers 278 that insert advertisements and other secondary content into program streams; (ix) one or more network encryptors 279 or session encryptors 281 that apply encryption to digital signals; (x) one or more "bulk" statistical multiplexers 280 that optimize digital channel loading via statistical multiplexing processes; and (xi) one or more SGDs 204 as previously described, which are in the exemplary configuration TDM-to-FDM transformers.

Figure 2G:
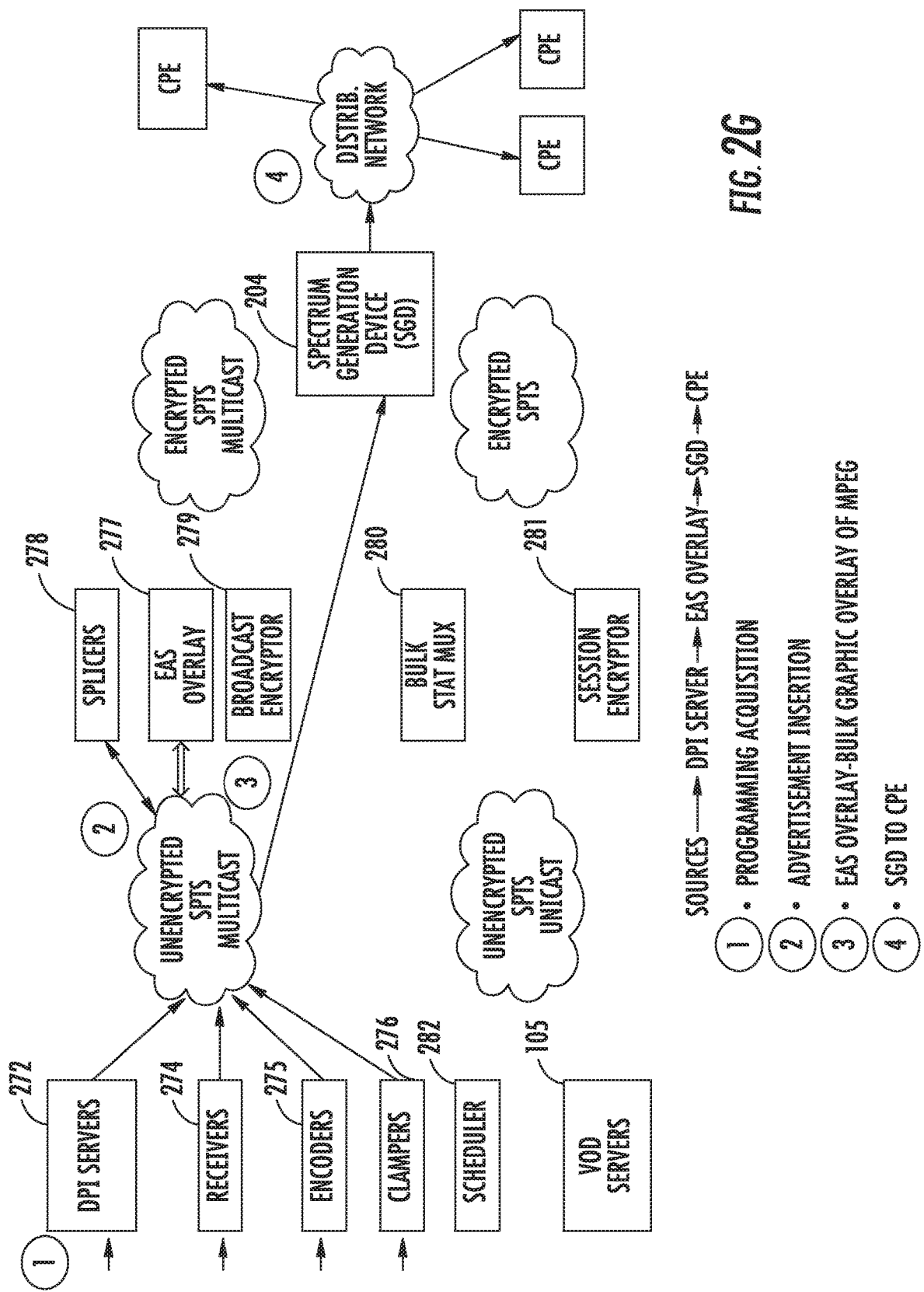
FIG. 2g is a logical block diagram illustrating the signal flow for analog broadcast content delivery within one exemplary architecture of the network.

Specifically, FIG. 2g illustrates analog broadcast signal flow, from one or more sources 270 and via a digital program insertion (DPI) server 272. A bulk overlay (e.g., EAS) is applied to the unencrypted single program transport stream (SPTS) multicast, and the resulting signals sent to the SGD 204 for conversion to the time domain as previously described.

Figure 2H:
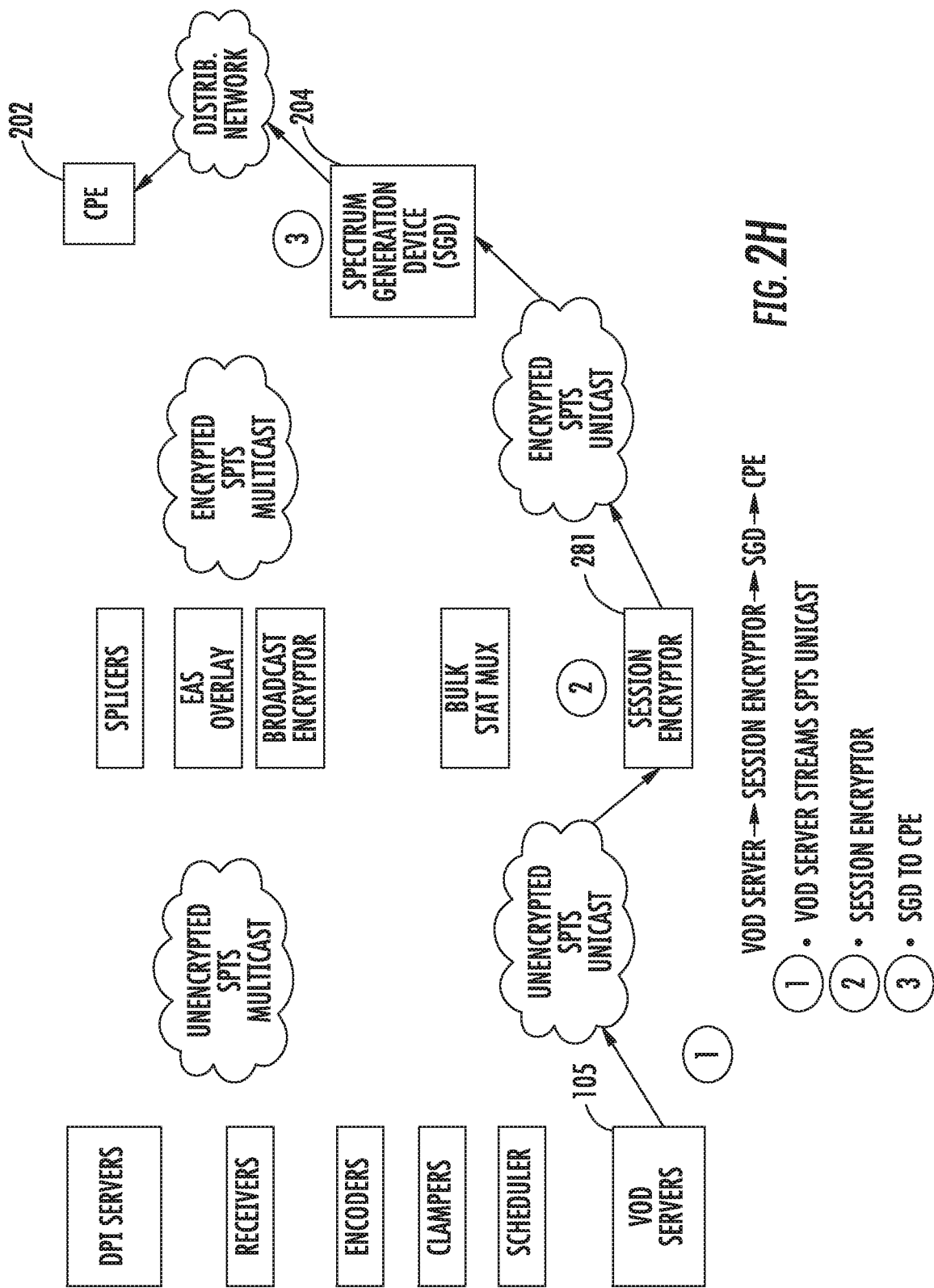
FIG. 2h is a logical block diagram illustrating the signal flow for VOD content delivery within one exemplary architecture of the network.
Figure 2I:
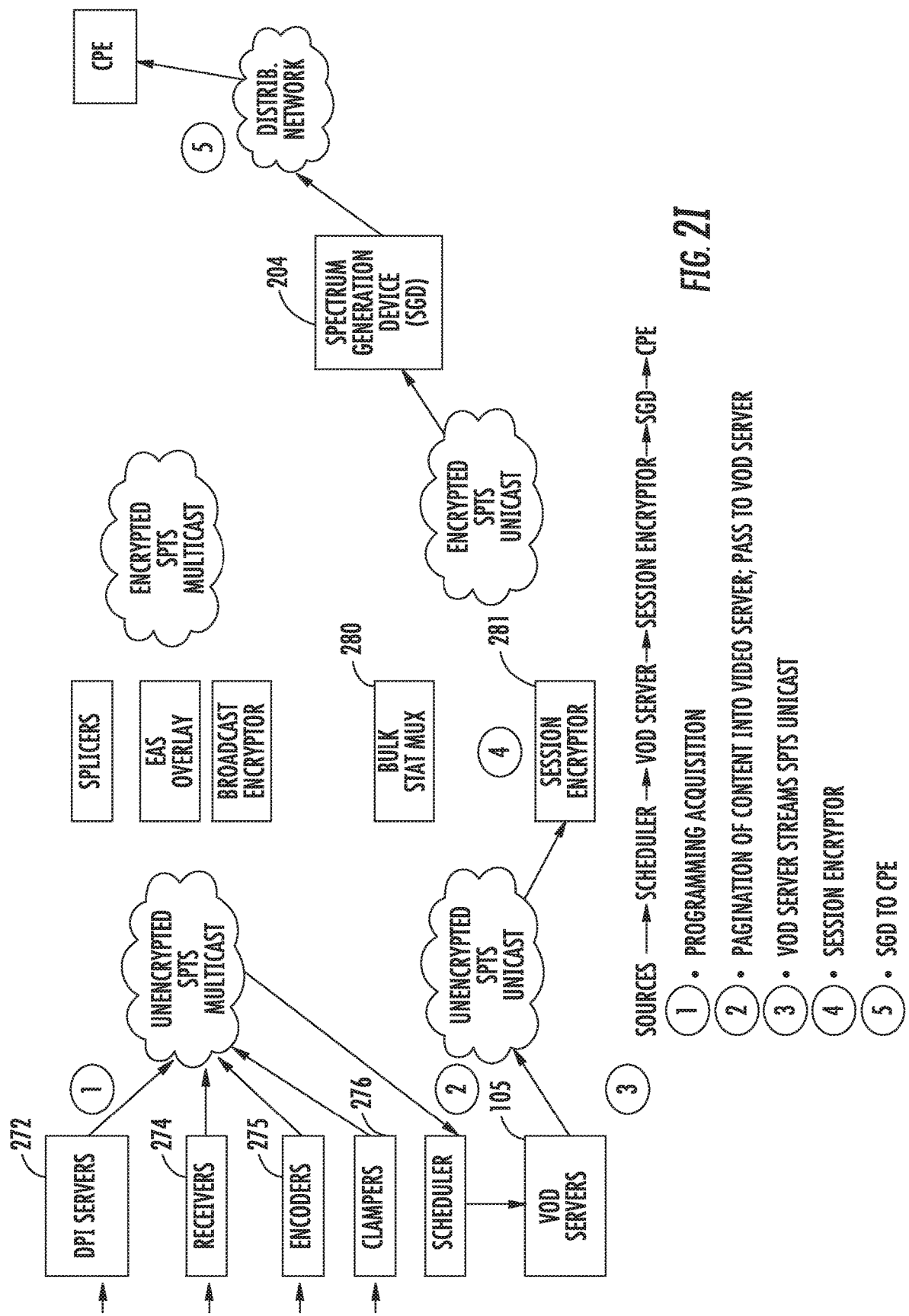
FIG. 2i is a logical block diagram illustrating the signal flow for VOD with "start-over" functionality within one exemplary architecture of the network.

FIG. 2h is a logical block diagram illustrating the signal flow for VOD content delivery within one exemplary architecture of the network. As shown, the content resident on the VOD server 105 is streamed as an unencrypted SPTS to a session encryptor 281 for encryption. The encrypted content is then converted by the SGD 204 to the time domain, and distributed as a unicast to the relevant service group for delivery to the requesting CPE. FIG. 2i is a logical block diagram illustrating the signal flow for VOD with "start-over" functionality within one exemplary architecture of the network. As shown, the content is ingested from one or more sources, and the DPI server 272 inserts advertisements or other secondary content to form an unencrypted SPTS multicast. This SPTS is provided to a scheduler 282 (e.g., such as the exemplary Sectamus device of the Assignee hereof). The automated scheduler 282 provides pagination (i.e., segmenting of the continuous incoming broadcast streams into program files) and implements business rules for the content and determines which programs will be passed to the VOD system and written to storage. The scheduler may also be configured to apply the appropriate metadata content (title, rating, starring actors, etc.) to the program as it is being prepared for "start-over" delivery. The VOD server then streams the SPTS unicast to the session encryptor 281 for encryption, and then the SGD 204 for transformation and delivery as a unicast.

Figure 2J:
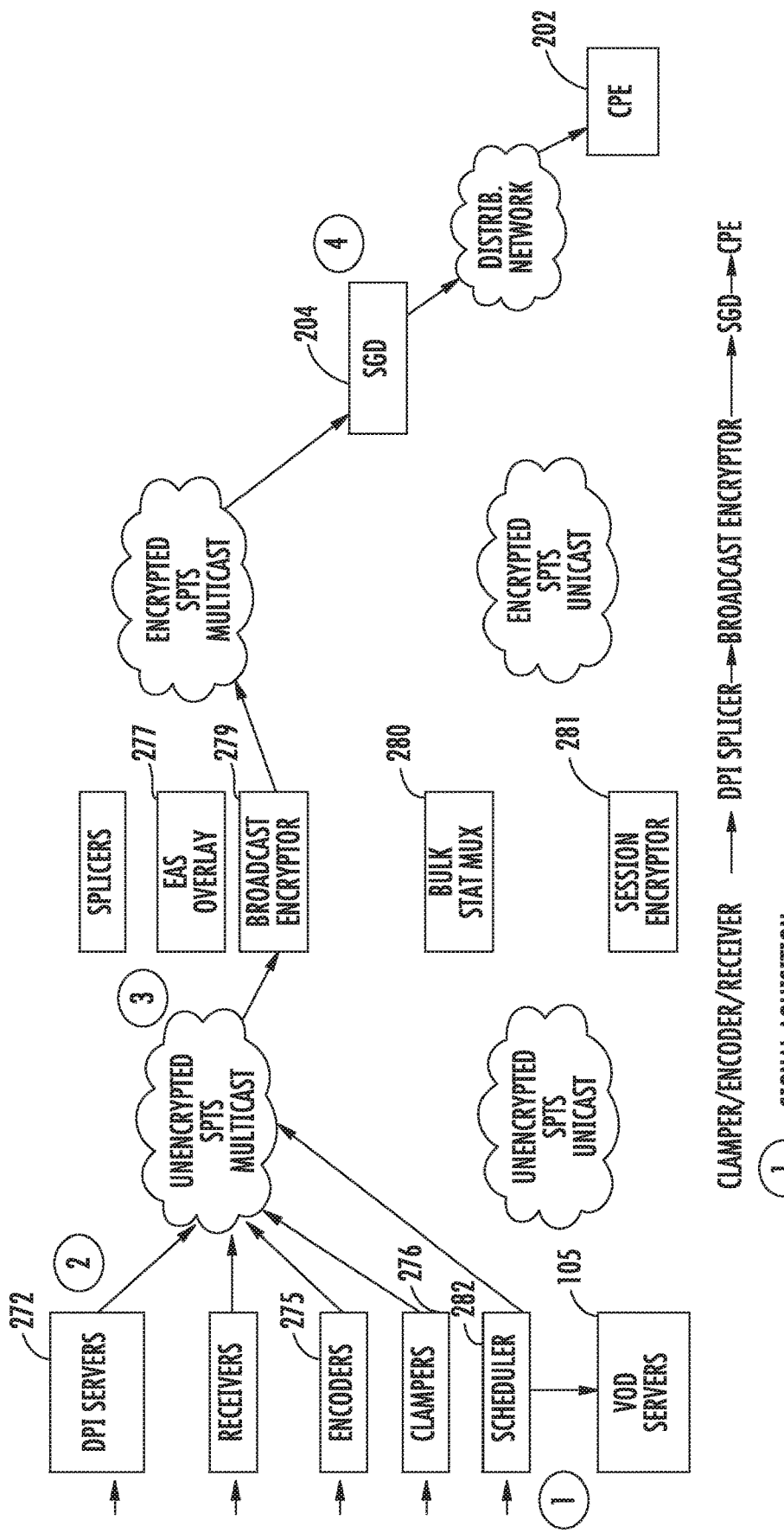
FIG. 2j is a logical block diagram illustrating the signal flow for switched (e.g., SDV multicast) content delivery within one exemplary architecture of the network.

FIG. 2j is a logical block diagram illustrating the signal flow for switched (e.g., SDV multicast) content delivery within one exemplary architecture of the network. As shown, the content is ingested from one or more sources and converted to digital domain as required by the encoder 275, and clamp the VBR signal to a CBR using the clamper(s) 276. The DPI server 272 inserts advertisements or other secondary content to form an unencrypted SPTS multicast. The unencrypted SPTS multicast is then provided to the bulk (network) encryptor 279, where it is encrypted and provided to the SGD 204 for transform and multicast distribution.

Spectrum Allocation

Figure 3:
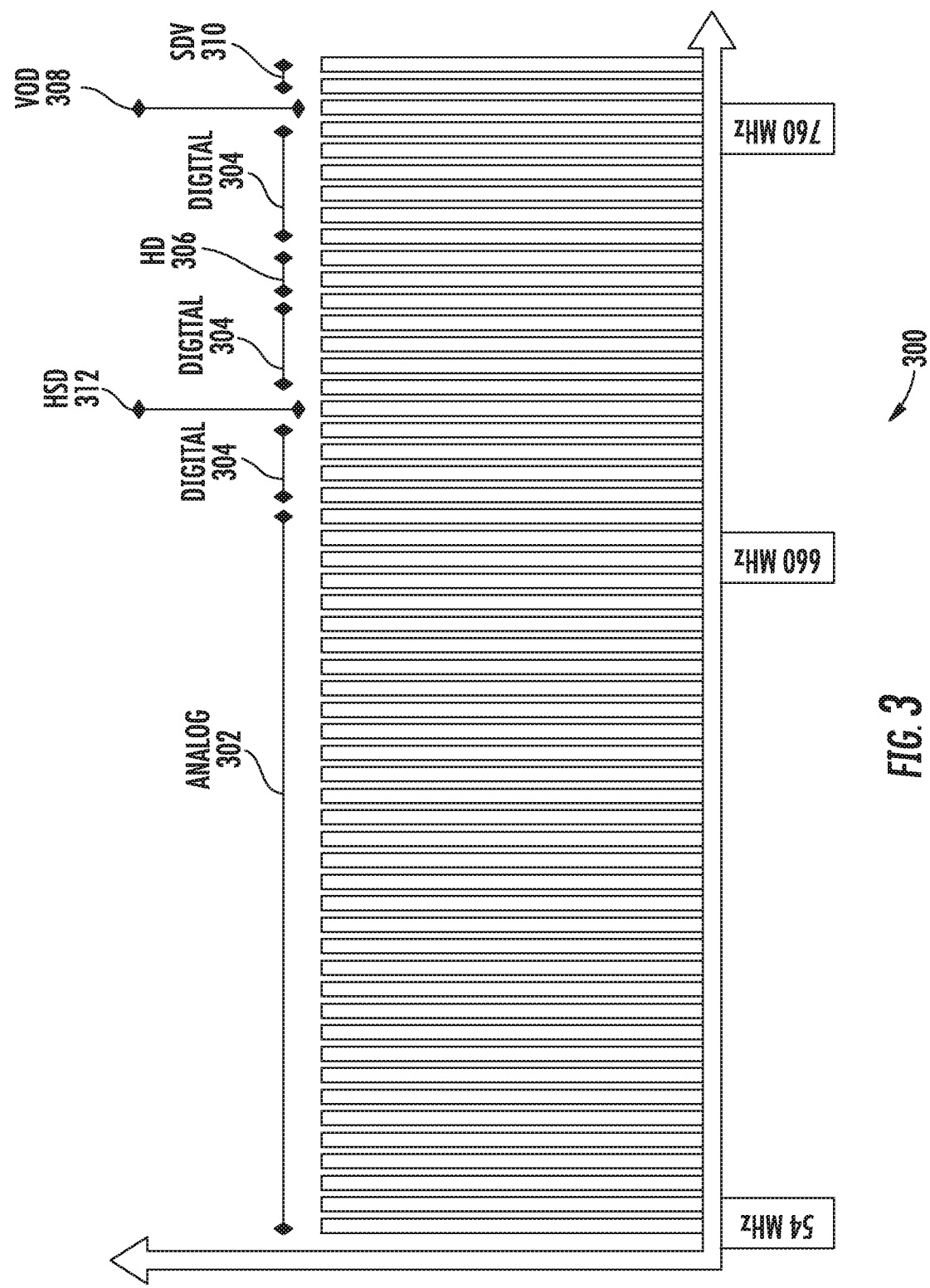
FIG. 3 is a prior art spectrum allocation illustrating the various deficiencies of prior art cable network content distribution.

FIG. 3 is a representation of one prior art RF spectrum 300. Current North American cable television frequency spans from 54 MHz to 1 GHz. As shown, the prior art implementations intermix channel allocations across the bandwidth using comb insertion filters, splicing, mixing, etc. For example, HSD 312, HD 306, SDV 310 and VOD 308 services are "shoehorned" into available channels. Certain higher bandwidth applications prefer contiguous and/or adjacent bandwidths. The highly heterogeneous allocations are difficult to modify; for example, changing the allocations for resources, or moving channels affects many other channels. Similarly, block up-conversion for narrowcast QAMs can further complicate channel calculations; up-conversion requires adjacent 6 MHz slots in blocks of 2, 4, 8, 12, or 16.

Figure 4:
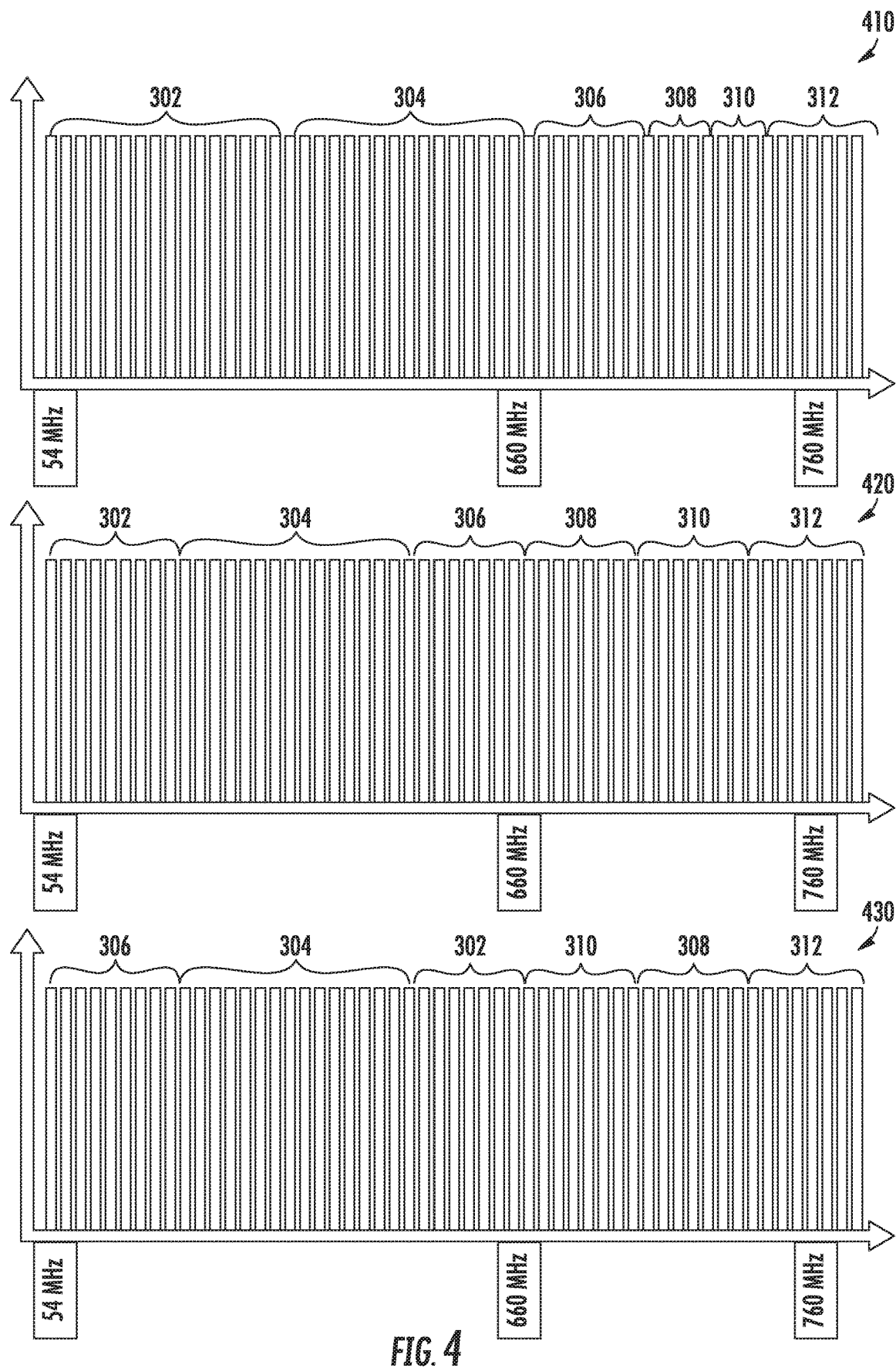
FIG. 4 is a graphical illustration of several spectrum allocation configurations enabled by one exemplary embodiment of the present invention.

In contrast to the prior art spectrum of FIG. 3, FIG. 4 illustrates several possible spectrum allocations according to the present invention, corresponding to different software configurations. Consider a first software configuration 410, which has neatly aggregated different content types together. As shown, analog channels 302, digital channels 304, High Definition (HD) channels 306, Video on Demand (VOD) channels 308, Switched Digital Video (SDV) 310, and High Speed Data (HSD) 312 are grouped together (the illustrated configuration is simplified for purposes of illustration).

A second software configuration 420 has a different spectrum allocation from the first spectrum. As shown, more channels are allocated for HD 306, VOD 308, SDV 310, HSD 312, and analog channels 302 are reduced.

Similarly, a third software configuration 430 juggles the various allocations arbitrarily (HD has been swapped with analog channels, VOD and SDV have also been swapped). In fact, a myriad of possible software configurations can be used to control the appropriate network utilization. Channel allocations can be dynamically reprogrammed to easily accommodate on-the-fly block up-conversion, channel juggling, and changes to service offerings.

In contrast to prior art network management, various embodiments of the present invention control spectrum allocation with software configuration. Changes to spectrum allocation are resolved in software (e.g., updating a configuration file, changing operational parameters, etc.). Similarly, embodiments of the present invention do not require any rewiring or rerouting of hardware at the hub site or otherwise; instead, configuration changes are software updates that parameterize the conversion from digital content to individual frequency channels.

Edge Device Apparatus

Figure 5:
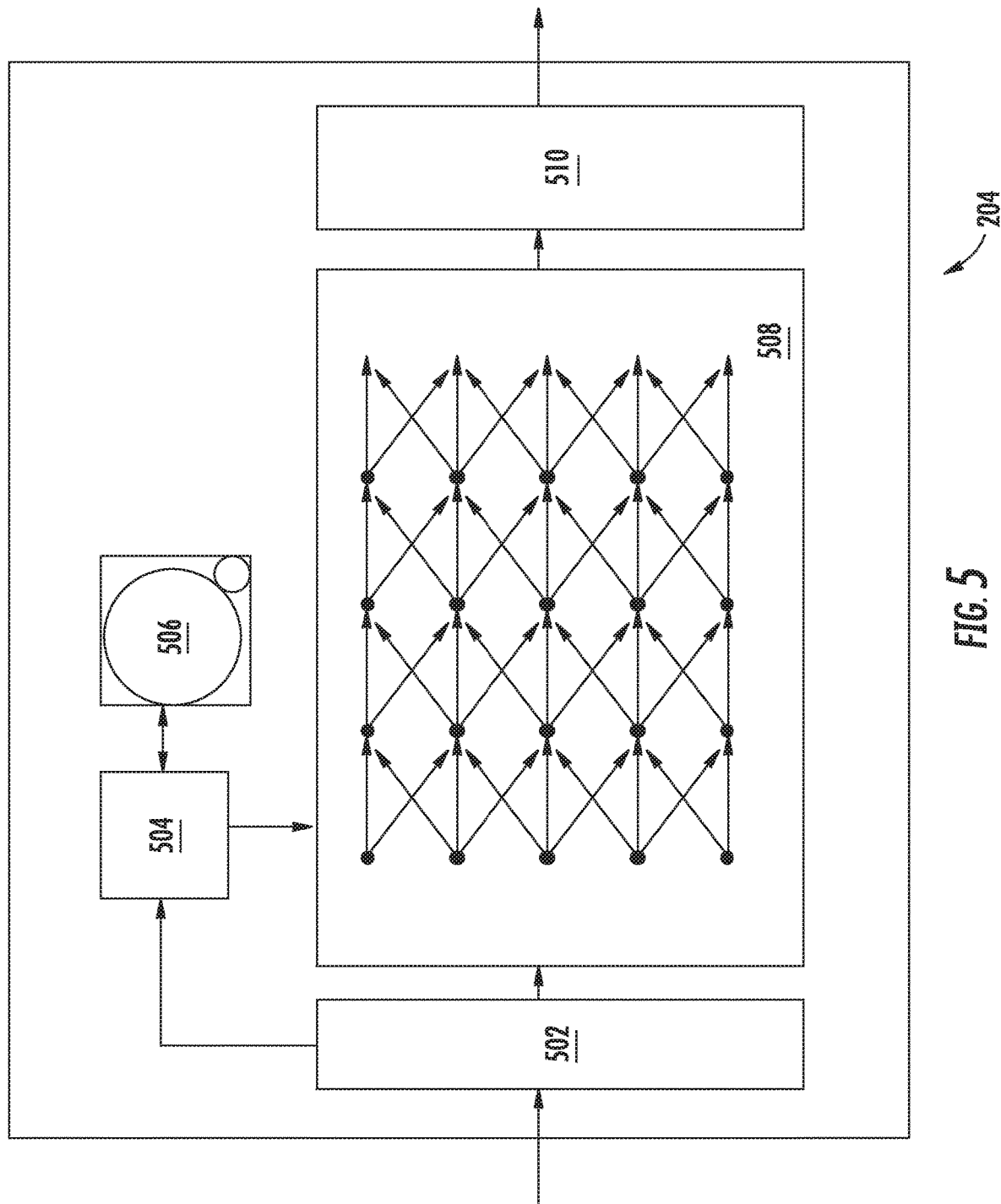
FIG. 5 is a graphical representation of one exemplary embodiment of a spectrum generation device, in accordance with the present invention.

FIG. 5 is a graphical representation of one exemplary implementation of a full spectrum edge device 204 according to the invention. The device 204 includes a network interface 502, a processor subsystem 504 and its associated storage 506, a programmable substrate 508, and a downstream interface 510 for delivering content to recipient devices (e.g., CPEs 202). Each of these components is described in greater detail subsequently herein.

The device 204 of FIG. 5 is merely representative of features and operations of a full spectrum edge device, and design or configuration changes necessary for other network technologies are readily appreciated by those of ordinary skill given the present disclosure.

The illustrated device 204 can assume literally any form factor. One exemplary embodiment is adapted for rack use. Alternate embodiments may be integrated in whole or part (e.g., on a common functional basis) with other devices if desired.

Network Interface

In one embodiment, the network interface 502 of the edge device schedules and/or receives subscriber content for transmission. The network interface may queue data, receive streaming data, handle just-in-time reception of content, etc. In one variant, the subscriber content is received from one or more data sources via the network interface. The data sources may generate the content locally, or alternatively act as a gateway or intermediary from another distant or third party source. Examples of such data sources may include other networked servers for Digitized Analog, Digital, Video-On-Demand (VOD), Switched Digital Video (SDV), High Speed Data (HSD), etc.

In the following discussions, a packet-switched network interface is disclosed in detail. In alternative embodiments, the network interface may be circuit-switched. Packet-switched data delivery has unpredictable hops, and variable delays; however, packet-switched networks efficiently allocate network bandwidth, and flexibly resolve network congestion. In contrast to packet-switched networks, circuit-switched networks maintain dedicated connections of constant bit rate and constant delay between nodes. Circuit-switched networks may also carry packetized data (e.g., ATM with VPI/VCI). Circuit-switched networks are generally reliable, but also generally less efficient. The tradeoffs and design considerations for circuit-switched and packet-switched networks are well understood within the relevant arts; modifications to the present invention for use with circuit-switched networks are well within the skill of the ordinary artisan, given the contents of the present disclosure.

In the previously described exemplary embodiment of FIG. 2, the network interface 502 is based on a Gigabit Ethernet (Gig-E) interface. Gig-E is a packet-switched technology, i.e., blocks of data are sent and received via a "cloud" of connections within a network. Each networked device is given a unique MAC (Medium Access Control) address, and routing is performed on a hop-by-hop basis (MAC addresses are included in every data packet to specify both the destination and the source of each data packet). In Gig-E networks, data packets are encapsulated within a "frame". The frame may also include physical layer components such as a preamble, and flow control characters.

The Gig-E interface receives content from multiple sources 208. Each of the content sources provides content in a time-multiplexed manner. Time-multiplexing refers to providing multiple sources of information in a time scheduled manner. For example, common embodiments use a round robin schedule, where each source takes turns on the connection. The time domain is divided into timeslots. Thus, during the first timeslot, the first source has a connection, etc. Time slots may be allocated on a recurrent, single shot, opportunistic, etc. basis. Various sources may have different levels of priority. Other time-multiplexing schemes are well known throughout the related arts, and accordingly not described further herein.

In some variants of the present invention, the network interface 502 additionally comprises one or more buffer queues, suitable for buffering data delivery. In some implementations, the buffer is filled and then consumed; alternately, the buffer may be filled and consumed simultaneously. Furthermore, in certain applications, the buffer may be oversized to provide additional overrun protection (i.e., rate of consumption out paces the rate of filling). Flow control may also be imposed by the interface (e.g., using pause frames or stop packets, throttling, etc.) where needed in order to control the flow of data from one or more sources.

Generally, real-time streaming multimedia applications (such as video) may be highly sensitive to bit rates, and/or delay. Thus, in one embodiment of the present invention, the network interface 502 communicates Quality of Service (QoS) parameters with its data sources 208, or other network management entity. QoS provides traffic management priorities to different applications, users, or data flows, or to guarantee a certain level of performance. QoS parameters may control bit rates, delay, jitter, packet dropping probability, bit error rates, etc. One exemplary scheme employs the well known RTP/RTCP (Real-Time Transport Protocol/RTP Control Protocol) protocols for this QoS function, although it will be appreciated that other schemes and protocols may be used with equal success.

In one embodiment, the network interface 502 is also coupled to an optional processing subsystem 504, and programmable substrate 508; the coupling enables network configuration and programming (e.g., device control) therefrom, as described in greater detail subsequently herein.

The network interface 502 can be configured to selectively connect to one or more external data content devices 208. In one exemplary embodiment, the network interface can selectively couple to one or more broadcast services, and one or more narrowcast services. In one variant, the connections are dynamically determined with a processing subsystem 504 executing one or more business and/or operational optimizations. In an alternate variant, the connections are remotely set via a centralized network management entity. In yet another alternate variant, the connections are hardcoded into a removable device, such as a hot-swappable card, computer readable memory media, etc.

In some embodiments of the edge device, the network interface 502 is a wireless interface. For example, in one embodiment, the network interface is associated with the Worldwide Interoperability for Microwave Access (WiMAX) transport; see IEEE Std. 802.16e-2005 entitled "IEEE STANDARD FOR LOCAL AND METROPOLITAN AREA NETWORKS—PART 16: AIR INTERFACE FOR FIXED AND MOBILE—BROADBAND WIRELESS ACCESS SYSTEMS AMENDMENT 2: PHYSICAL AND MEDIUM ACCESS CONTROL LAYERS FOR COMBINED FIXED AND MOBILE OPERATION IN LICENSED BANDS", and subsequent variants thereof, including e.g., 802.16-2009, which are incorporated herein by reference in their entirety. In another variant, a millimeter wave system, WirelessHD, WiGIG, or satellite downlink is utilized. Wireless embodiments may find particular use areas where cabling may be difficult or even impossible to support. For example, mobile embodiments (such as a cruise ship, train, or plane) may receive both live content via satellite, and "canned" content (e.g., ship specific programming) for use within a scaled-down version of the edge device (described hereinafter).

Encryption of the network interface link is network-specific (e.g., based on the platform, network/MSO, payload, etc.), and may be handled external to the device or alternately, internalized within the processing subsystem 504 (i.e., fixed encryption networks, etc.). Thus, some network interfaces may require additional encryption/decryption capabilities. In one exemplary embodiment, the full spectrum edge device relies on external devices for broadcast, common-tier, and session-based encryption. In one such variant, encryption is handled with "bulk encryption"; i.e., the entire payload is encrypted by an encryption engine. In other variants, encryption may be based on interface-specific considerations, thereby providing support for encryption protocol flexibility (e.g., legacy and future standards, external and internal encryption, etc.).

Furthermore, other embodiments may include additional pre-processing or post-processing operations, whether on the edge device 204 or off-device. For instance, excess resources (e.g., unused programmable substrate, idle processor time, etc.) of the edge device 204 can be repurposed to implement a wide range of miscellaneous tasks, including for example, encryption, decryption, encoding, decoding, transcoding, transrating, format conversion, upsampling, downsampling, etc.

Processor

In some embodiments of the invention, a processor 504 and associated storage 506 is provided. The processor can execute software which configures the programmable substrate 508 for full spectrum generation. In other embodiments, the programmable substrate is configured remotely for spectrum generation. In some circumstances, the programmable substrate may be configured at manufacture, and deployed in a "hardcoded" format. While dynamic and/or remote programming support is generally preferred for most implementations, it is appreciated that certain scenarios or constraints may render these features unsuitable or undesirable for use. For example, in closed-circuit operations, a pre-constructed rack unit or board may be swapped or placed into service, without the benefit of external network administration, or assistance. Such closed implementations may be particularly useful in sensitive security environments.

In one such variant, the processor 504 receives a pre-compiled binary image file for programming the programmable substrate 508. The pre-compiled binary image files may be compiled by a networked entity, based on known configurations and device layouts. Pre-compiled binary files are virtually impossible to tamper or reverse engineer; however, pre-compiled binary files are specific to the device; without safety precautions, an incorrect file can cause physical damage to device components. In contrast, other variants may provide metadata to the processor, enabling the processor to compile a binary image file suitable for device specific programmable substrate configuration. For example, such metadata may include total bandwidth, channel distribution, an allocation of services, etc. Metadata is significantly easier to distribute; however, compiling a binary image file is not trivial, and requires a much more capable processor, and associated software.

In one embodiment, the processor 506 programs a non-volatile memory (not shown) with a binary image file for programming the programmable substrate 508. Non-volatile memories, such as FLASH, EEPROM, EPROM, etc. retain their contents without power. Non-volatile binary image storage may be useful to accelerate start-up (e.g., after a power loss, or restart, etc.), or for other applications such as hot-swap embodiments. Programming or "burning" a binary image to non-volatile memory is much slower than directly programming the programmable substrate; however, once the image is burned into the substrate, the device can greatly speed up configuration. The non-volatile memory automatically configures the programmable substrate during power-up.

Alternatively, the processor 504 can program the programmable substrate 508 directly. For example, programmable substrates which are Look-Up-Table (LUT) based can be "written" to (similar to a Random Access Memory (RAM)). Similarly, Digital Signal Processor based substrates may be programmed by writing to its execution memory. Volatile memories, such as LUTs and RAMs, lose their contents when power cycled, and must be reprogrammed anew.

Alternative embodiments which are programmed remotely may similarly be "burned" or directly programmed. Existing solutions for remote configuration of programmable substrates are well known in the art, and not further described herein.

In another implementation of the present invention, a processor 504 and associated storage 506 configures the network interface 502 dynamically to selectively receive data from one or more external data content devices 208. The connections are dynamically determined based on e.g., one or more business and/or operational optimizations; for example, the processor may elect to maximize the number of profitable narrowcast services, at the expense of broadcast services. Other profit or revenue-maximizing algorithms are further discussed subsequently herein.

The processing subsystem 504 adds flexibility to the full spectrum generation apparatus 204, both in terms of content management, network operation, and other operational parameters. For example, in some embodiments, the processing subsystem 504 supports multiplexing of video or other content (e.g., programs) using feed-back or feed-forward information, as discussed in co-owned U.S. Pat. No. 7,602,820 issued Oct. 13, 2009 and entitled "APPARATUS AND METHODS FOR MULTI-STAGE MULTIPLEXING IN A NETWORK", which is incorporated herein by reference in its entirety. Consider a cable network having a number of content sources 208, a spectrum generation device 204, and a service group containing a local hub. The edge device 204 negotiates with the local hub to reserve bandwidth for the local hub within the service group. The processing subsystem 504 may receive and grant requests for bandwidth for downstream use by the local hub. Thus, a portion of the frequency spectrum output is kept in "pristine" condition, thereby allowing the local hub to insert content (e.g., adding a QAM subsequently thereafter).

In another embodiment, the processing subsystem supports accessing data (such as video, audio or data files) over a network according to download or "on demand" paradigms, as discussed in co-owned U.S. patent application Ser. No. 11/258,229 filed on Oct. 24, 2005 and entitled "METHOD AND APPARATUS FOR ON-DEMAND CONTENT TRANSMISSION AND CONTROL OVER NETWORKS", which is incorporated herein by reference in its entirety. For example, a content distribution network (e.g., cable HFC) may be connected with a CSP (cellular service provider) or wireless service provider (WSP). On-demand content may be delivered via a "point-to-point" approach, where a session is established between a content receiving entity (such as a cellular telephone) and a distributing entity's processing subsystem (e.g., the full spectrum device 204). The processing subsystem 504 supports session establishment (e.g., a SIP session), and data flow control using protocols and bandwidth typically used for (i) providing on-demand services to subscribers within the cable network, and (ii) delivery and control of streaming multimedia to client mobile devices.

In yet other systems, the processing subsystem of the edge device 204 transparently and opportunistically utilizes bandwidth reclaimed after removal of null or "stuffing" data inserted into a program stream for, inter alia, producing constant-rate streams, as discussed in co-owned U.S. patent application Ser. No. 11/291,328 filed on Nov. 30, 2005, entitled "APPARATUS AND METHODS FOR UTILIZING VARIABLE RATE PROGRAM STREAMS IN A NETWORK", and issued as U.S. Pat. No. 7,889,765 on Feb. 15, 2011, which is incorporated herein by reference in its entirety. For example, in networks where bandwidth is largely variable and unpredictable, the processing subsystem 504 can actively detect "transient" bandwidth, and request additional content or backfill local content to deliver secondary content elements. Additionally, the secondary content elements occupy the same QAMs which also carry the primary or program content, thereby allowing for tandem use of existing QAMs.

Additionally, the processing subsystem 504 (where utilized) may utilize a "switched digital" approach to (i) deliver packetized content only when requested, and (ii) selectively switch cable modems (CMs) or other such CPE to and from certain downstream channels (e.g., DOCSIS QAM-modulated RF channels) based on switching algorithms, as discussed in co-owned U.S. patent application Ser. No. 11/325,107 filed on Jan. 3, 2006, entitled "METHODS AND APPARATUS FOR EFFICIENT IP MULTICASTING IN A CONTENT-BASED NETWORK", and issued as U.S. Pat. No. 7,693,171 on Apr. 6, 2010, which is incorporated herein by reference in its entirety. In one embodiment, the processing subsystem executes algorithms for detecting and exploiting the fraction of the available program channels which is not in use; hence, intelligent and timely switching of individual subscribers (or groups of subscribers) can reduce the number of downstream channels that must be allocated to delivery of content.

Moreover, other embodiments of the processing subsystem 504 can execute management and control of electronic devices connected to a network, as discussed in co-owned U.S. patent application Ser. No. 11/363,577 filed on Feb. 27, 2006, entitled "METHODS AND APPARATUS FOR SELECTING DIGITAL CODING/DECODING TECHNOLOGY FOR PROGRAMMING AND DATA DELIVERY", and issued as U.S. Pat. No. 7,916,755, which is incorporated herein by reference in its entirety. For instance, the processing subsystem may control hardware and software functions/modules of different devices on the network to enable various capabilities and options, including conditional access capabilities, video coding or compression capabilities, encryption schema, and network interfaces. Thus a full spectrum device (e.g., edge device) could support tailored conditional access, coding, encryption, and/or network interfaces for delivery of content to each particular client device of its service group.

Yet other embodiments of the processing subsystem 504 of the edge device can maintain and analyze historical viewing or use information, as discussed in co-owned U.S. patent application Ser. No. 12/012,019 filed on Jan. 30, 2008, entitled "METHODS AND APPARATUS FOR PREDICTIVE DELIVERY OF CONTENT OVER A NETWORK", and issued as U.S. Pat. No. 9,060,208 on Jun. 16, 2015, which is incorporated herein by reference in its entirety. Historical viewing and use information collected by the processing subsystem can be used to predicatively request or cache content for "stuffing" bandwidth that is not currently being consumed via consumer requests with programming that is predictively selected.

Processing subsystems can also control network bandwidth utilization by delivering to users only the minimum number of programs required by service provider policies, as discussed in co-owned U.S. patent application Ser. No. 11/881,034 filed on Jul. 24, 2007, entitled "METHODS AND APPARATUS FOR FORMAT SELECTION FOR NETWORK OPTIMIZATION", and issued as U.S. Pat. No. 7,770,200 on Aug. 3, 2010, which is incorporated herein by reference in its entirety. The flexibility of the content delivery could conceivably cause significant congestion during drastic changes in programming consumption; for example, bottlenecking at the full spectrum generation device 204. So-called "primetime" viewing typically comprises the maximum number of individual programs being delivered, as well as the maximum diversity of programs; the primetime demand for programming typically differs dramatically from the demand during early morning viewing, and also from that of other relatively high consumption periods. Consequently, in periods of excessive bottlenecking, the processing subsystem may be required to enforce minimum service provider policies.

Another "network friendly" policy executable within the processing subsystem 504 includes tiered usage of: (i) a reclamation process; (ii) and overflow process; and (iii) a triage process, as discussed in co-owned U.S. patent application Ser. No. 12/152,749 filed on May 15, 2008, entitled "METHODS AND APPARATUS FOR BANDWIDTH RECOVERY IN A NETWORK", and issued as U.S. Pat. No. 8,281,352 on Oct. 2, 2012 (which claims the benefit of U.S. Provisional Patent Application Ser. No. 60/930,450 of the same title, filed on May 15, 2007), which is incorporated herein by reference in its entirety. For example, the processing subsystem 504 can enforce graded or escalating impact based on the severity of the bandwidth deficit.

Still other variations of processing subsystems "intelligently" optimize content-based network operation based on, e.g., cost and/or revenue implications in the context of "on-demand" video services, as discussed in co-owned U.S. patent application Ser. No. 12/072,637 filed on Feb. 26, 2008, entitled "METHODS AND APPARATUS FOR BUSINESS-BASED NETWORK RESOURCE ALLOCATION", and issued as U.S. Pat. No. 8,813,143 on Aug. 19, 2014, which is incorporated herein by reference in its entirety. The processing subsystem can dynamically evaluate and reallocate network assets based on, inter alia, the revenue and "cost" implications associated with various resource allocation options. For example, the processing subsystem assesses the various implications of different possible resource allocations within the on-demand (OD) delivery paradigm (e.g., FOD, SVOD, HDVOD, etc.). The processing subsystem 504 in one embodiment allocates/reallocates program streams (such as according to one or more predetermined or dynamically variable criteria) in order to continually optimize the revenue/profit versus resource cost equation.

Furthermore, commingling of video and data services can be optimized within various aspects of the present invention. For example, the invention can be used to boost utilization of a single QAM's capacity. Consider a DOCSIS 3.0 stream supporting up to 38.8 Mbps of payload; in one embodiment of the present invention, the underutilized portion can be stuffed with additional data (e.g., 30 Mbps baseline "stuffed" to support an additional 8.8 Mbps). Techniques for "packing" unused bandwidth are well known in the related arts, and include those specified in DOCSIS 3.0, and/or equivalent solutions used within DSMCC data carousels. DSMCC supports a variety of communication models, including interactive transport control of audio and video streams in a bi-directional environment such as a cable television VOD system.

More generally, however, those of ordinary skill in the related arts will recognize that allocated spectrum can be sub-divided into "slices" and apportioned to any number of users. Control channels can be used for distributing relevant information to the users including, for example, addressing, permissions, etc.

Programmable Substrate

In one aspect of the present invention, the programmable substrate 508 of the device of FIG. 5 receives data from the network interface, and generates the entire spectrum for distribution to one or more subscribers within the serviced group. In one embodiment, the programmable substrate receives a plurality of time-multiplexed content data streams as previously described, and converts the content to a plurality of frequency-multiplexed channels (e.g., QAMs).

Common examples of programmable substrates 508 include FPGAs (Field Programmable Gate Arrays), PLDs (Programmable Logic Devices), GALs (Generic Array Logic), etc. as well as hybrid reconfigurable DSPs (Digital Signal Processors), Fast DACs and other general purpose processing cores. In one exemplary embodiment, the programmable substrate 508 is configured to perform highly specialized and optimized operations (examples are described in greater detail hereinafter). In less complex systems, a processor executing a generic instruction set may be sufficient. Similarly, multiple parallelized operations may preferentially be performed within dedicated logic; in contrast, serialized or unpredictably discontinuous operations can be more efficiently handled in software. Thus, the complexity and configuration of the edge device is directly related to the nature of spectrum generation.

Furthermore, it is appreciated that rapid improvements in technology (e.g., parallel processing, compiler efficiency, fabrication geometries, etc.) and corresponding decreases in component cost may be a consideration for future design construction. For example, it may be more cost effective to use higher-cost reprogrammable substrates which can be frequently upgraded, as opposed to "one-shot" lower-cost components. In other examples, older and lower cost components and existing software may be cheaper to maintain than porting existing software to new platforms. Other implementations which trade cost for substrate capabilities are readily appreciated by those having ordinary skill in the related arts, given the contents of the present disclosure.

In the exemplary embodiment, the programmable substrate comprises one or more FPGAs. Architecturally, FPGAs are based on small memory Look-Up-Tables (LUTs), which emulate logic (e.g., AND, NAND, OR, NOR, XOR, XNOR, etc.).

Figure 6:
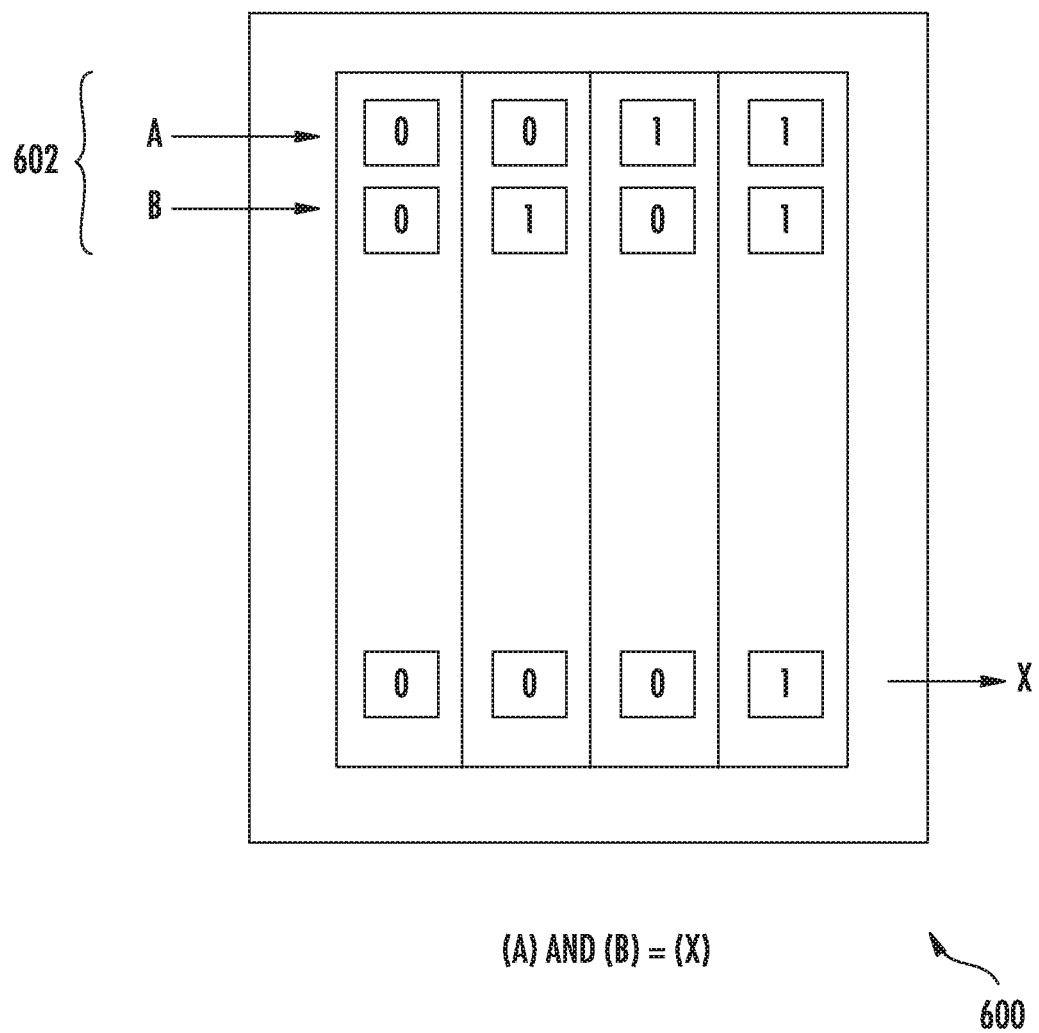
FIG. 6 is a graphical representation of a Look Up Table (LUT) useful in implementing various embodiments of the present invention.

Consider the exemplary Look-Up-Table (LUT) 600 of FIG. 6, which has been programmed to emulate a logical AND gate. In this example, the two (2) input LUTs comprises a memory device that can store four (4) values. During operation, the input operands 602 "address" the stored value; i.e., if the first operand is a logic one (1), and the second operand is a logic zero (0), then the value at address #10b is returned. For example, the logical AND operation can be emulated by programming the LUT with a zero (0) value in addresses #00b, #01b, and #10b, and a one (1) in address #11b. When both the first and second input operands are a logical one (1), the LUT outputs a logical one (1); in all other cases, the LUT outputs a logical zero (0).

Typical implementations of LUTs are physically capable of emulating much larger and more complex logical operations. Historically, FPGAs were composed of four (4) input LUTs; however, recent advances in FPGA technologies have supported larger LUT sizes (e.g., eight (8) inputs, etc.). Moreover, as will be appreciated by those of ordinary skill in the art, FPGA LUT construction provides programmability and flexibility at the cost of gate efficiency. Static, stable, standardized, etc. portions of the apparatus could be more efficiently built using traditional Application Specific Integrated Circuit (ASIC) construction. Thus, in some embodiments, heterogeneous solutions may combine programmable logic with fixed logic gates and/or processor cores.

Other forms of programmable substrate may readily be substituted by those having ordinary skill in the art, given the contents of this disclosure. For example, while FPGAs are LUT-based, other devices may program arrays of fixed gate logic to create circuits. Such other programmable substrates may include Complex Programmable Logic Devices (CPLDs), Programmable Logic Devices (PLDs), Programmable Array Logic (PAL), Generic Array Logic (GAL), etc.

In one exemplary embodiment of the present invention, the programmable substrate 508 is programmed to transform the content data into its spectral equivalent. For instance, the programmable substrate is configured to execute a Fourier-type transform from the frequency domain to the time domain.

The time and frequency domain are related to one another by the Fourier Transform, and Inverse Fourier Transform. Common implementations of Fourier-type Transforms include Discrete Fourier Transforms (DFT), Fast Fourier Transforms (FFT), Discrete Hartley Transforms (DHT), Discrete Cosine Transform (DCT), Discrete Sine Transform (DST), etc. As used herein, the term "transform" refers to, without limitation, any mathematical association (discrete or otherwise), useful for converting data from a first domain (such as time, frequency, etc.), to a second domain.

Figure 7:
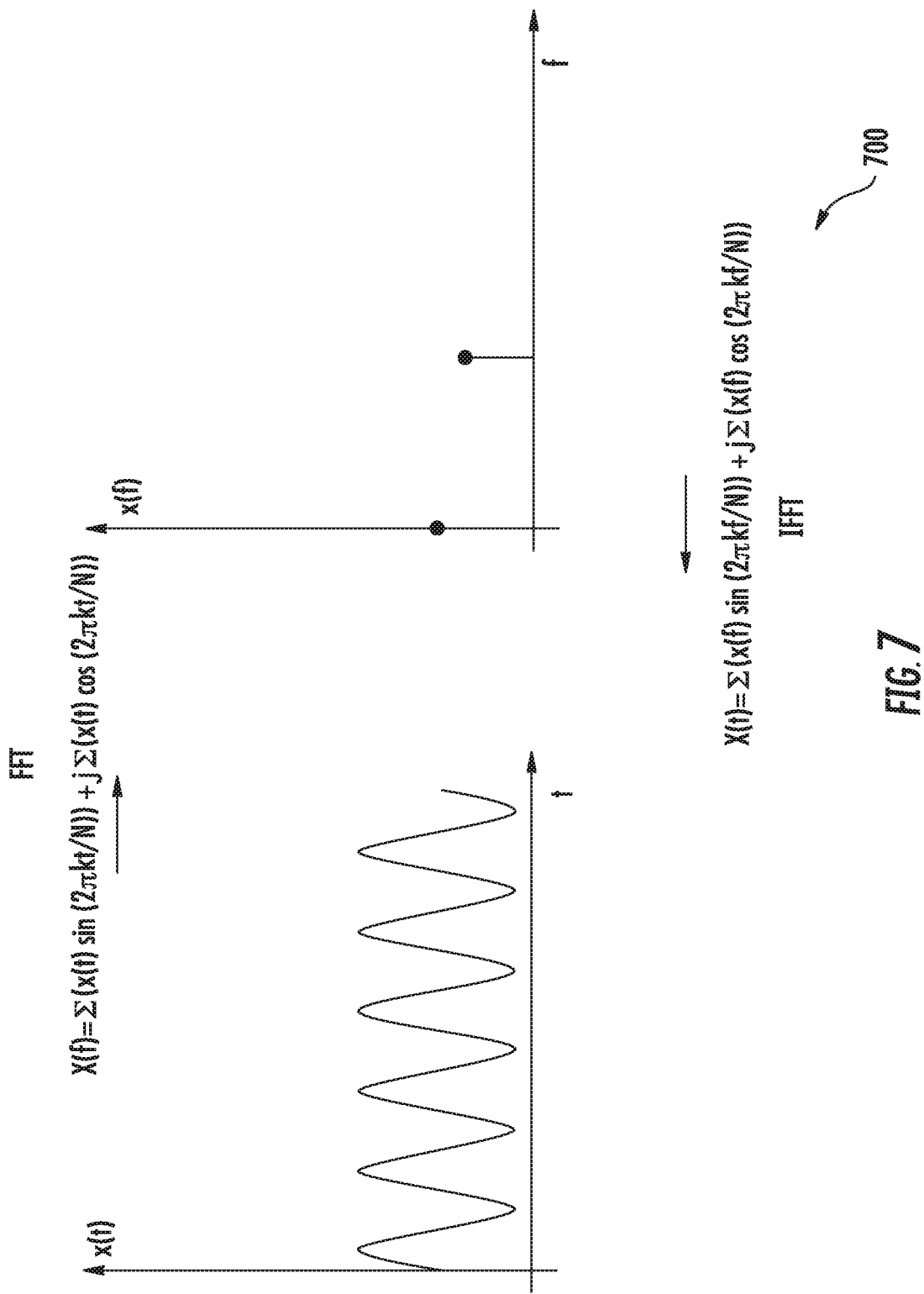
FIG. 7 is a graphical illustration of the mathematical relationship between the Fast Fourier Transform and the Inverse Fast Fourier Transform.

The Fourier Transform decomposes a signal into its frequency-domain components, whereas the Inverse Fourier Transform performs the inverse transform; i.e., generates a time domain signal from its frequency-domain (spectral) components. One example of a particularly useful Fourier-type Transform is the Fast Fourier Transform (FFT) and the Inverse Fast Fourier Transform (IFFT). The FFT/IFFT transforms are well known within the art, and highly optimized hardware realizations of the FFT/IFFT transforms are used in many signal processing operations. Typical FFT/IFFT implementations exploit the similarity in the forward and reverse directions to reuse hardware. Additionally, many solutions are performed "in place" within memory; i.e., the transforms occur within a single memory buffer. FIG. 7 is a graphical depiction 700 of the relationship between the FFT, and the IFFT.

Figure 8A:
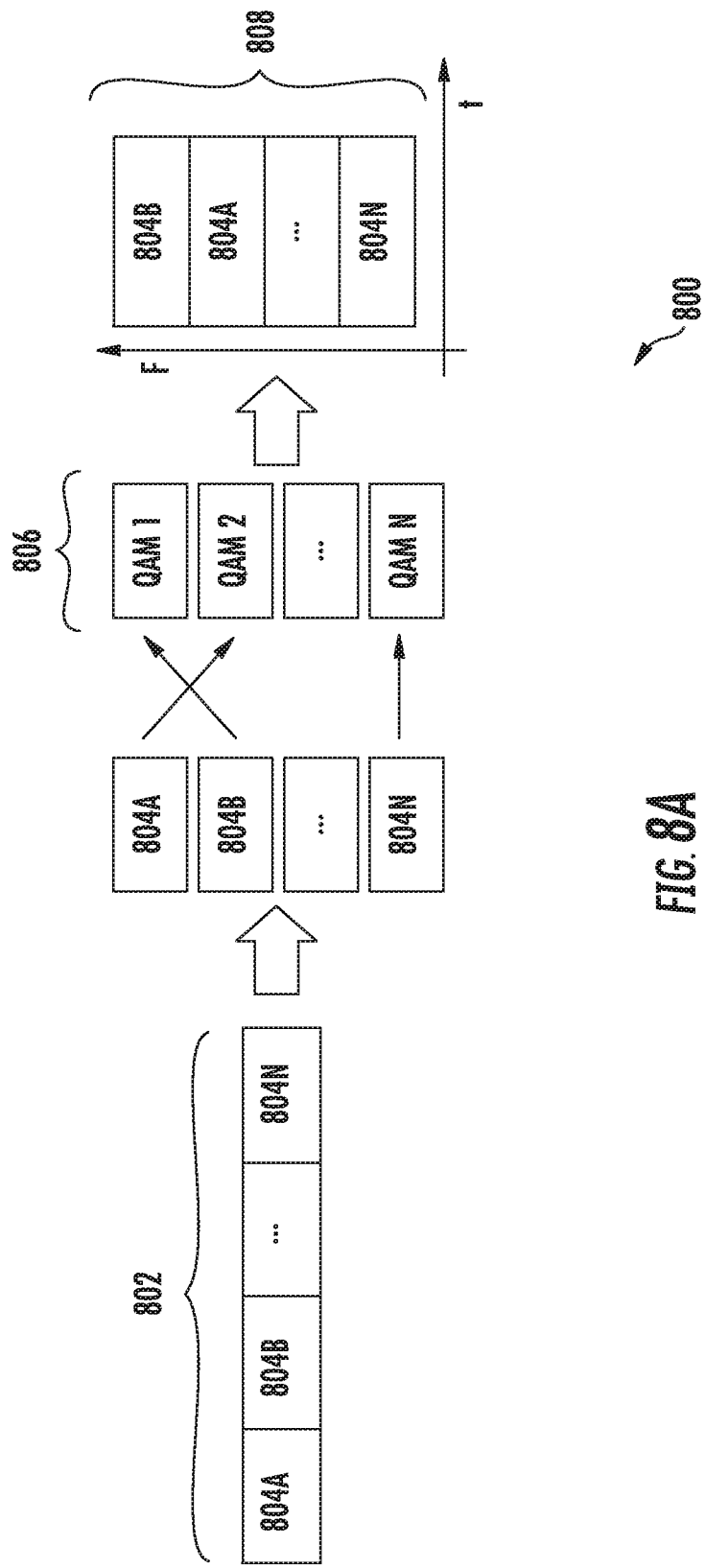
FIG. 8a is a functional block diagram illustrating the internal operations of one exemplary embodiment of the spectrum generation device, in accordance with the present invention.

FIG. 8a is a graphical representation of frequency spectrum generation based on one exemplary IFFT 800 implemented in accordance with one embodiment of the present invention. A stream of time-multiplexed data 802 is separated into its constituent elements 804. Each of the elements is assigned to an appropriate frequency resource (e.g., QAM). This assignment may be for example based on a higher level mapping of content streams or programs to various frequency resources. Then, each element is encoded as spectral coefficients 806 which are input to an IFFT. For example, as shown in FIG. 8a, a first constituent element 804A is assigned to QAM2, and a second constituent element 804B is assigned to QAM1. The IFFT generates the resultant spectrum 808, which is a summation of the products of the spectral coefficients multiplied by their corresponding frequency resource. As shown, if properly performed, the content 804 should have a distinct frequency band. The frequency division multiplexed signal is passed to the downstream interface for transmission.

Figure 8B:
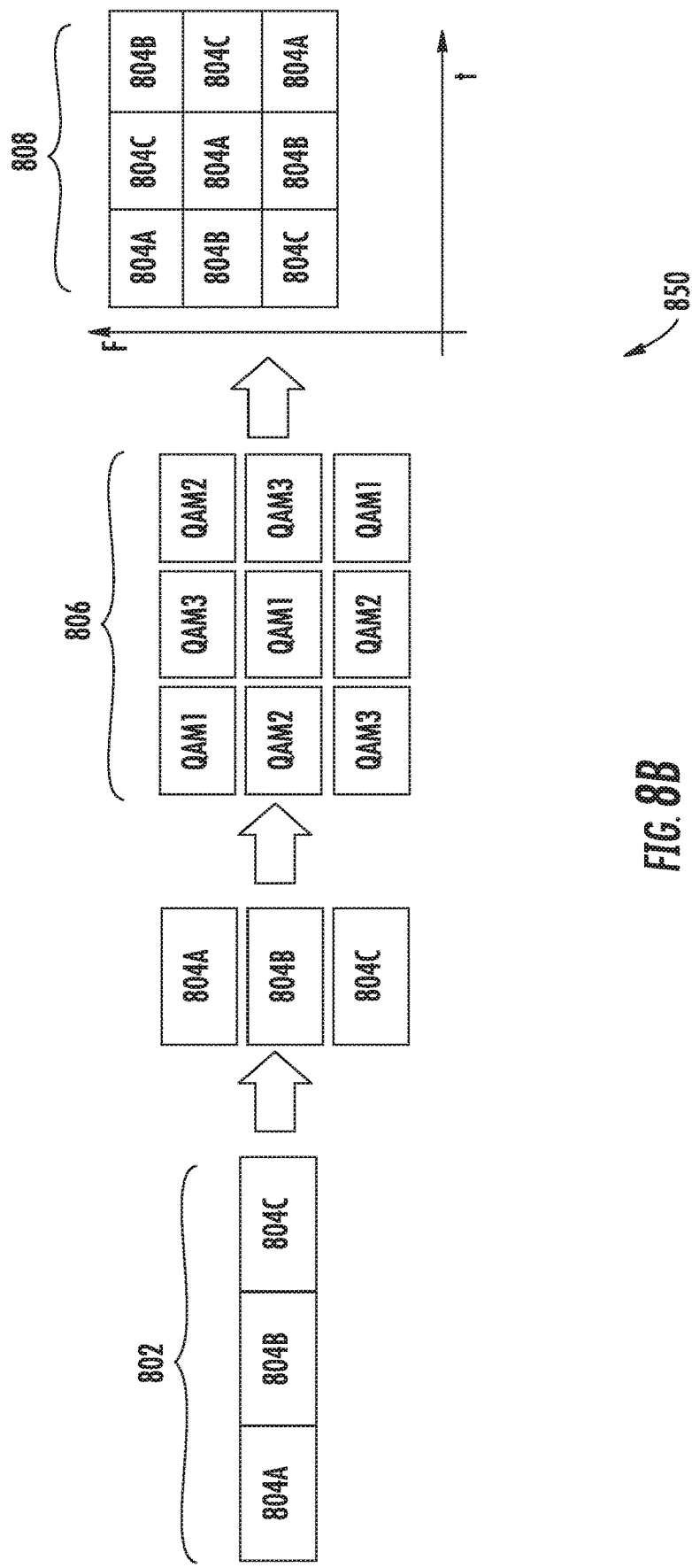
FIG. 8b is a functional block diagram illustrating the internal operations of a second exemplary embodiment of the spectrum generation device, in accordance with the present invention.

FIG. 8b is a graphical representation of frequency spectrum generation based on a second exemplary embodiment of the present invention 850. In this embodiment, the content 804 within the multiplexed input is demultiplexed into its individual constituent components as above, yet an OFDM (orthogonal frequency division multiplexing) operation (also an IFFT) is applied so as to multiplex the various components onto various frequency carriers at various times, thereby creating both time and frequency diversity at the output of the edge device 204. More specifically, the content is spread over multiple time and frequency resources, thereby minimizing the effects of burst interference, or frequency specific interference (e.g., fading).

Furthermore, in such variants, the content 804 within the multiplexed input further comprises multiple individual constituent components, as a time-multiplexed stream of multiple content elements. These multiplexed components are then multiplexed onto various frequency carriers by the IFFT, thereby creating both time and frequency diversity for the already time-diverse stream at the output of the edge device 204. In this embodiment, the receiver (not shown) includes a demultiplexer at the output of the FFT, so as to demultiplex the recovered original data stream into its constituent content elements 804 if desired. Alternatively, a PID (process ID) or similar mechanism can be used to pull packets from the multiplex without demultiplexing.

As appreciated in the digital audio and video broadcasting arts, the present invention can be further modified to support a wide range of statistical multiplexing methods to more efficiently provide audio or video services within a given fixed bandwidth. Consider a number of services or streams each of which has varying bitrates. In one embodiment, a statistical multiplexer intelligently allocates bandwidth to each service based on, inter alia, Quality of Service (QoS) requirements such that prioritized services can have more bandwidth, than lower priority services. In fact, unlike prior art networks which are configured and planned around relatively static channel usage, the present invention enables much more flexible and dynamic configuration of frequency resources, without maintenance or labor. For example, a full spectrum edge device can configure its programmable substrate to accommodate changing bandwidth requirements.

Downstream Interface

In one aspect of the present invention, the downstream interface 510 receives the output of the programmable substrate 508, and transmits the signal to one or more subscribers. In one embodiment, the downlink interface has a Radio Frequency (RF) output. In alternative embodiments, the signal is modulated to a direct laser output. In yet other alternative embodiments, the signal may be modulated onto wiring or any other modes of physical transference.

RF Output—RF-based embodiments are generally constructed from oscillators, modulators, and amplifiers. Wireless variants may additionally include one or more antennas. Generally, any method for transforming a digital signal to an analog waveform is sufficient. Laser embodiments are constructed from a gain medium which converts energy to light. Common implementations of lasers utilize reflective surfaces and other optical apparatus (lenses, mirrors, splitters, etc.) to further modify the emitted light.

Ideally, sufficiently large bandwidths are necessary to support all services (analog, digital broadcast, VOD, SDV, HSD (e.g., DOCSIS 1.0/3.0) and RF-Two-way, etc.). The aforementioned exemplary full spectrum edge device generates a RF spectrum spanning from baseband to 1 (one) GHz. In future implementations, spectrum generation can be expanded beyond the current capabilities to support advanced technologies. For example, MoCA (Multimedia Over Coax Alliance) type communications are supported at higher frequencies (above 1 GHz). In fact, it will be recognized that current frequencies may constrained by the physical media of the distribution plant (e.g., the attenuation characteristics of coaxial cable); future advances in materials, network topologies, and/or methods can ostensibly support much higher frequencies/rates.

The range is nominally sub-divided into 6 (six) MHz increments and quadrature-amplitude modulated (also referred to throughout as a "QAM"); other larger or smaller increments (e.g., 8 MHz) may be used as well. For example, as described in co-owned U.S. patent application Ser. No. 11/013,671 filed Dec. 15, 2004, entitled "METHOD AND APPARATUS FOR WIDEBAND DISTRIBUTION OF CONTENT", issued as U.S. Pat. No. 9,723,267 on Aug. 1, 2017, and incorporated by reference in its entirety herein, describes support for wideband QAMs having larger bandwidths (e.g., 8 (eight) MHz bandwidths, etc.). Moreover, an edge device could offer mixtures of bandwidths, e.g., 4 MHz, 6 MHz, 8 MHz, etc. Additionally, even though the aforementioned increments are 6 MHz wide, multiple increments can be bundled, to form larger slots in blocks of 2, 4, 8, 12, 16, etc. (i.e., 12 MHz, 24 MHz, 48 MHz, 72 MHz, 96 MHz, etc.).

It is appreciated that the spectrum described above may also include prohibited frequency bands or buffers (e.g., guard bands) so as to mitigate, inter alia, inter-carrier or other types of interference. As used herein the term "contiguous" refers both to cases where the individual frequency bands or carriers are actually contiguous to others (i.e., no guard band(s)), or are contiguous but for one or more intervening guard bands.

Still other limited capability variants could reproduce a smaller spectrum, containing only limited, or special engagement programming. For example, in low use rural areas or mobile applications (e.g., a cruise liner, train, plane, etc.), a reduced-capability edge device could provide only limited channel selection to a few tuners. Similarly, such devices could be used in areas having significantly less programming content. These reduced-capability variants could support spectrums having a corresponding bandwidths e.g., 300 MHz bandwidth, 600 MHz bandwidth, etc.

In yet other embodiments, the downstream interface may be wireless. For example, multiple WiMAX base stations may be established by the MSO or other content provider. One or more of the WiMAX stations are coordinated full spectrum generation devices. Received content and/or data are transmitted to the CPE (which may include simultaneous constructive interference systems).

It can also be appreciated that the methods of the present invention may be practiced using any configuration or combination of hardware, firmware, or software, and may be disposed within one or any number of different physical or logical entities. For example, the aforementioned programmable substrate functionality may take the form of one or more computer programs. Alternatively, such computer programs may have one or more components distributed across various hardware environments at the same or different locations, such as where a network process is distributed across multiple platforms.

As yet another example, portions of the functionality may be rendered as a dedicated or application specific IC having code running thereon. Myriad different configurations for practicing the invention will be recognized by those of ordinary skill in the art provided the present disclosure.

Laser Output—In another embodiment, the output of the edge device(s) comprises an optical domain (e.g., coherent or Laser) signal. As previously mentioned, laser embodiments are constructed from a gain medium which converts energy to light. Each bit stream (e.g., logical channel) is represented using a wavelength of light, which can be turned off-and-on independently. Fiber optic lasers "tune" light by changing various characteristics of the gain medium. For example, some "tuned" lasers adjust the size of the resonating cavity where the light is amplified. Heating or cooling the resonating cavity alters the resonating cavities refractive index (resulting in shorter or longer wavelengths). Common implementations of distributed feedback (DFB) lasers use a cooling system to maintain a constant temperature in the resonating cavity.

In one embodiment, a wave-division multiplexing (WDM) approach is used, wherein the various program streams received at the edge device via e.g., the time-multiplexed transports are converted to an amplitude, which is modulated onto the wavelength channel (i.e., amplitude modulation (AM)). For example, in one embodiment, the TDM signal is converted with an IFFT to a FDM equivalent; each of the resultant spectral coefficients specifies the amplitude of corresponding wavelength of optical energy within for a laser transceiver. Unlike the prior art solutions which route the entire RF spectrum to a converter which converts the analog waveform to a laser equivalent; exemplary embodiments can directly transform the data streams (TDM) to combined optical outputs (e.g., CWDM) within the same full spectrum edge device.

Furthermore, as appreciated by those skilled in the relevant arts, many schemes could exist for the foregoing WDM combining. For example, in one embodiment, the output of the edge device is provided to multiple inexpensive lasers, each of which generates only a subset (e.g., one) of light wavelengths. In other embodiments, the outputs of multiple edge devices can be coupled to multiple tunable lasers which can be configured to generate a wide range of spectrum. The different laser outputs can be multiplexed together on one or more optical mediums. To support legacy configurations, non-WDM approaches can also be used, wherein each discrete channel of information is carried over its own fiber from source to sink. For example, a laser with optical modulator receives electrical domain signals, and converts them to the optical domain.

In one variant, each of the separate wavelengths of light (here in the C-band (1528 to 1603 nm), L-band (1570 to 1604 nm), or S-band (1450 to 1500 nm) is generated by a distributed feedback (DFB) laser, and optically combined with other wavelengths within an optical multiplexer for carriage down a single fiber to one or more nodes, wherein the signal is then distributed to CPEs via the prevailing distribution medium (e.g., coaxial cable, CAT-5, optical fiber, wireless, etc.). Individual wavelengths are demultiplexed at the node via an optical demultiplexer. In one such implementation, each edge device 204 comprises a plurality of DFBs and an optical combiner to physically combine the various (e.g., 2, 4, 8, 16, etc.) different wavelengths onto the single fiber. This fiber is then used to service a given service group within the network.

Alternatively, these components may be distributed further downstream in the architecture, such as where the outputs from multiple edge devices are optically combined.]

Supported Modulation Schemes—In the exemplary embodiment of the full spectrum edge device, various types of modulation schemes are supported, in order to make each edge device 204 "full service" (i.e., support each of the varied heterogeneous services now offered within the typical target network).

One such modulation type is QPSK (quadrature phase shift keying); this well known modulation supports e.g., "ALOHA"-based access protocols (e.g., pure ALOHA, slotted ALOHA, etc.), and DAVIC, for use in broadcasting system information, or low data rate transfers. More discerning QAM (e.g., 64-QAM or 256-QAM) modulation is used e.g., to support digital encrypted broadcast functions including Encrypted MPTS and SPTS multicast and unicast, Switched Digital Video (encrypted SPTS multicast), and VOD (encrypted SPTS unicast).

For example, DOCSIS services (e.g., DOCSIS 1.0, 3.0, etc.) utilize 64-level or 256-level QAM (64-QAM or 256-QAM) for modulation of downstream data, and QPSK or 16-level QAM (16-QAM) is used for upstream modulation. DOCSIS 2.0 and 3.0 also require that 32-QAM, 64-QAM and 128-QAM be available for upstream data.

Accordingly, the exemplary configuration of the edge device programmable substrate includes multiple modulation logic in order to support these various modulation types.

Methods

Figure 9:
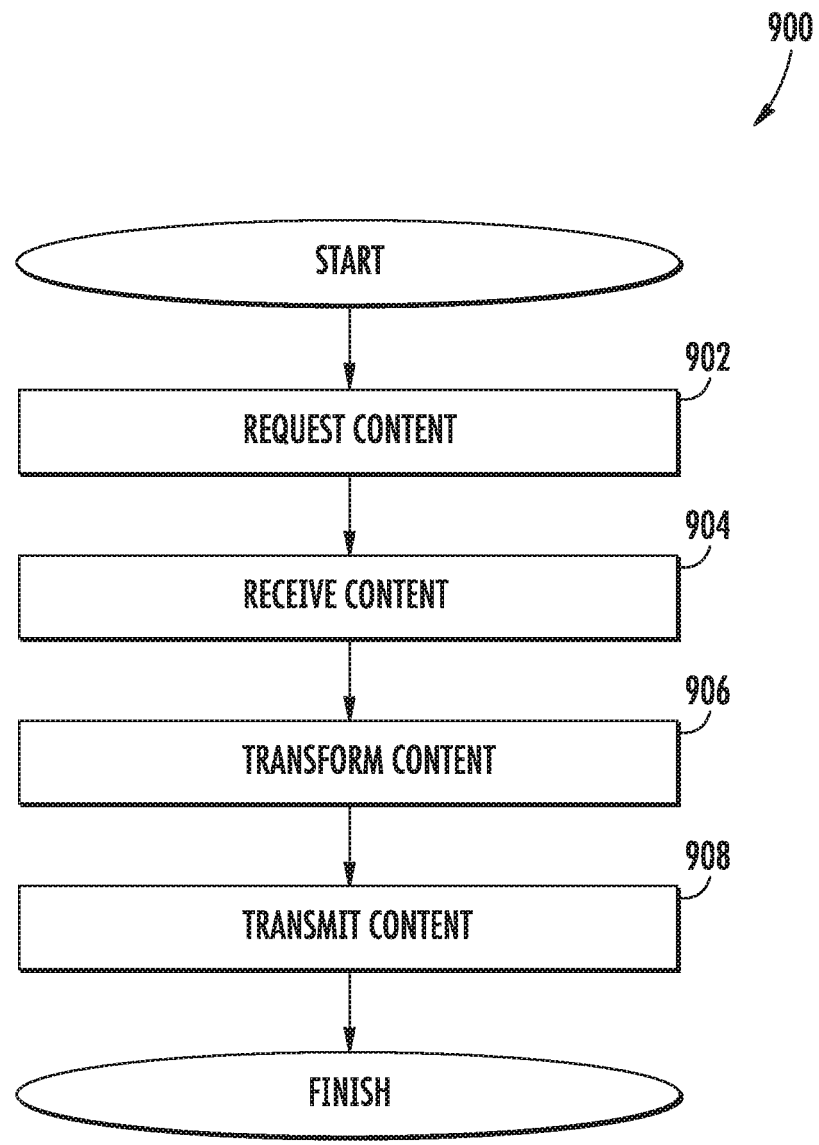
FIG. 9 is a logical flow diagram illustrating a generalized method for distributing content, in accordance with the present invention.

Referring now to FIG. 9, one embodiment of the generalized process for spectrum generation in accordance with the present invention is described. In one aspect, the spectrum generation entity 500 manages service delivery between a number of sources and sinks (e.g., adding, removing, and/or modifying distribution paths). In one exemplary embodiment, a single spectrum generation entity generates a full spectrum signal encapsulating broadcast and narrowcast services. It is appreciated that in alternative variants, spectrum generation may be performed by a number of devices or subsystems (e.g., multiple rack units at a hub site, etc.).

At step 902, the spectrum generation entity requests one or more services or content from a plurality of content sources 208. Typical cable networks comprise a number of content sources including e.g., Standard Definition (SD) content, High Definition (HD) content, Video-on-Demand (VOD) content, Switched Digital Video content, and High Speed Data (e.g., DOCSIS). However, content sources broadly include any source of digital data such as for example a third party data source, mass storage devices (e.g., RAID system), file servers, etc.

In one embodiment of the present invention, the requests for one or more services are based on one or more requests received from a plurality of served Consumer Premises Equipment (CPE) 202. The CPE includes any equipment in the "customers' premises" (or other locations, whether local or remote to the distribution server) that can receive the outputs generated by the spectrum generation device. In alternative embodiments, the requests for one or more services are based on one or more directives received from an external network management entity.

In yet other embodiments, the requests for one or more services may be responsively sent, based on conditions detected at another spectrum generation entity. For example, additional spectrum generation entities may be used to supplement service offerings, or prevent noticeable service blackout during device failure.

At step 904, the spectrum generation entity receives content for delivery. Content may be scheduled for reception in segments, downloaded into a queue, etc. In one variant the subscriber content is composed of both broadcast and narrowcast elements. Examples of such data sources includes e.g., Standard Definition (SD) content, High Definition (HD) content, Video-on-Demand (VOD) content, Switched Digital Video content, and High Speed Data Over Cable Services Interface Specification (HSD DOCSIS), etc.

It is also appreciated that the spectrum or edge device may be "flooded" with all available programming (at least in the linear domain), akin to a prior art switched digital broadcast model. In the prior art model, the lack of any demand with the serviced subscriber group for a given program allows that program to be "switched out" from delivery, thereby freeing bandwidth for other programs or services which are being actively utilized. When a "first" request for the switched-out content is received, the switch responsively switches that program stream back into the delivered set.

Similarly, one embodiment of the present invention floods the edge device with all relevant program streams, and the processor 504 and/or substrate 508 are configured to selectively include or remove these streams based on serviced user requests for the content. In one such variant, a given program stream within the time-multiplexed stream is simply allocated to a buffer or other mechanism which is not included in the IFFT operation. Likewise, another stream can readily be mapped onto a frequency resource in place of the removed stream.

In one exemplary embodiment, the content is received via a Time Division Multiplexed (TDM) network. Alternate embodiments may receive the plurality of content via other multiplexing schemes (e.g., FDM, etc.). Furthermore, system design considerations may require the flexibility of packet-switched delivery, or alternately, the bandwidth guarantees of circuit-switched delivery. Additionally, network content delivery may further include capabilities and support for Quality-of-Service (QoS) parameters. QoS parameters support resource reservation control mechanisms and may, inter alia, provide different priorities to different content data, or guarantee a minimum delivery rate. Consistent spectrum generation may require guarantees for consistent bit rates, delays, jitter, packet loss, bit error rates, etc. Real-time streaming multimedia applications often require fixed data rates, and are delay sensitive.

In one aspect of the present invention, the content data can be flexibly sourced from a wide variety of devices. In one embodiment, the content data is generically formatted in accordance with one or more broadcast services, and/or one or more narrowcast services. Alternatively, the content data may be specific to a particular service, and provided via specialized or proprietary formats. In certain embodiments, narrowcast data content can include user-centric and/or user-specified content (various examples for narrowcast user content are described in greater detail herein, see discussion of On Demand Services) as well as targeted secondary content.

In one variant, the content data is dynamically included based on one or more business optimizations (e.g., maximize narrowcast service, maximize subscriber coverage, etc.). In other variants, the content data may be dynamically included based on one or more network considerations (e.g., robust service coverage, service recovery, etc.). In yet other variants, the content data may be selected based on one or more apparatus considerations (e.g., device limitations, subscriber CPE limitations, etc.). Such considerations may also be remotely handled via a centralized network management entity.

The plurality of data content may be received from one or more encryption devices, or "in the clear" (unencrypted) from one or more source content devices. Still other variants may support encryption for a portion of the received streams (e.g., to support mixtures of externally encrypted and unencrypted sources, etc.).

At step 906, the spectrum generation device transforms the plurality of content to a full spectrum format. The received data content is organized, assigned, or collated into a number of channels for transfer. In one embodiment, one stream of data content (which may include one or more program streams) is assigned to a channel suitable for generating 6 (six) MHz of bandwidth. Such organization may include filling a suitably sized buffer memory for spectrum conversion. In some variants, larger channels can be created by aggregating 2, 4, 8, 12, 16, etc. buffer memories (content streams) together.

In yet other variants, variably sized channels may be created by providing a variably sized memory buffer, which can be dynamically changed. Still other variants may provide "padding" to support spectrum generation without content (such as may be useful when rolling out new features, or removing old features, etc.).

Additionally, in some implementations, the channel data is collated first (e.g., as stored within memories), and then assigned to a spectrum resource. Multiple stage processes can add additional data delivery flexibility, at increased complexity. For example, in one embodiment, the channels may be further organized based on one or more optimization processes (e.g., so as to avoid bandwidth constraints, or achieve other operational goals). In other embodiments, the channels may be organized based on a coherent standard or policy deployed on a network-wide basis.

Similarly, in yet other embodiments, the channels may be further organized flexibly within a certain range. For example, various portions of the spectrum may be allocated for legacy devices (e.g., analog and digital standard definition service), whereas other portions of the spectrum may be restricted for specific users (e.g., to support various narrowcast options).

At step 908, the spectrum generation device transmits the transformed (time domain) content for reception by the plurality of sinks, such as subscriber CPE 106. In one exemplary Radio Frequency (RF) embodiment, transmission of the frequency channels includes conversion from digital samples to an analog baseband waveform, and frequency mixing for transmission. In alternate embodiments, direct laser transmission of the channels includes conversion from digital samples to an optical waveform for transmission via a fiber optic cable.

Figure 9A:
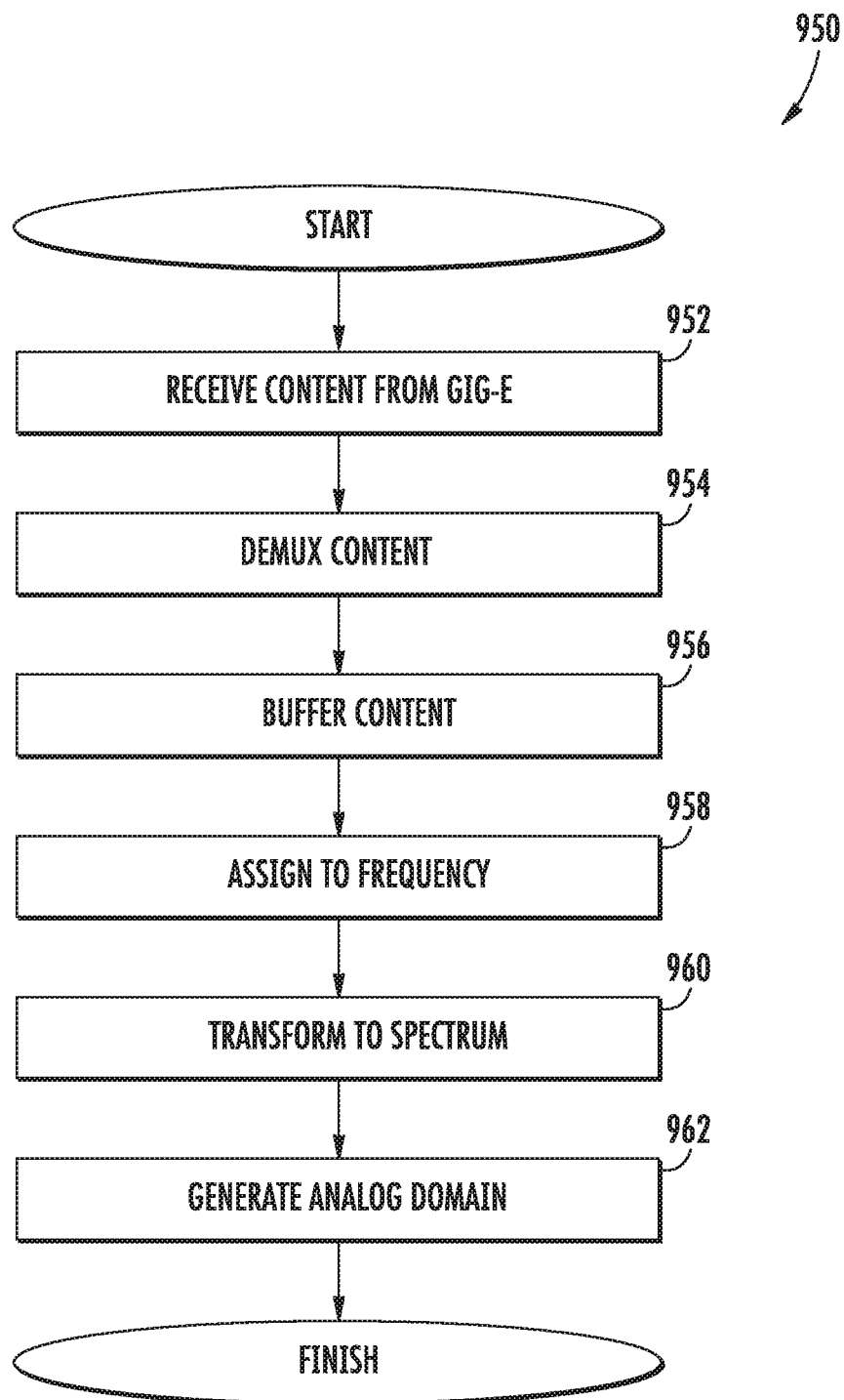
FIG. 9a is a logical flow diagram illustrating one specific implementations of the method for distributing content of FIG. 9.

Referring now to FIG. 9a, one exemplary implementation of the generalized method of FIG. 9 is illustrated.

As shown, the method 950 comprises the edge device 204 first receiving a time division multiplexed stream of content from its Gig-E interface (step 952). For instance, the stream may comprise several multiplexed program streams collectively forming a packet stream encapsulated in an appropriate protocol. Since a packet-switched delivery network is utilized, it is feasible that some packets may arrive out-of-order, and hence may be buffered and reordered upon receipt.

Next, per step 954, the received stream is demultiplexed, such as by packet identifiers 30 that associate each packet with a particular stream. The individual streams demultiplexed from the parent stream are then individually buffered (step 956), and allocated to particular frequency resources per step 958. For example, as shown in FIGS. 8a and 8b, various program streams may be mapped to one or more RF output channels (e.g., QAMs), including: (i) one program stream per QAM; (ii) multiple streams per QAM; and (iii) multiple QAMs per stream (e.g., using the aforementioned wideband tuner).

Next, per step 960, the edge device transforms the individual program streams into a full-spectrum representation of the input data. For example, in one embodiment, the input bitstream for each individual program stream is allocated to an individual frequency band or subcarrier using an IFFT. Alternatively, a bitstream may be allocated across multiple different carriers (akin to OFDM), thereby providing both time and frequency diversity if desired.

Lastly, per step 962, the data output from the IFFT operation is converted to the analog domain (e.g., using a D/A converter), upconverted as required, and transmitted over the frequency spectrum effectively as a wideband RF signal.

Example Operation

The following scenarios illustrate the operational and other benefits of one or more aspects of the present invention. Specifically, similar functions implemented within an extant cable distribution system using prior art solutions required extensive capital expenditure, and extensive maintenance. In contrast, the present invention quickly and efficiently provides deployments of improved functionality in a substantially seamless fashion.

Analog Reclamation

As previously described, the cable spectrum may be composed of analog channels, digital channels, High Definition (HD) channels, video-on-demand (VOD) channels, switched digital video (SDV) and high speed data (HSD). Efforts to replace less efficient analog channel usage with digital counterparts are currently under both federal and commercial consideration. Prior art networks are both difficult to maintain, and upgrade; the restructuring of channel structure is an expensive and onerous task requiring significant amounts of capital outlay, and rewiring.

Figure 10:
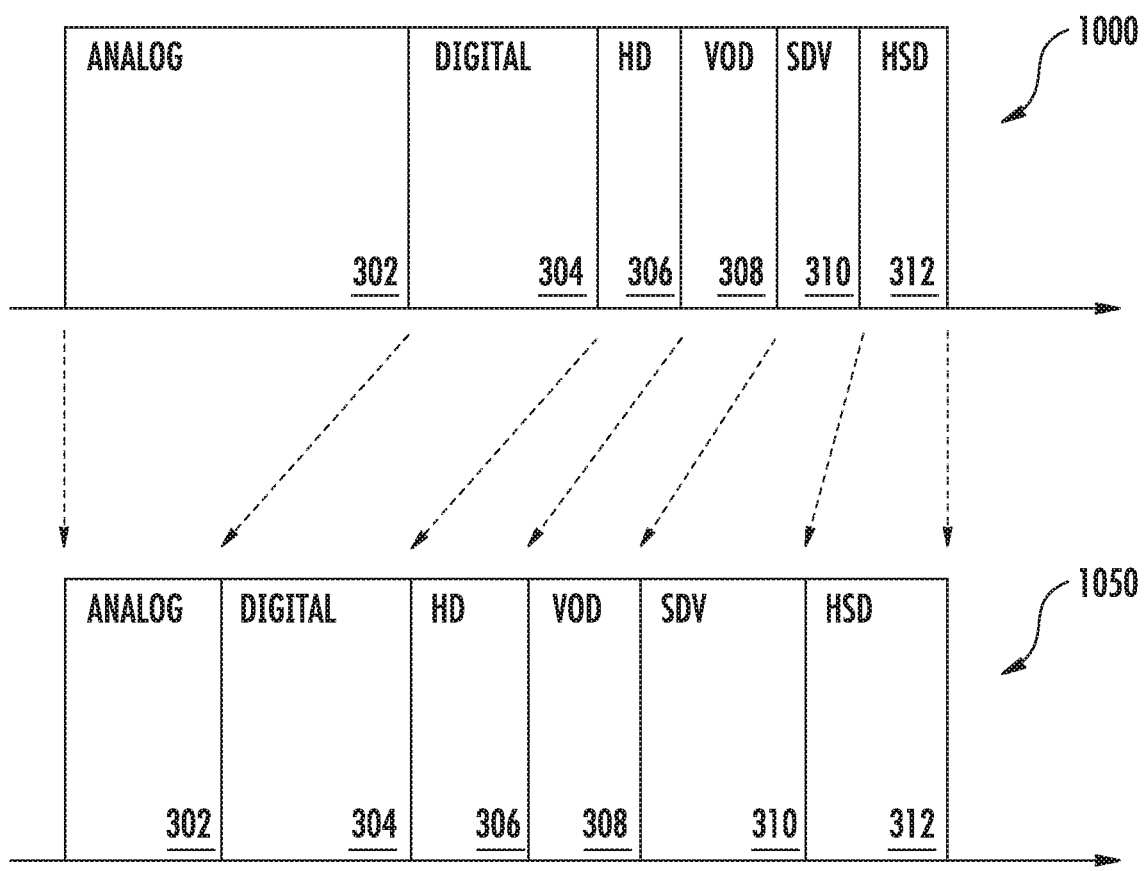
FIG. 10 is a graphical representation of analog reclamation, as accomplished by one exemplary embodiment of the present invention.

FIG. 10 illustrates one possible allocation 1000 of radio resources allocated to various services provided by a cable network provider. The cable spectrum is composed of QAMs which are allocated to analog channels 302, digital channels 304, High Definition (HD) channels 306, video-on-demand (VOD) channels 308, switched digital video (SDV) 310 and high speed data (HSD) 312, etc. The relative proportion of these various content types are based on business considerations; as previously mentioned. Narrowcast services such as HD, VOD, and SDV services are considerably more profitable; however, customers demand both breadth and legacy compatibility offered by analog and digital channels.

FIG. 10 illustrates a second spectrum allocation 1050, which is representative of current and future planned efforts to replace less efficient analog channel usage with digital counterparts, while expanding more profitable narrowcast offerings.

The previously described spectrum generation entity can accommodate analog reclamation (or any spectrum allocation changes) by reprogramming the network interface to receive data from new content sources, and a reconfiguration of the output frequency channel locations. Instead of receiving the current allocation of analog services, the spectrum device can be programmed to receive content data from another networked content source. Similarly, channel structure can be changed to back-fill the reclaimed spectrum. New digital content can be addressed with new parameters for connecting to content servers, and channel assignments. Thus, various embodiments of the present invention can advantageously configure networks (in compliance with federal analog reclamation efforts) remotely, entirely in firmware or software, and virtually instantly.

On Demand Services

The present invention provides previously unattainable degrees of freedom for allocating between broadcast and narrowcast capabilities. This includes instantiation of user-specific narrowcast or unicast channels for delivery of on-demand content. For example, "entitlement" based content data control is provided to a CPE via an on-demand session, if the CPE or subscriber is entitled to the content. In one embodiment, this is accomplished via the methods and apparatus disclosed in co-owned U.S. patent application Ser. No. 12/536,724 filed on Aug. 6, 2009, entitled "SYSTEM AND METHOD FOR MANAGING ENTITLEMENTS TO DATA OVER A NETWORK", and issued as U.S. Pat. No. 8,341,242 on Dec. 25, 2012, incorporated herein by reference in its entirety. As discussed therein, in one embodiment, a request for content is received from the CPE at an entity (e.g., headend server) of the content and data distribution network. The network entity obtains information identifying the user account (such as subscriber identification number, account number, etc.), and uses this information to request entitlements from an entitlements server (also located at the headend in one embodiment). Based on the results returned from the entitlements server, the network entity either grants or denies the request. The entitlements server accesses subscription information in a subscriber database to obtain sufficient information to determine the entitlements of the subscriber. When the requesting user is determined to be entitled, the content (e.g., movie) can be provided to the spectrum generation device 204 for transmission via a limited engagement channel that is instantiated for that user only. The present invention can thus temporarily create a limited engagement channel specific to the entitled CPE or subscriber only. At the conclusion of the delivery, the resources are no longer used, and may be readily reabsorbed into the spectrum budget.

Switched Digital Video (SDV)

As another example, the edge device 204 of the invention can be disposed at a hubsite within a network, and operate according to an SDV paradigm. As previously described, traditional SDV floods the hubsite switch with all of the available programming; delivery of each program stream downstream however is predicated upon one or more users watching a given stream. When no users within the serviced group are watching a given program, that program is switched out from downstream delivery, and the bandwidth that was being used to deliver it reclaimed.

Similarly, in the context of the present invention, the edge device 204 may act as a switch, being controlled either remotely or by a local process which determines whether any subscribers have selected a given program stream, and if not, remove this stream from delivery, such as by (i) simply not demultiplexing it from the incoming multiplexed content stream; (ii) demultiplexing it but discarding the packets; or (iii) causing an upstream entity to remove it from the received multiplexed stream. Advantageously, however, the edge device 204 can also reallocate reclaimed spectrum for use in the same or other services (e.g., for a VOD session).

Passive Optical Networking (PON)

In yet another example, the edge device 204 of the present invention can support yet other physical mediums and protocols. For example, in one embodiment, the output of the full spectrum generation device may couple directly to a Passive Optical Network (PON) architecture (e.g., Ethernet over PON, or EPON). A typical PON is a point-to-multipoint, fiber-to-premises network architecture where unpowered optical splitters are multiplexed over a single optical fiber to serve multiple premises. For example, a full spectrum device that acting as an optical line terminal (OLT) can transmit data to a number of optical network unit (ONU) CPEs. Yet other fiber optic distribution schemes may be readily implemented by ones of ordinary skill in the related arts given the present disclosure.

Business Models and "Rules" Engine

In another aspect of the invention, one or more computer programs running on the processor 506 of the full spectrum apparatus 204 includes a so-called "rules" engine. This engine comprises, in an exemplary embodiment, one or more software routines adapted to control the operation of the apparatus in order to achieve one or more goals relating to operations or business (e.g., profit). Included within these areas are network optimization and reliability goals, increased maintenance intervals, increased subscriber or user satisfaction, increased subscription base, higher revenue or profit (e.g., from increased advertising revenues), more subscriber "views" of given content, higher data download speed, increased bandwidth and responsiveness to changing demands for bandwidth, reduction of undue channel replication, and so forth.

These rules engine may comprise a separate entity or process, and may also be fully integrated within other processing entities, and controlled via e.g., a GUI displayed at a central network management facility, coupled via the network interface 502. In effect, the rules engine comprises a supervisory entity which monitors and selectively controls the operation of the spectrum generation device(s) at a higher level, so as to implement desired operational or business rules.

For example, the central network entity may invoke certain operational protocols or decision processes based on, inter alia, information or requests received from the service group, conditions existing within the network, demographic data, geographic data, user preferences, etc. However, these processes may not always be compatible with higher-level business or operational goals, such as maximizing profit or system reliability. Hence, when imposed, the business/operational rules can be used to dynamically (or manually)

control the operation of the full spectrum apparatus 204. The rules may be, e.g., operational or business-oriented in nature, and may also be applied selectively in terms of time of day, duration, specific local areas, or even at the individual user level.

For example, when sufficient bandwidth is present, the apparatus may deliver narrowcast programming to optimize programming revenues. However, during instances of increased demand on the network, narrowcast programming may be greatly limited. In other words, as bandwidth demand increases, lower-revenue narrowcast programming may be pruned out. Similarly, the central network authority can balance between targeted narrowcasting, and service coverage. Highly targeted narrowcast services are generally tailored to small coverage areas; thus as a service group diminishes in size, the proportion of targeted narrowcast services can increase (and vice versa). Dynamic adjustment of narrowcast relevancy can greatly improve network profitability. These features are readily leveraged within the edge device 204 of the invention due to its ability to be almost instantaneously remotely reprogrammed to adjust is spectral output Additionally, the benefits of remote monitoring, configuration and provisioning capability enable greater flexibility in, inter alfa, (i) troubleshooting and repairing faults within the content delivery network; and (ii) changing or reconfiguring content delivery within the content delivery network. The reduced maintenance and upgrade costs have tangible value, as realized in both saved labor costs, and reduced infrastructure investments.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method for delivering digitally rendered content from a digital content source to at least one computerized client device associated with a content delivery network, the computerized method comprising:

accessing the digital content source to obtain a digital content element, the digital content source in communication with the content delivery network;

executing computerized logic to process the obtained digital content element;

causing a reprogrammable transformation device to:

receive the processed digital content element as part of a multicast transport stream being distributed to the reprogrammable transformation device and a plurality of other corresponding reprogrammable transformation devices within the content delivery network; and transform the processed digital content element from a first domain to a second, different domain via digital domain processing; and causing transmission of the transformed digital content element of the second, different domain to a plurality of users over at least one radio frequency carrier and via a switch apparatus, the switch apparatus comprising another computerized logic configured to selectively switch in or switch out the transformed digital content element from delivery based at least on a presence or absence of the at least one computerized client device being tuned to the at least one radio frequency carrier.

2. The computerized method of claim 1, wherein the causing of the reprogrammable transformation device to transform the processed digital content element comprises causing the reprogrammable transformation device to convert Frequency Division Multiplexed (FDM) data stream elements to Time Division Multiplexed (TDM) data stream elements.

3. The computerized method of claim 1, wherein the causing of the reprogrammable transformation device to transform the processed digital content element further comprises causing the reprogrammable transformation device to output an optical domain signal.

4. The computerized method of claim 3, wherein the causing of the reprogrammable transformation device to output the optical domain signal comprises causing the reprogrammable transformation device to output wave-division multiplexed (WDM) optical signal.

5. The computerized method of claim 4, wherein the causing of the reprogrammable transformation device to output the WDM optical signal comprises causing the reprogrammable transformation device to (i) convert one or more data streams received via one or more frequency-multiplexed transports to one or more data streams comprising one or more amplitudes and (ii) modulate the converted one or more data streams onto one or more wavelength channels.

6. The computerized method of claim 5, wherein the transform of the processed digital content stream comprises causing the reprogrammable transformation device to output one or more spectral coefficients, the one or more spectral coefficients relating to the one or more amplitudes.

7. The computerized method of claim 4, wherein the causing of the reprogrammable transformation device to output the WDM optical signal comprises causing the reprogrammable transformation device to transform one or more data streams to one or more combined optical outputs.

8. The computerized method of claim 4, wherein the causing of the reprogrammable transformation device to output the WDM optical signal comprises causing the reprogrammable transformation device to output one or more data streams comprising one or more wavelengths to one or more laser apparatus, each one of the one or more laser apparatus generating only a subset of light wavelengths.

9. The computerized method of claim 8, wherein the causing of the reprogrammable transformation device to output the WDM optical signal further comprises causing the reprogrammable transformation device to couple the one or more output data streams to one or more tunable laser apparatus, the one or more tunable laser apparatus configured to generate a wider range of light spectra than the one or more laser apparatus.

10. The computerized method of claim 1, wherein the executing of the computerized logic to process the obtained digital content element comprises executing of the computerized logic to process a variable bitrate (VBR) digital content element so as to produce a corresponding constant bitrate (CBR) digital content element; and the computerized method further comprises:
  causing encryption of at least a portion of the CBR digital content element to produce an encrypted CBR digital content element.

11. A computerized apparatus for delivering digitally rendered content from a digital content source to a plurality of computerized client devices associated with a content delivery network, the computerized apparatus comprising:
  network interface apparatus in data communication with the plurality of computerized client devices;
  processing apparatus; and
  storage apparatus in data communication with the network interface apparatus and the processing apparatus, and comprising at least one computer program, the at least one computer program comprising a plurality of instructions which are configured to, when executed by the processing apparatus, cause the computerized apparatus to:
    receive, from one or more content sources in data communication with the content delivery network, a plurality of data packets, the plurality of data packets comprising formatting of a first domain;
    cause transformation of the plurality of data packets from comprising the formatting of the first domain to comprising formatting of a second domain; and
    cause transmission of the transformed plurality of data packets to the plurality of computerized client devices via a plurality of Quadrature Amplitude Modulation (QAM) radio frequency (RF) channels associated with a plurality of RF carriers, the plurality of RF carriers transmitted over at least a coaxial cable distribution portion of the content delivery network;
    wherein the transformation creates frequency and time diversity based at least on allocation of the transformed plurality of data packets to different ones of a plurality of time-frequency resource blocks, at least a portion of the time-frequency resource blocks associated with different ones of the plurality of RF carriers.

12. The computerized apparatus of claim 11, wherein the network interface apparatus is configured for encryption of data comprising an entirety of a payload associated with the plurality of data packets via a bulk encryption engine.

13. The computerized apparatus of claim 11, wherein the network interface apparatus is configured to utilize at least one encryption algorithm, the at least one algorithm based at least on at least one client device-specific consideration or capability.

14. The computerized apparatus of claim 11, wherein the network interface apparatus is configured to utilize at least one encryption algorithm, the at least one algorithm configured to support both legacy and non-legacy standards utilized within the content delivery network.

15. The computerized apparatus of claim 11, wherein the computerized apparatus is configured to receive both encrypted and unencrypted pluralities of data packets from respective ones of the one or more content sources, and cause said transformation of the received encrypted plurality of data packets without decryption.

16. Computer readable apparatus comprising a non-transitory storage medium, the non-transitory storage medium comprising at least one computer program having a plurality of instructions, the plurality of instructions configured to, when executed on a processing apparatus:
  receive a plurality of packetized program streams from one or more content sources;
  cause a programmable substrate apparatus to transform one or more of the plurality of packetized program streams from a first domain to a second domain via digital domain processing; and
  cause transmission of the transformed one or more of the plurality of packetized program streams to at least one computerized client device via a plurality of Quadrature Amplitude Modulation (QAM) radio frequency (RF) channels over a managed content distribution network;
  wherein at least one of: (i) the one or more content sources, or (ii) the plurality of QAM RF channels, is defined by a software configuration file, the software configuration file maintained by an operator of the managed content distribution network.

17. The computer readable apparatus of claim 16, wherein:
  the plurality of instructions are further configured to, when executed on the processing apparatus:
    select one or more of the plurality of packetized program streams to create targeted narrowcast digitally rendered content for distribution to a plurality of users of a content delivery network; and
    utilize a service group for the plurality of users, the service group related to the targeted narrowcast digitally rendered content.

18. The computer readable apparatus of claim 17, wherein the transmission comprises transmission of the targeted narrowcast digitally rendered content via a direct laser output from the programmable substrate apparatus to the service group.

19. The computer readable apparatus of claim 16, wherein the digital domain processing comprises an Inverse Fast Fourier Transform (IFFT).

20. The computer readable apparatus of claim 19, wherein at least some of the plurality of packetized program streams comprise at least one of an IP unicast or IP multicast.

* * * * *